United States Patent
Schum et al.

(10) Patent No.: US 10,575,591 B2
(45) Date of Patent: Mar. 3, 2020

(54) DEVICES, METHODS, AND SYSTEMS FOR REMOTE CONTROL OF A MOTORIZED CLOSURE SYSTEM

(71) Applicant: Boa Technology Inc., Denver, CO (US)

(72) Inventors: Noah S. Schum, Boulder, CO (US); John Crow, Denver, CO (US); Aaron Venturini, Denver, CO (US)

(73) Assignee: BOA Technology Inc., Denver, CO (US)

( * ) Notice: Subject to any disclaimer, the term of this patent is extended or adjusted under 35 U.S.C. 154(b) by 1161 days.

(21) Appl. No.: 14/877,755

(22) Filed: Oct. 7, 2015

(65) Prior Publication Data

US 2016/0157561 A1    Jun. 9, 2016

Related U.S. Application Data

(60) Provisional application No. 62/061,005, filed on Oct. 7, 2014, provisional application No. 62/102,982, filed
(Continued)

(51) Int. Cl.
*A43C 11/16* (2006.01)
*A43B 5/14* (2006.01)
(Continued)

(52) U.S. Cl.
CPC .......... *A43C 11/165* (2013.01); *A43B 3/0005* (2013.01); *A43B 5/14* (2013.01);
(Continued)

(58) Field of Classification Search
CPC ........... A43B 3/0005; A43B 5/14; A43B 3/00; A43B 5/00; A43C 11/165; A43C 1/00;
(Continued)

(56) References Cited

U.S. PATENT DOCUMENTS

| 59,332 A | 10/1866 | White et al. |
| 80,834 A | 8/1868 | Prussia |

(Continued)

FOREIGN PATENT DOCUMENTS

| CA | 2112789 | 8/1994 |
| CA | 2114387 | 8/1994 |

(Continued)

OTHER PUBLICATIONS

U.S. Appl. No. 09/956,601, filed Sep. 18, 2001, Hammerslag.
(Continued)

*Primary Examiner* — Anna K Kinsaul
*Assistant Examiner* — F Griffin Hall
(74) *Attorney, Agent, or Firm* — Kilpatrick Townsend & Stockton, LLP

(57) ABSTRACT

According to one aspect, a mechanism for wirelessly adjusting tension of an article includes a tension input component that is coupleable with a vehicle in an area that is easily accessible to a user. The tension input component is configured to receive input from the user corresponding to an adjustment of a motorized tensioning device that is attached to the article and that is configured to adjust a tension of a tension member. The tension input component is configured to wirelessly transmit the received input to the motorized tensioning device. Adjustment of the tension member tightens or loosens the article in accordance with the input received from the tension input component.

9 Claims, 75 Drawing Sheets

Related U.S. Application Data on Jan. 13, 2015, provisional application No. 62/173,285, filed on Jun. 9, 2015.

(51) Int. Cl.
  *B62K 23/02* (2006.01)
  *A43C 1/00* (2006.01)
  *A43B 3/00* (2006.01)

(52) U.S. Cl.
  CPC ............... *A43C 1/00* (2013.01); *A43C 1/003* (2013.01); *B62K 23/02* (2013.01)

(58) Field of Classification Search
  CPC ......... A43C 1/003; A43C 11/16; A43C 11/00; B62K 23/02; B62K 11/14; B62K 23/04; B62K 23/06; B62J 2099/004; B62M 25/08; Y10T 74/20822
  USPC .................................................. 36/50.1, 131
  See application file for complete search history.

(56) References Cited

U.S. PATENT DOCUMENTS

| | | | |
|---|---|---|---|
| 117,530 | A | 8/1871 | Foote |
| 228,946 | A | 6/1880 | Schulz |
| 230,759 | A | 8/1880 | Drummond |
| 379,113 | A | 3/1888 | Hibberd |
| 746,563 | A | 12/1903 | McMahon |
| 819,993 | A | 5/1906 | Haws et al. |
| 908,704 | A | 1/1909 | Sprinkle |
| 1,060,422 | A | 4/1913 | Bowdish |
| 1,062,511 | A | 5/1913 | Short |
| 1,083,775 | A | 1/1914 | Thomas |
| 1,090,438 | A | 3/1914 | Worth et al. |
| 1,170,472 | A | 2/1916 | Barber |
| 1,288,859 | A | 12/1918 | Feller et al. |
| 1,390,991 | A | 9/1921 | Fotchuk |
| 1,393,188 | A | 10/1921 | Whiteman |
| 1,469,661 | A | 2/1922 | Migita |
| 1,412,486 | A | 4/1922 | Paine |
| 1,416,203 | A | 5/1922 | Hobson |
| 1,429,657 | A | 9/1922 | Trawinski |
| 1,481,903 | A | 4/1923 | Hart |
| 1,466,673 | A | 9/1923 | Solomon et al. |
| 1,530,713 | A | 2/1924 | Clark |
| 1,502,919 | A | 7/1924 | Seib |
| 1,862,047 | A | 6/1932 | Boulet et al. |
| 1,995,243 | A | 6/1934 | Clarke |
| 2,088,851 | A | 8/1937 | Gantenbein |
| 2,109,751 | A | 3/1938 | Matthias et al. |
| 2,124,310 | A | 9/1938 | Murr, Jr. |
| 2,316,102 | A | 4/1943 | Preston |
| 2,539,026 | A | 1/1951 | Mangold |
| 2,611,940 | A | 9/1952 | Cairns |
| 2,673,381 | A | 3/1954 | Dueker |
| 2,907,086 | A | 10/1959 | Ord |
| 2,991,523 | A | 7/1961 | Del Conte |
| 3,028,602 | A | 4/1962 | Miller |
| 3,035,319 | A | 5/1962 | Wolff |
| 3,106,003 | A | 10/1963 | Herdman |
| 3,112,545 | A | 12/1963 | Williams |
| 3,122,810 | A | 3/1964 | Lawrence et al. |
| 3,163,900 | A | 1/1965 | Martin |
| D200,394 | S | 2/1965 | Hakim |
| 3,169,325 | A | 2/1965 | Fesl |
| 3,193,950 | A | 7/1965 | Liou |
| 3,197,155 | A | 7/1965 | Chow |
| 3,221,384 | A | 12/1965 | Aufenacker |
| 3,276,090 | A | 10/1966 | Nigon |
| D206,146 | S | 11/1966 | Hendershot |
| 3,345,707 | A | 10/1967 | Rita |
| D210,649 | S | 4/1968 | Getgay |
| 3,401,437 | A | 9/1968 | Christpohersen |
| 3,430,303 | A | 3/1969 | Perrin et al. |
| 3,491,465 | A | 1/1970 | Martin |
| 3,545,106 | A | 12/1970 | Martin |
| 3,618,232 | A | 11/1971 | Shnuriwsky |
| 3,668,791 | A | 6/1972 | Salzman et al. |
| 3,678,539 | A | 7/1972 | Graup |
| 3,703,775 | A | 11/1972 | Gatti |
| 3,729,779 | A | 5/1973 | Porth |
| 3,738,027 | A | 6/1973 | Schoch |
| 3,793,749 | A | 2/1974 | Gertsch et al. |
| 3,808,644 | A | 5/1974 | Schoch |
| 3,934,346 | A | 1/1976 | Sasaki et al. |
| 3,975,838 | A | 8/1976 | Martin |
| 4,084,267 | A | 4/1978 | Zadina |
| 4,130,949 | A | 12/1978 | Seidel |
| 4,142,307 | A | 3/1979 | Martin |
| 4,227,322 | A | 10/1980 | Annovi |
| 4,261,081 | A | 4/1981 | Lott |
| 4,267,622 | A | 5/1981 | Burnett-Johnston |
| 4,408,403 | A | 10/1983 | Martin |
| 4,417,703 | A | 11/1983 | Weinhold |
| 4,433,456 | A | 2/1984 | Baggio |
| 4,463,761 | A | 8/1984 | Pols et al. |
| 4,480,395 | A | 11/1984 | Schoch |
| 4,507,878 | A | 4/1985 | Semouha |
| 4,516,576 | A | 5/1985 | Kirchner |
| 4,551,932 | A | 11/1985 | Schoch |
| 4,555,830 | A | 12/1985 | Petrini et al. |
| 4,574,500 | A | 3/1986 | Aldinio et al. |
| 4,616,432 | A | 10/1986 | Bunch et al. |
| 4,616,524 | A | 10/1986 | Biodia |
| 4,619,057 | A | 10/1986 | Sartor et al. |
| 4,620,378 | A | 11/1986 | Sartor |
| 4,631,839 | A | 12/1986 | Bonetti et al. |
| 4,631,840 | A | 12/1986 | Gamm |
| 4,633,599 | A | 1/1987 | Morell et al. |
| 4,644,938 | A | 2/1987 | Yates et al. |
| 4,654,985 | A | 4/1987 | Chalmers |
| 4,660,300 | A | 4/1987 | Morell et al. |
| 4,660,302 | A | 4/1987 | Arieh et al. |
| 4,680,878 | A | 7/1987 | Pozzobon et al. |
| 4,719,670 | A | 1/1988 | Kurt |
| 4,719,709 | A | 1/1988 | Vaccari |
| 4,719,710 | A | 1/1988 | Pozzobon |
| 4,722,477 | A | 2/1988 | Floyd |
| 4,741,115 | A | 5/1988 | Pozzobon |
| 4,748,726 | A | 6/1988 | Schoch |
| 4,760,653 | A | 8/1988 | Baggio |
| 4,780,969 | A | 11/1988 | White, Jr. |
| 4,787,124 | A | 11/1988 | Pozzobon et al. |
| 4,790,081 | A | 12/1988 | Benoit et al. |
| 4,796,829 | A | 1/1989 | Pozzobon et al. |
| 4,799,297 | A | 1/1989 | Baggio et al. |
| 4,802,291 | A | 2/1989 | Sartor |
| 4,811,503 | A | 3/1989 | Iwama |
| 4,826,098 | A | 5/1989 | Pozzobon et al. |
| 4,841,649 | A | 6/1989 | Baggio et al. |
| 4,856,207 | A | 8/1989 | Datson |
| 4,862,878 | A | 9/1989 | Davison |
| 4,870,723 | A | 10/1989 | Pozzobon et al. |
| 4,870,761 | A | 10/1989 | Tracy |
| 4,884,760 | A | 12/1989 | Baggio et al. |
| 4,901,938 | A | 2/1990 | Cantley et al. |
| 4,924,605 | A | 5/1990 | Spademan |
| D308,282 | S | 6/1990 | Bergman et al. |
| 4,937,953 | A | 7/1990 | Walkhoff |
| 4,961,544 | A | 10/1990 | Biodia |
| 4,979,953 | A | 12/1990 | Spence |
| 4,989,805 | A | 2/1991 | Burke |
| 5,001,817 | A | 3/1991 | De Bortoli et al. |
| 5,016,327 | A | 5/1991 | Klausner |
| 5,042,177 | A | 8/1991 | Schoch |
| 5,062,225 | A | 11/1991 | Gorza |
| 5,065,480 | A | 11/1991 | DeBortoli |
| 5,065,481 | A | 11/1991 | Walkhoff |
| 5,108,216 | A | 4/1992 | Geyer et al. |
| 5,117,567 | A | 6/1992 | Berger |
| 5,152,038 | A | 10/1992 | Schoch |
| 5,157,813 | A | 10/1992 | Carroll |
| 5,158,428 | A | 10/1992 | Gessner et al. |

(56) References Cited

U.S. PATENT DOCUMENTS

| | | |
|---|---|---|
| 5,177,882 A | 1/1993 | Berger |
| 5,181,331 A | 1/1993 | Berger |
| 5,184,378 A | 2/1993 | Batra |
| D333,552 S | 3/1993 | Berger et al. |
| 5,205,055 A | 4/1993 | Harrell |
| 5,233,767 A | 8/1993 | Kramer |
| 5,249,377 A | 10/1993 | Walkhoff |
| 5,259,094 A | 11/1993 | Zepeda |
| 5,315,741 A | 5/1994 | Debberke |
| 5,319,868 A | 6/1994 | Hallenbeck |
| 5,319,869 A | 6/1994 | McDonald et al. |
| 5,325,613 A | 7/1994 | Sussmann |
| 5,327,662 A | 7/1994 | Hallenbeck |
| 5,335,401 A | 8/1994 | Hanson |
| 5,341,583 A | 8/1994 | Hallenbeck |
| 5,345,697 A | 9/1994 | Quellais |
| 5,355,596 A | 10/1994 | Sussman |
| 5,357,654 A | 10/1994 | Hsing-Chi |
| 5,371,957 A | 12/1994 | Gaudio |
| 5,381,609 A | 1/1995 | Hieblinger |
| 5,392,535 A | 2/1995 | Van Noy et al. |
| D357,576 S | 4/1995 | Steinweis |
| 5,425,161 A | 6/1995 | Schoch |
| 5,425,185 A | 6/1995 | Gansler |
| 5,430,960 A | 7/1995 | Richardson |
| 5,433,648 A | 7/1995 | Frydman |
| 5,463,822 A | 11/1995 | Miller |
| 5,477,593 A | 12/1995 | Leick |
| D367,755 S | 3/1996 | Jones |
| D367,954 S | 3/1996 | Dion |
| 5,502,902 A | 4/1996 | Sussmann |
| 5,511,325 A | 4/1996 | Hieblinger |
| 5,526,585 A | 6/1996 | Brown et al. |
| 5,535,531 A | 7/1996 | Karabed et al. |
| 5,537,763 A | 7/1996 | Donnadieu et al. |
| 5,557,864 A | 9/1996 | Marks |
| 5,566,474 A | 10/1996 | Leick et al. |
| D375,831 S | 11/1996 | Perry |
| 5,596,820 A | 1/1997 | Edauw et al. |
| 5,599,000 A | 2/1997 | Bennett |
| 5,599,288 A | 2/1997 | Shirley et al. |
| 5,600,874 A | 2/1997 | Jungkind |
| 5,606,778 A | 3/1997 | Jungkind |
| 5,607,448 A | 3/1997 | Stahl et al. |
| D379,113 S | 5/1997 | McDonald et al. |
| 5,638,588 A | 6/1997 | Jungkind |
| 5,640,785 A | 6/1997 | Egelja |
| 5,647,104 A | 7/1997 | James |
| 5,651,198 A | 7/1997 | Sussmann |
| 5,669,116 A | 9/1997 | Jungkind |
| 5,692,319 A | 12/1997 | Parker et al. |
| 5,718,021 A | 2/1998 | Tatum |
| 5,718,065 A | 2/1998 | Locker |
| 5,720,084 A | 2/1998 | Chen |
| 5,732,483 A | 3/1998 | Cagliari |
| 5,732,648 A | 3/1998 | Aragon |
| 5,736,696 A | 4/1998 | Del Rosso |
| 5,737,854 A | 4/1998 | Sussmann |
| 5,755,044 A | 5/1998 | Veylupek |
| 5,756,298 A | 5/1998 | Burczak |
| 5,761,777 A | 6/1998 | Leick |
| 5,772,146 A | 6/1998 | Kawamoto et al. |
| 5,784,809 A | 7/1998 | McDonald |
| 5,791,068 A | 8/1998 | Bernier et al. |
| 5,819,378 A | 10/1998 | Doyle |
| 5,833,640 A | 11/1998 | Vazquez, Jr. et al. |
| 5,839,210 A | 11/1998 | Bernier et al. |
| 5,845,371 A | 12/1998 | Chen |
| 5,909,946 A | 6/1999 | Okajima |
| D413,197 S | 8/1999 | Faye |
| 5,934,599 A | 8/1999 | Hammerslag |
| 5,937,542 A | 8/1999 | Bourdeau |
| 5,956,823 A | 9/1999 | Borel |
| 5,971,946 A | 10/1999 | Quinn et al. |
| 6,015,110 A | 1/2000 | Lai |
| 6,038,791 A | 3/2000 | Cornelius et al. |
| 6,052,921 A | 4/2000 | Oreck |
| 6,070,886 A | 6/2000 | Cornelius et al. |
| 6,070,887 A | 6/2000 | Cornelius et al. |
| 6,083,857 A | 7/2000 | Bottger |
| 6,088,936 A | 7/2000 | Bahl |
| 6,102,412 A | 8/2000 | Staffaroni |
| D430,724 S | 9/2000 | Matis et al. |
| 6,119,318 A | 9/2000 | Maurer |
| 6,119,372 A | 9/2000 | Okajima |
| 6,128,835 A | 10/2000 | Ritter et al. |
| 6,128,836 A | 10/2000 | Barret |
| 6,148,489 A | 11/2000 | Dickie et al. |
| 6,202,953 B1 | 3/2001 | Hammerslag |
| 6,219,891 B1 | 4/2001 | Maurer et al. |
| 6,240,657 B1 | 6/2001 | Weber et al. |
| 6,256,798 B1 | 7/2001 | Egolf et al. |
| 6,267,390 B1 | 7/2001 | Maravetz et al. |
| 6,286,233 B1 | 9/2001 | Gaither |
| 6,289,558 B1 | 9/2001 | Hammerslag |
| 6,311,633 B1 | 11/2001 | Keire |
| D456,130 S | 4/2002 | Towns |
| 6,370,743 B2 | 4/2002 | Choe |
| 6,401,364 B1 | 6/2002 | Burt |
| 6,416,074 B1 | 7/2002 | Maravetz et al. |
| 6,467,195 B2 | 10/2002 | Pierre et al. |
| 6,477,793 B1 | 11/2002 | Pruitt et al. |
| 6,502,286 B1 | 1/2003 | Dubberke |
| 6,543,159 B1 | 4/2003 | Carpenter et al. |
| 6,568,103 B2 | 5/2003 | Durocher |
| 6,606,804 B2 | 8/2003 | Kaneko et al. |
| 6,694,643 B1 | 2/2004 | Hsu |
| 6,708,376 B1 | 3/2004 | Landry |
| 6,711,787 B2 | 3/2004 | Jungkind et al. |
| 6,735,829 B2 | 5/2004 | Hsu |
| 6,757,991 B2 | 7/2004 | Sussmann |
| 6,775,928 B2 | 8/2004 | Grande et al. |
| 6,792,702 B2 | 9/2004 | Borsoi et al. |
| 6,802,439 B2 | 10/2004 | Azam et al. |
| 6,823,610 B1 | 11/2004 | Ashley |
| 6,871,812 B1 | 3/2005 | Chang |
| 6,877,256 B2 | 4/2005 | Martin et al. |
| 6,899,720 B1 | 5/2005 | McMillan |
| 6,922,917 B2 | 8/2005 | Kerns et al. |
| 6,938,913 B2 | 9/2005 | Elkington |
| 6,945,543 B2 | 9/2005 | De Bertoli et al. |
| D510,183 S | 10/2005 | Tresser |
| 6,976,972 B2 | 12/2005 | Bradshaw |
| 6,993,859 B2 | 2/2006 | Martin et al. |
| D521,226 S | 5/2006 | Douglas et al. |
| 7,073,279 B2 | 7/2006 | Min |
| 7,076,843 B2 | 7/2006 | Sakabayashi |
| 7,082,701 B2 | 8/2006 | Dalgaard et al. |
| 7,096,559 B2 | 8/2006 | Johnson et al. |
| 7,134,224 B2 | 11/2006 | Elkington et al. |
| 7,266,911 B2 | 9/2007 | Holzer et al. |
| 7,281,341 B2 | 10/2007 | Reagan et al. |
| 7,293,373 B2 | 11/2007 | Reagan et al. |
| 7,331,126 B2 | 2/2008 | Johnson |
| 7,343,701 B2 | 3/2008 | Pare et al. |
| 7,367,522 B2 | 5/2008 | Chen |
| 7,386,947 B2 | 6/2008 | Martin et al. |
| 7,392,602 B2 | 7/2008 | Reagan et al. |
| 7,401,423 B2 | 7/2008 | Reagan et al. |
| 7,490,458 B2 | 2/2009 | Ford |
| 7,568,298 B2 | 8/2009 | Kerns |
| 7,582,102 B2 | 9/2009 | Heinz et al. |
| 7,584,528 B2 | 9/2009 | Hu |
| 7,591,050 B2 | 9/2009 | Hammerslag |
| 7,597,675 B2 | 10/2009 | Ingimundarson et al. |
| 7,600,660 B2 | 10/2009 | Kasper et al. |
| 7,617,573 B2 | 11/2009 | Chen |
| 7,624,517 B2 | 12/2009 | Smith |
| 7,648,404 B1 | 1/2010 | Martin |
| 7,650,705 B2 | 1/2010 | Donnadieu et al. |
| 7,694,354 B2 | 4/2010 | Philpott et al. |
| 7,752,774 B2 | 7/2010 | Ussher |
| 7,757,412 B2 | 7/2010 | Farys |
| 7,774,956 B2 | 8/2010 | Dua et al. |

(56) References Cited

U.S. PATENT DOCUMENTS

| | | |
|---|---|---|
| D626,322 S | 11/2010 | Servettaz |
| 7,841,106 B2 | 11/2010 | Farys |
| 7,871,334 B2 | 1/2011 | Young et al. |
| 7,877,845 B2 | 2/2011 | Signori |
| 7,900,378 B1 | 3/2011 | Busse |
| 7,908,769 B2 | 3/2011 | Pellegrini |
| 7,947,061 B1 | 5/2011 | Reis |
| 7,950,112 B2 | 5/2011 | Hammerslag et al. |
| 7,954,204 B2 | 6/2011 | Hammerslag et al. |
| 7,963,049 B2 | 6/2011 | Messmer |
| 7,992,261 B2 | 8/2011 | Hammerslag et al. |
| D646,790 S | 10/2011 | Castillo |
| 8,056,150 B2 | 11/2011 | Stokes et al. |
| 8,074,379 B2 | 12/2011 | Robinson, Jr. et al. |
| 8,091,182 B2 | 1/2012 | Hammerslag et al. |
| 8,109,015 B2 | 2/2012 | Signori |
| D663,850 S | 7/2012 | Joseph |
| D663,851 S | 7/2012 | Joseph |
| 8,215,033 B2 | 7/2012 | Carboy et al. |
| 8,231,074 B2 | 7/2012 | Hu et al. |
| D665,088 S | 8/2012 | Joseph |
| 8,235,321 B2 | 8/2012 | Chen |
| 8,245,371 B2 | 8/2012 | Chen |
| 8,257,293 B2 | 9/2012 | Ingimundarson et al. |
| 8,266,827 B2 | 9/2012 | Dojan et al. |
| 8,277,401 B2 | 10/2012 | Hammerslag et al. |
| 8,302,329 B2 | 11/2012 | Hurd et al. |
| 8,303,527 B2 | 11/2012 | Joseph |
| 8,308,098 B2 | 11/2012 | Chen |
| 8,353,087 B2 | 1/2013 | Chen |
| 8,353,088 B2 | 1/2013 | Ha |
| D677,045 S | 3/2013 | Voskuil |
| D679,019 S | 3/2013 | Siddle et al. |
| 8,434,200 B2 | 5/2013 | Chen |
| 8,490,299 B2 | 7/2013 | Dua et al. |
| 8,516,662 B2 | 8/2013 | Goodman et al. |
| 8,578,632 B2 | 11/2013 | Bell et al. |
| 8,652,164 B1 | 2/2014 | Aston |
| 8,713,820 B2 | 5/2014 | Kerns et al. |
| 8,984,719 B2 | 3/2015 | Soderberg et al. |
| 9,072,341 B2 | 7/2015 | Jungkind |
| D735,987 S | 8/2015 | Hsu |
| 9,101,181 B2 | 8/2015 | Soderberg et al. |
| 9,125,455 B2 | 9/2015 | Kerns et al. |
| 9,138,030 B2 | 9/2015 | Soderberg et al. |
| 9,248,040 B2 | 2/2016 | Soderberg et al. |
| 2002/0050076 A1 | 5/2002 | Borsoi et al. |
| 2002/0062579 A1 | 5/2002 | Caeran |
| 2002/0095750 A1 | 7/2002 | Hammerslag |
| 2002/0129518 A1 | 9/2002 | Borsoi et al. |
| 2002/0148142 A1 | 10/2002 | Oorei et al. |
| 2002/0166260 A1 | 11/2002 | Borsoi |
| 2002/0178548 A1 | 12/2002 | Freed |
| 2003/0079376 A1 | 5/2003 | Oorei et al. |
| 2003/0144620 A1 | 7/2003 | Sieller |
| 2003/0150135 A1 | 8/2003 | Liu |
| 2003/0177662 A1 | 9/2003 | Elkington et al. |
| 2003/0204938 A1 | 11/2003 | Hammerslag |
| 2004/0041452 A1 | 3/2004 | Williams |
| 2004/0211039 A1 | 10/2004 | Livingston |
| 2005/0054962 A1 | 3/2005 | Bradshaw |
| 2005/0060912 A1 | 3/2005 | Holzer et al. |
| 2005/0081339 A1 | 4/2005 | Sakabayashi |
| 2005/0081403 A1 | 4/2005 | Mathieu |
| 2005/0087115 A1 | 4/2005 | Martin |
| 2005/0098673 A1 | 5/2005 | Huang |
| 2005/0102861 A1 | 5/2005 | Martin |
| 2005/0126043 A1 | 6/2005 | Reagan et al. |
| 2005/0172463 A1 | 8/2005 | Rolla |
| 2005/0184186 A1 | 8/2005 | Tsoi et al. |
| 2005/0198866 A1 | 9/2005 | Wiper et al. |
| 2006/0135901 A1 | 6/2006 | Ingimundarson et al. |
| 2006/0156517 A1 | 7/2006 | Hammerslag et al. |
| 2006/0179685 A1 | 8/2006 | Borel et al. |
| 2006/0185193 A1 | 8/2006 | Pellegrini |
| 2006/0283050 A1* | 12/2006 | Carnes ............... A43B 3/00 36/132 |
| 2006/0287627 A1 | 12/2006 | Johnson |
| 2007/0006489 A1 | 1/2007 | Case, Jr. et al. |
| 2007/0063459 A1 | 3/2007 | Kavarsky |
| 2007/0068040 A1 | 3/2007 | Farys |
| 2007/0084956 A1 | 4/2007 | Chen |
| 2007/0113524 A1 | 5/2007 | Lander |
| 2007/0128959 A1 | 6/2007 | Cooke |
| 2007/0169378 A1 | 7/2007 | Sodeberg et al. |
| 2008/0016717 A1 | 1/2008 | Ruban |
| 2008/0060167 A1 | 3/2008 | Hammerslag et al. |
| 2008/0060168 A1 | 3/2008 | Hammerslag et al. |
| 2008/0066272 A1 | 3/2008 | Hammerslag et al. |
| 2008/0066345 A1 | 3/2008 | Hammerslag et al. |
| 2008/0066346 A1 | 3/2008 | Hammerslag et al. |
| 2008/0068204 A1 | 3/2008 | Carmen et al. |
| 2008/0083135 A1 | 4/2008 | Hammerslag et al. |
| 2008/0092279 A1 | 4/2008 | Chiang |
| 2008/0172848 A1 | 7/2008 | Chen |
| 2008/0196224 A1 | 8/2008 | Hu |
| 2009/0019734 A1 | 1/2009 | Reagan et al. |
| 2009/0071041 A1 | 3/2009 | Hooper |
| 2009/0090029 A1 | 4/2009 | Kishino |
| 2009/0172928 A1 | 7/2009 | Messmer et al. |
| 2009/0184189 A1 | 7/2009 | Soderberg et al. |
| 2009/0272007 A1 | 11/2009 | Beers et al. |
| 2009/0277043 A1 | 11/2009 | Graser et al. |
| 2010/0064547 A1 | 3/2010 | Kaplan |
| 2010/0101061 A1 | 4/2010 | Ha |
| 2010/0139057 A1 | 6/2010 | Soderberg et al. |
| 2010/0154254 A1 | 6/2010 | Fletcher |
| 2010/0175163 A1 | 7/2010 | Litke |
| 2010/0251524 A1 | 10/2010 | Chen |
| 2010/0299959 A1 | 12/2010 | Hammerslag |
| 2010/0319216 A1 | 12/2010 | Grenzke et al. |
| 2011/0000173 A1 | 1/2011 | Lander |
| 2011/0071647 A1 | 3/2011 | Mahon |
| 2011/0162236 A1 | 7/2011 | Voskuil et al. |
| 2011/0167543 A1 | 7/2011 | Kovacevich et al. |
| 2011/0191992 A1 | 8/2011 | Chen |
| 2011/0197362 A1 | 8/2011 | Chella et al. |
| 2011/0225843 A1 | 9/2011 | Kerns et al. |
| 2011/0258876 A1 | 10/2011 | Baker et al. |
| 2011/0266384 A1 | 11/2011 | Goodman et al. |
| 2012/0000091 A1 | 1/2012 | Cotterman et al. |
| 2012/0004587 A1 | 1/2012 | Nickel et al. |
| 2012/0005995 A1 | 1/2012 | Emery |
| 2012/0023717 A1 | 2/2012 | Chen |
| 2012/0047620 A1 | 3/2012 | Ellis et al. |
| 2012/0101417 A1 | 4/2012 | Joseph |
| 2012/0102783 A1 | 5/2012 | Swigart et al. |
| 2012/0138882 A1 | 6/2012 | Moore et al. |
| 2012/0157902 A1 | 6/2012 | Castillo et al. |
| 2012/0167290 A1 | 7/2012 | Kovacevich et al. |
| 2012/0174437 A1 | 7/2012 | Heard |
| 2012/0228419 A1 | 9/2012 | Chen |
| 2012/0246974 A1 | 10/2012 | Hammerslag et al. |
| 2012/0310273 A1 | 12/2012 | Thorpe |
| 2013/0014359 A1 | 1/2013 | Chen |
| 2013/0019501 A1 | 1/2013 | Gerber |
| 2013/0025100 A1 | 1/2013 | Ha |
| 2013/0091667 A1 | 4/2013 | Chen |
| 2013/0091674 A1 | 4/2013 | Chen |
| 2013/0092780 A1 | 4/2013 | Soderberg et al. |
| 2013/0012856 A1 | 10/2013 | Hammerslag et al. |
| 2013/0269219 A1 | 10/2013 | Burns et al. |
| 2013/0277485 A1 | 10/2013 | Soderberg et al. |
| 2013/0312293 A1 | 11/2013 | Gerber |
| 2013/0340283 A1 | 12/2013 | Bell et al. |
| 2013/0345612 A1 | 12/2013 | Bannister et al. |
| 2014/0068838 A1* | 3/2014 | Beers ............... A61F 5/028 2/243.1 |
| 2014/0082963 A1 | 3/2014 | Beers |
| 2014/0094728 A1 | 4/2014 | Soderberg et al. |
| 2014/0117140 A1 | 5/2014 | Goodman et al. |
| 2014/0123440 A1 | 5/2014 | Capra et al. |
| 2014/0123449 A1 | 5/2014 | Soderberg et al. |
| 2014/0208550 A1 | 7/2014 | Neiley |

(56) References Cited

U.S. PATENT DOCUMENTS

| | | | |
|---|---|---|---|
| 2014/0221055 A1* | 8/2014 | Wu | H04M 1/04 455/575.6 |
| 2014/0221889 A1 | 8/2014 | Burns et al. | |
| 2014/0257156 A1 | 9/2014 | Capra et al. | |
| 2014/0290016 A1 | 10/2014 | Lovett et al. | |
| 2014/0359981 A1 | 12/2014 | Cotterman et al. | |
| 2015/0007422 A1 | 1/2015 | Cavanagh et al. | |
| 2015/0014463 A1 | 1/2015 | Converse et al. | |
| 2015/0026936 A1 | 1/2015 | Kerns et al. | |
| 2015/0033519 A1 | 2/2015 | Hammerslag et al. | |
| 2015/0059206 A1 | 3/2015 | Lovett et al. | |
| 2015/0076272 A1 | 3/2015 | Trudel et al. | |
| 2015/0089779 A1 | 4/2015 | Lawrence et al. | |
| 2015/0089835 A1 | 4/2015 | Hammerslag et al. | |
| 2015/0101160 A1 | 4/2015 | Soderberg et al. | |
| 2015/0150705 A1 | 6/2015 | Capra et al. | |
| 2015/0151070 A1 | 6/2015 | Capra et al. | |
| 2015/0190262 A1 | 7/2015 | Capra et al. | |
| 2015/0223608 A1 | 8/2015 | Capra et al. | |
| 2015/0237962 A1 | 8/2015 | Soderberg et al. | |
| 2015/0335458 A1 | 11/2015 | Romo | |

FOREIGN PATENT DOCUMENTS

| | | |
|---|---|---|
| CH | 199766 | 9/1938 |
| CH | 204 834 A | 5/1939 |
| CN | 2613167 | 4/2004 |
| CN | 201015448 | 2/2008 |
| DE | 641976 | 2/1937 |
| DE | 23 41 658 | 3/1974 |
| DE | 29 00 077 A1 | 7/1980 |
| DE | 31 01 952 A1 | 9/1982 |
| DE | 38 13 470 | 11/1989 |
| DE | 43 02 401 A1 | 8/1994 |
| DE | 43 05 671 A1 | 9/1994 |
| DE | 9308037 | 10/1994 |
| DE | 43 26 049 A1 | 2/1995 |
| DE | 9315776 | 2/1995 |
| DE | 196 24 553 | 1/1998 |
| DE | 19945045 A1 | 3/2001 |
| DE | 20 2010 000 354 U1 | 6/2010 |
| DE | 11 2013 005 273 T5 | 9/2015 |
| EP | 0 056 953 | 8/1982 |
| EP | 0 099 504 | 2/1984 |
| EP | 0 123 050 | 10/1984 |
| EP | 0 155 596 | 9/1985 |
| EP | 0 201 051 | 11/1986 |
| EP | 0 255 869 | 2/1988 |
| EP | 0 393 380 | 10/1990 |
| EP | 0 589 232 A1 | 3/1994 |
| EP | 0 589 233 A1 | 3/1994 |
| EP | 0 614 625 A1 | 9/1994 |
| EP | 0 651 954 A1 | 5/1995 |
| EP | 0 679 346 | 11/1995 |
| EP | 0 693 260 B1 | 1/1996 |
| EP | 0 734 662 A1 | 10/1996 |
| EP | 0 848 917 | 6/1998 |
| EP | 0 923 965 | 6/1999 |
| EP | 0 937 467 | 8/1999 |
| EP | 1163860 | 12/2001 |
| EP | 1 219 195 | 7/2002 |
| EP | 1 236 412 A | 9/2002 |
| EP | 2298107 B1 | 3/2011 |
| EP | 2359708 | 8/2011 |
| FR | 1 404 799 | 7/1965 |
| FR | 2 019 991 A | 7/1970 |
| FR | 2 598 292 A1 | 11/1987 |
| FR | 2 726 440 A1 | 5/1996 |
| FR | 2 770 379 A1 | 5/1999 |
| FR | 2 814 919 A1 | 4/2002 |
| GB | 189911673 | 7/1899 |
| GB | 216400 | 5/1924 |
| GB | 2 449 722 A | 12/2008 |
| IT | 1220811 | 6/1990 |
| IT | 2003 A 000197 | 4/2003 |
| IT | 2003 A 000198 | 3/2005 |
| JP | 51-121375 | 10/1976 |
| JP | 53-124987 | 3/1977 |
| JP | 54-108125 | 2/1978 |
| JP | H02-236025 | 9/1990 |
| JP | 6-284906 | 2/1996 |
| JP | 3030988 | 11/1996 |
| JP | 3031760 | 12/1996 |
| JP | 10-199366 | 7/1998 |
| JP | 2004-016732 | 1/2004 |
| JP | 2004-041666 | 2/2004 |
| JP | 2009-504210 | 2/2009 |
| KR | 20-0367882 | 11/2004 |
| KR | 20-0400568 | 8/2005 |
| KR | 10-0598627 | 7/2006 |
| KR | 10-0953398 | 4/2010 |
| KR | 10-1025134 B1 | 3/2011 |
| KR | 10-1028468 | 4/2011 |
| KR | 10-1053551 | 7/2011 |
| WO | WO 94/27456 | 12/1994 |
| WO | WO 95/11602 | 5/1995 |
| WO | WO 1995/03720 | 9/1995 |
| WO | WO 98/33408 | 8/1998 |
| WO | WO 98/37782 | 9/1998 |
| WO | WO 99/09850 | 3/1999 |
| WO | WO 99/15043 | 4/1999 |
| WO | WO 99/43231 | 9/1999 |
| WO | WO 00/53045 | 9/2000 |
| WO | WO 2000/76337 A1 | 12/2000 |
| WO | WO 01/08525 | 2/2001 |
| WO | WO 01/15559 | 3/2001 |
| WO | WO 02/051511 | 7/2002 |
| WO | WO 2004/093569 | 11/2004 |
| WO | WO 2005/013748 A1 | 2/2005 |
| WO | WO/2007/016983 | 2/2007 |
| WO | WO 2008/015214 | 2/2008 |
| WO | WO/2008/033963 | 3/2008 |
| WO | WO/2009/134858 | 11/2009 |
| WO | WO 2010/059989 A2 | 5/2010 |
| WO | WO 2012/165803 A2 | 12/2012 |
| WO | WO/2015/035885 | 3/2015 |
| WO | WO 2015/179332 A1 | 11/2015 |
| WO | WO 2015/181928 A1 | 12/2015 |

OTHER PUBLICATIONS

ASOLO® Boot Brochure Catalog upon information and belief date is as early as Aug. 22, 1997, 12 pages.
La Sportiva, A Technical Lightweight Double Boot for Cold Environments, 1 page. Accessed on May 27, 2015. Retrieved from http://www.sportiva.com/products/footwear/mountain/spantik.
"Strength of materials used to make my Safety Harnesses," Elaine, Inc. Jul. 9, 2012. Retrieved from <https://web.archive.org/web/20120709002720/http://www.childharness.ca/strength_data.html> on Mar. 17, 2014, 2 pages.
International Search Report and Written Opinion for PCT/US2013/032326 dated Jun. 14, 2013, 27 pages.
International Preliminary Report on Patentability for PCT/US2013/032326 dated Sep. 16, 2014, 6 pages.
International Search Report and Written Opinion for PCT/US2013/057637 dated Apr. 7, 2014, 34 pages.
International Preliminary Report on Patentability for PCT/US2013/057637 dated Mar. 3, 2015, 9 pages.
International Search Report and Written Opinion for PCT/US2013/068342 dated Apr. 7, 2014, 29 pages.
International Preliminary Report on Patentability for PCT/US2013/068342 dated May 5, 2015, 9 pages.
International Search Report and Written Opinion for PCT/US2014/014952 dated Apr. 25, 2014, 17 pages.
International Preliminary Report on Patentability for PCT/US2014/014952 dated Aug. 11, 2015, 9 pages.
International Search Report and Written Opinion for PCT/US2014/066212 dated Apr. 22, 2015, 16 pages.
International Search Report and Written Opinion for PCT/US2014/032574 dated Oct. 31, 2014, 19 pages.

(56) References Cited

OTHER PUBLICATIONS

International Search Report and Written Opinion for PCT/US2014/045291 dated Nov. 6, 2014, 12 pages.
International Search Report and Written Opinion for PCT/US2014/013458 dated May 19, 2014, 12 pages.
International Preliminary Report on Patentability for PCT/US2014/013458 dated Jul. 28, 2015, 7 pages.
International Search Report and Written Opinion for PCT/US2013/068814 dated Jun. 9, 2014, 18 pages.
International Preliminary Report on Patentability for PCT/US2013/068814 dated May 12, 2015, 12 pages.
Notice of Reasons for Rejection from the Japanese Patent Office dated Feb. 26, 2015 for design application No. 2014-015570, 4 pages.
Receipt of Certificate of Design Registration No. 1529678 from the Japanese Patent Office for design application No. 2014-015570 dated Jun. 26, 2015, 1 page.
International Search Report and Written Opinion for PCT/US2014/055710 dated Jul. 6, 2015, 19 pages.
International Search Report and Written Opinion for PCT/US2014/054420 dated Jul. 6, 2015, 21 pages.
The Preliminary Rejections from the Korean Intellectual Property Office for Application No. 30-2014-34959 is not translated into English. The document requests a renaming of the application to be in accordance with Korean patent law, 5 pages total.
The Preliminary Rejections from the Korean Intellectual Property Office for Application No. 30-2014-34959, is not translated into English. The document requests a revision of the drawings to be in accordance with Korean patent law, 6 pages total.
Certificate of Design Registration No. 30-809409 on Aug. 3, 2015 from the Korean Intellectual Property Office for Appln No. 30-2015-11475, 2 pages.
Certificate of Design Registration No. 30-809410 on Aug. 3, 2015 from the Korean Intellectual Property Office for Appln No. 30-2015-11476, 2 pages.
European Search Report for EP 14168875 dated Oct. 29, 2014, 9 pages.
International Search Report and Written Opinion for PCT/US2014/020894 dated Jun. 20, 2014, 12 pages.
International Preliminary Report on Patentability for PCT/US2014/020894 dated Sep. 8, 2015, 7 pages.
International Search Report and Written Opinion for PCT/US2014/041144 dated Dec. 10, 2014, 13 pages.
International Preliminary Report on Patentability for PCT/US2014/032574 dated Oct. 6, 2015, 12 pages.
International Search Report and Written Opinion for PCT/US2014/046238 dated Nov. 21, 2014, 17 pages.
Office Action dated Oct. 8, 2015 from the German Patent and Trademark Office for Appln No. 402015100191.2, regarding the title of the invention, 2 pages.
Anonymous, "Shore durometer," Wikipedia, the free encyclopedia, Mar. 10, 2012, XP002747470, Retrieved from the Internet: URL: https://en.wikipedia.org/w/index.php?title=Shore_durometer&oldid=481128180 [retrieved on Oct. 20, 2015] * shore A, shore D, durometer, polymer, rubber, gel; the whole document *, 6 pages.
Notice of Reasons for Rejection from the Japanese Patent Office dated Oct. 5, 2015 for design application No. 2015-004923, 4 pages.
"Save Tourniquet," 3 pages. Copyright 2015. Accessed on Dec. 11, 2015. Retrieved from http://www.savetourniquet.com/.
International Preliminary Report on Patentability for PCT/US2014/041144 dated Dec. 8, 2015, all pages.
Supplementary European Search Report for EP 13761841 dated Oct. 21, 2015, all pages.
International Preliminary Report on Patentability for PCT/US2014/045291 dated Jan. 5, 2016, 5 pages.
International Preliminary Report on Patentability for PCT/US2014/046238 dated Jan. 12, 2016, 11 pages.
International Search Report and Written Opinion for PCT/US2015/054530 dated Jan. 13, 2016, all pages.

\* cited by examiner

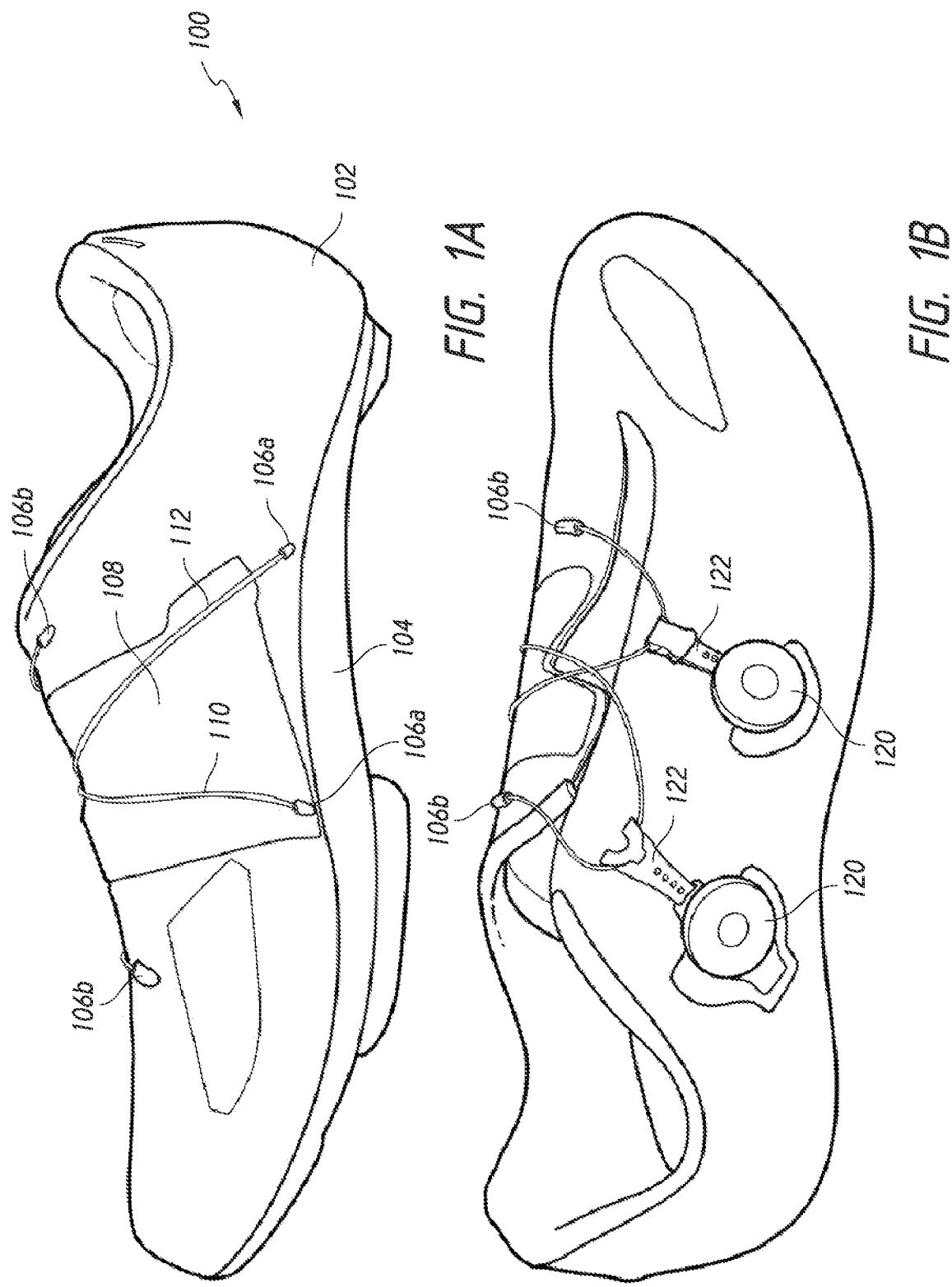

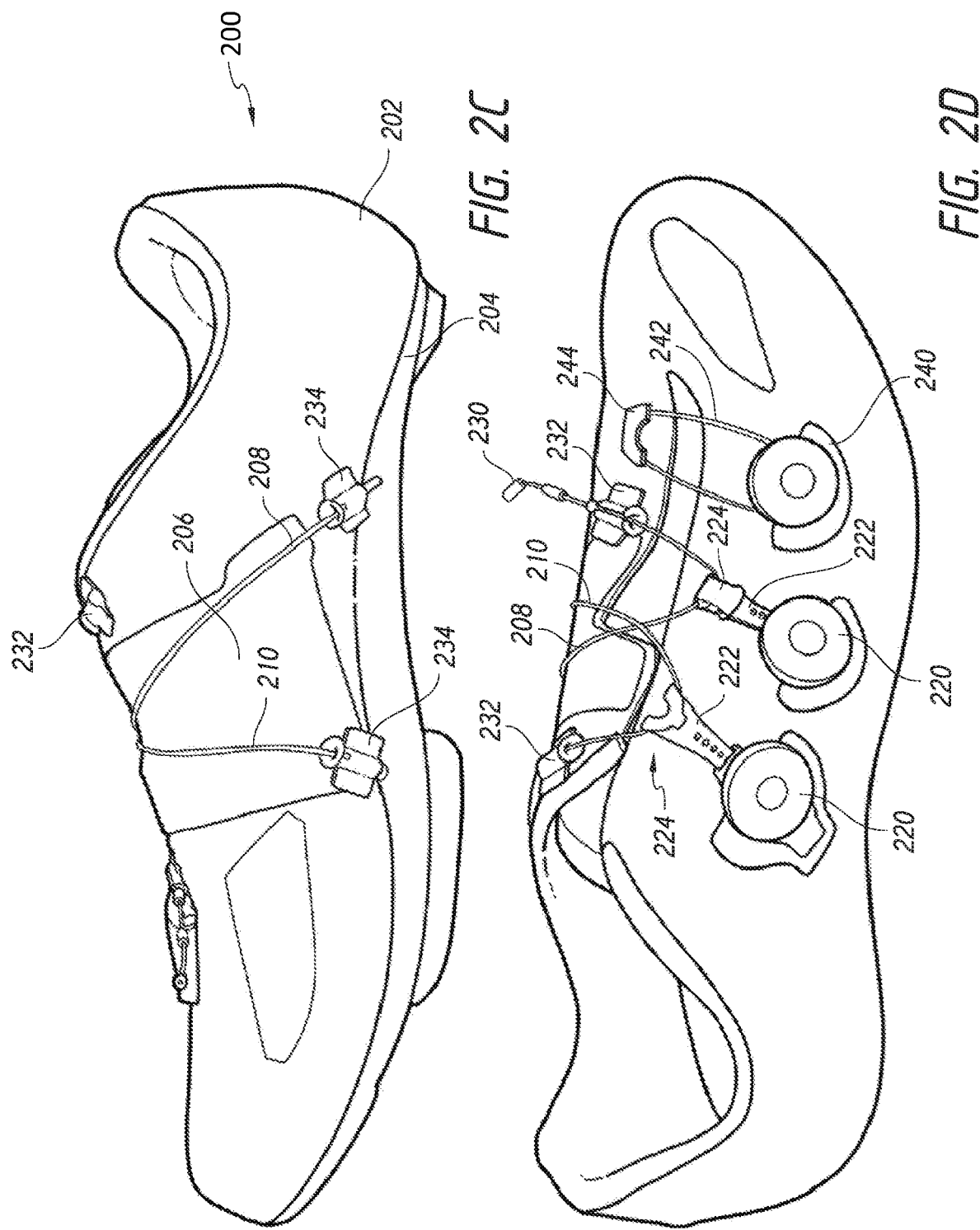

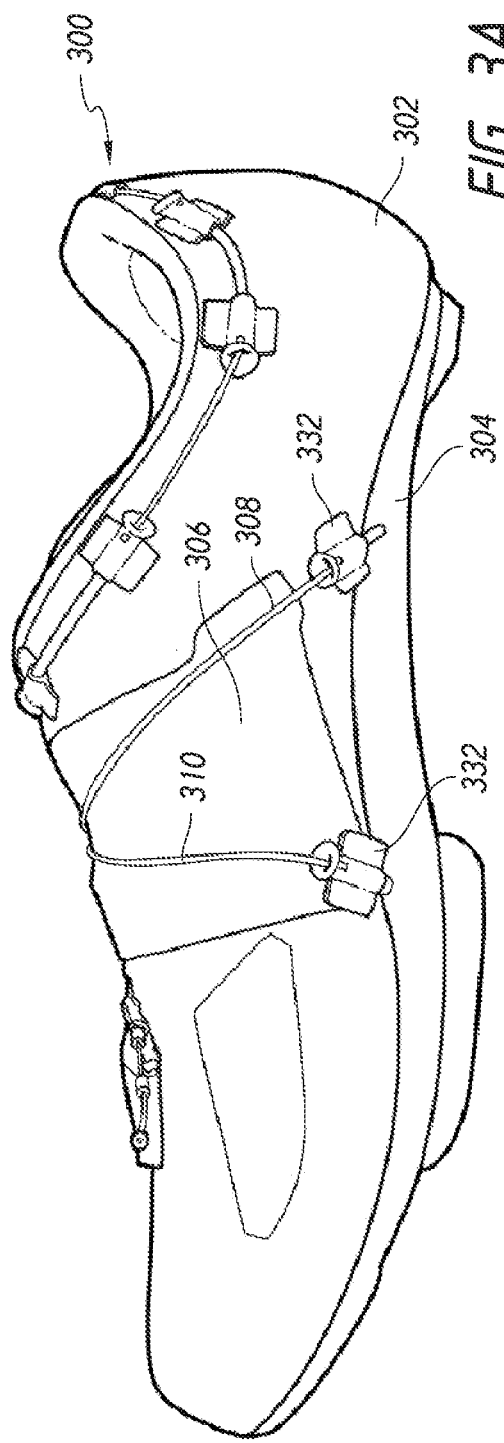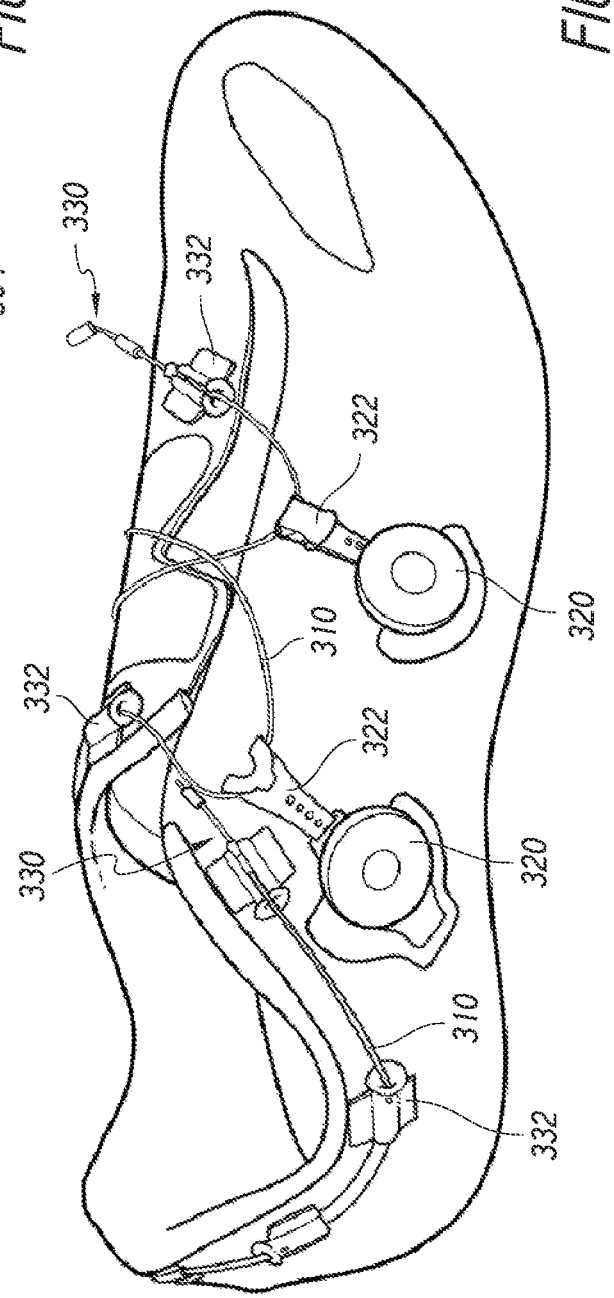

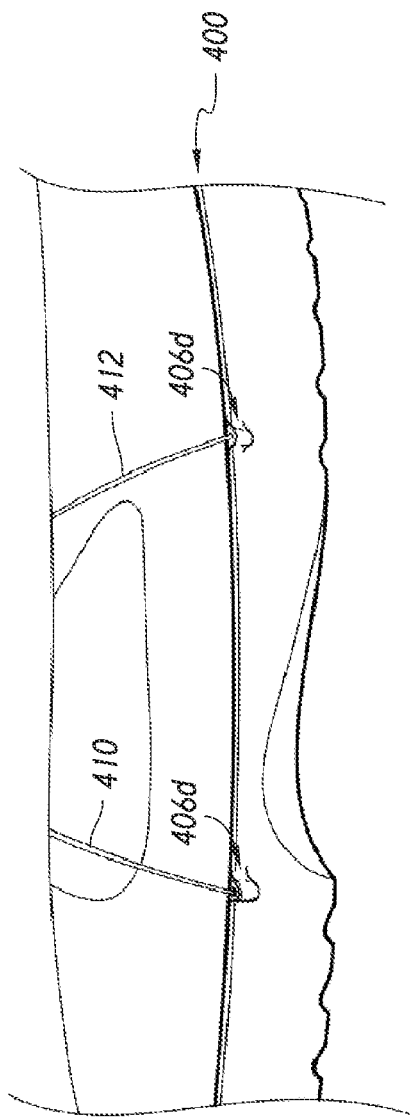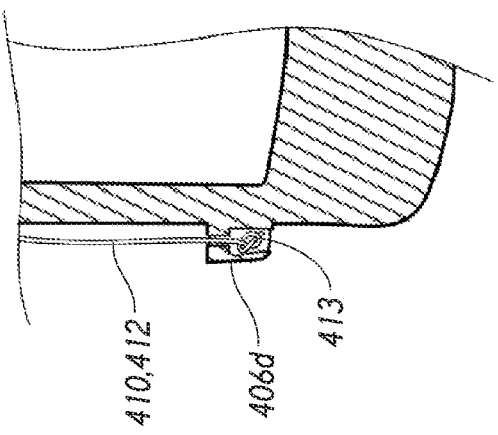

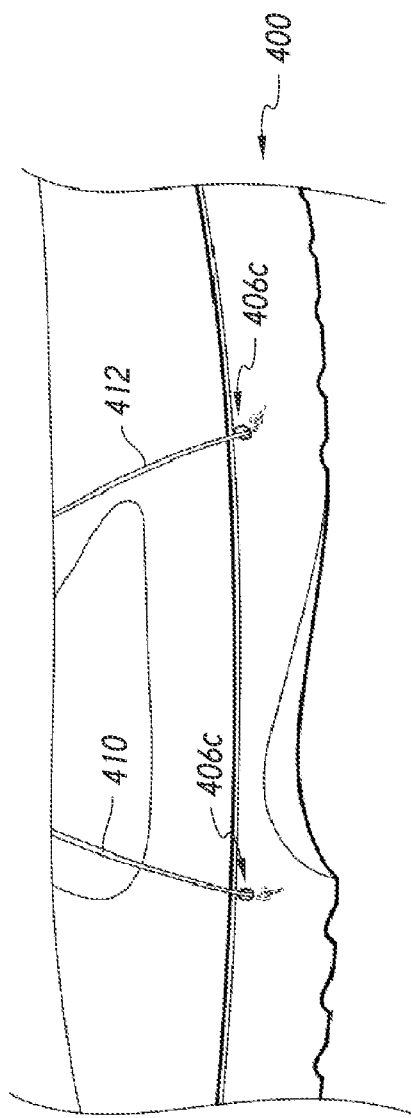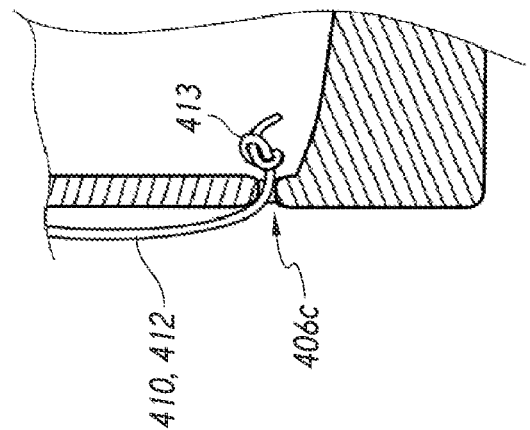

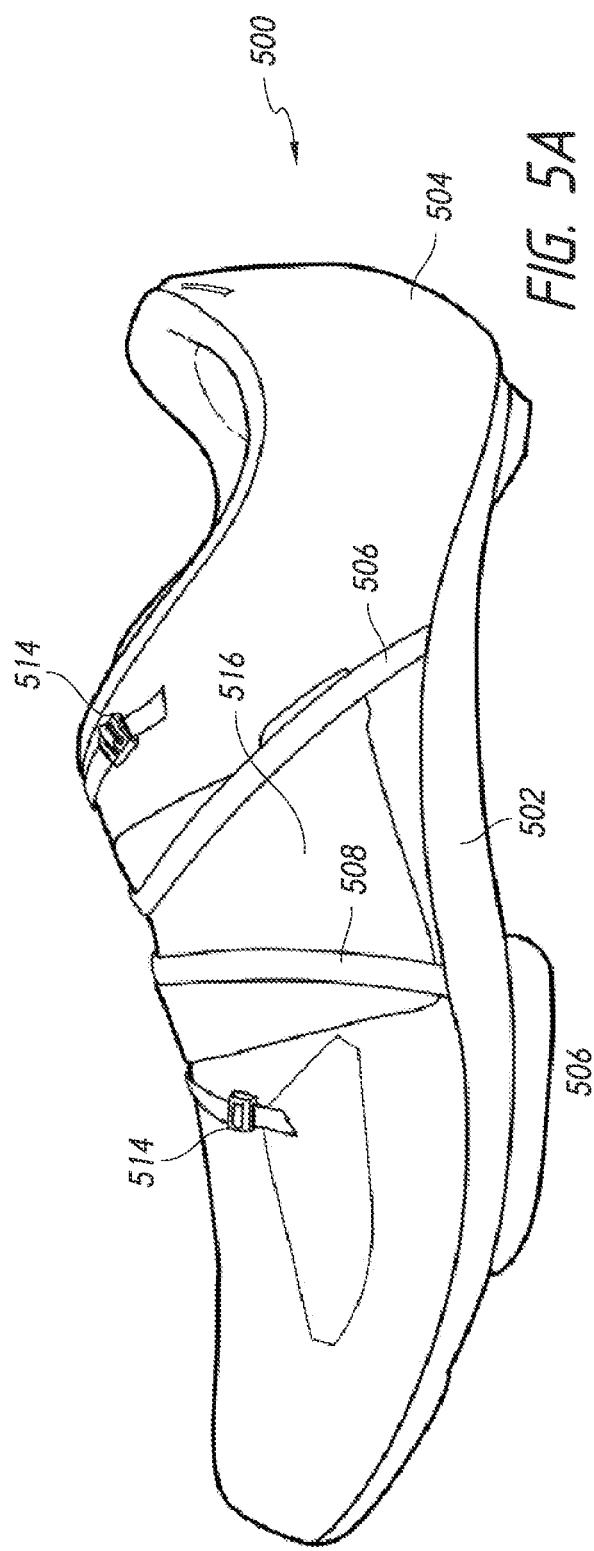
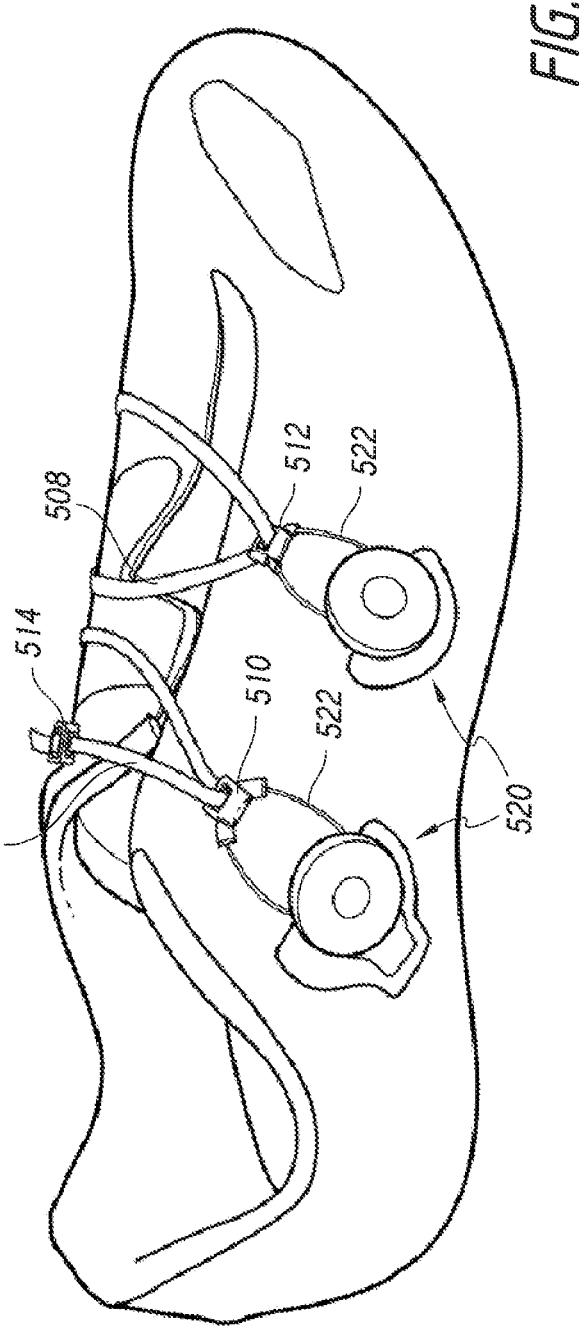

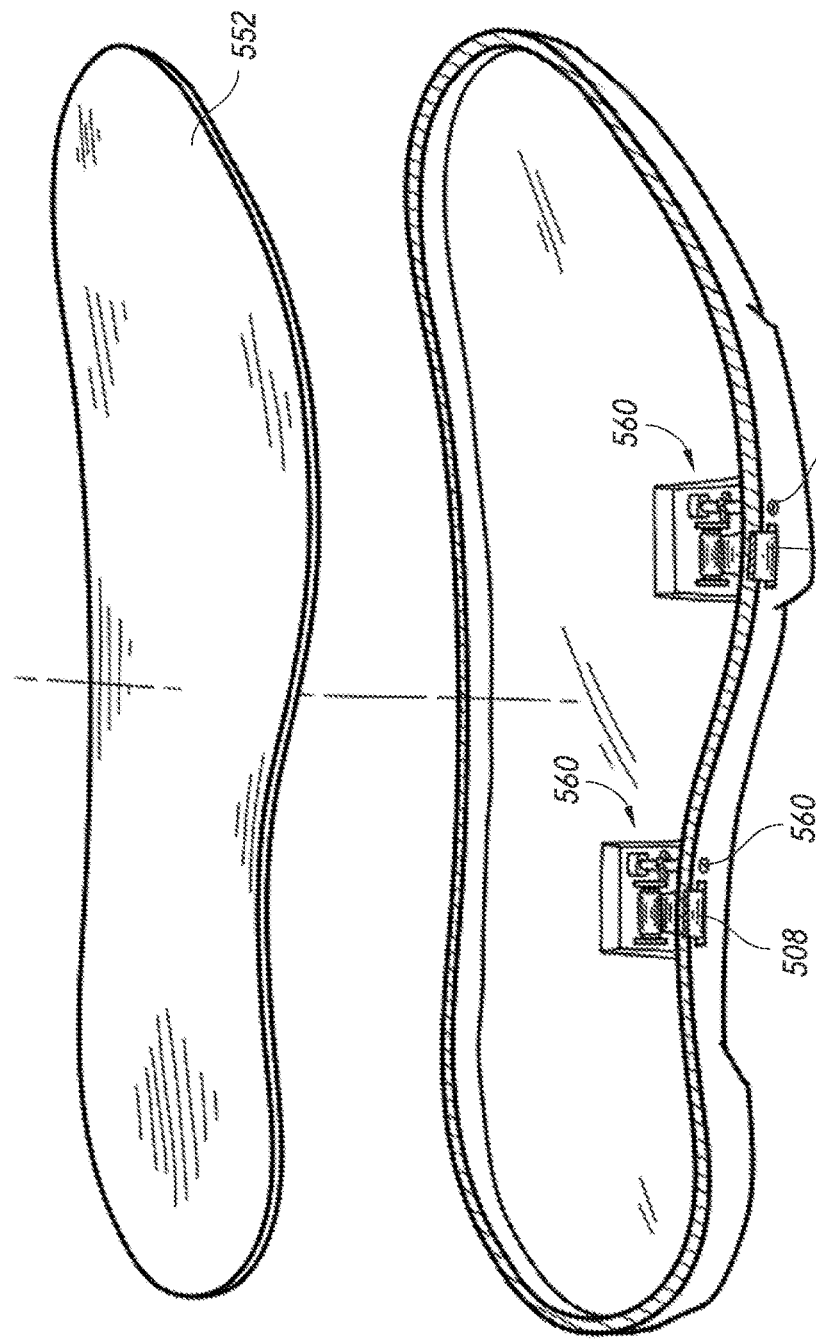
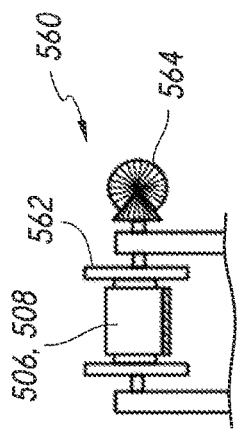
FIG. 5H
FIG. 5I

DEVICES, METHODS, AND SYSTEMS FOR REMOTE CONTROL OF A MOTORIZED CLOSURE SYSTEM

CROSS-REFERENCE TO RELATED APPLICATIONS

This application claims priority to U.S. Provisional Patent Application No. 62/061,005 filed Oct. 7, 2014, entitled "Cycling Shoe and Closure Devices Therefor", U.S. Provisional Patent Application No. 62/102,982 filed Jan. 13, 2015, entitled "High and Low Lacing Configurations", and U.S. Provisional Patent Application No. 62/173,285 filed Jun. 9, 2015, entitled "Devices, Methods, and Systems for Remote Control of a Motorized Closure System." The entire disclosure of the aforementioned U.S. Provisional Patent Applications are hereby incorporated by reference, for all purposes, as if fully set forth herein.

BACKGROUND OF THE INVENTION

This invention relates generally to motorized closure devices and more specifically to various mechanism that may be used to actuate the motorized closure devices and thereby tighten an article.

Closure devices are often used to close and tighten articles, such as shoes, boots, medical or sports braces, equipment, apparel, and the like. Most closure devices that are used to close and tighten the article are manual devices, such as shoe laces, pull cords, reel based closure devices, and the like. In some instances, motorized units have been used to close and tighten the article. The motorized and/or manual closure device may be operably coupled with a tension member, lace, or cord so that operation of the motorized and/or manual device tensions or loosens the tension member, lace, or cord. Operation of the motorized and/or manual device often requires the user to directly contact the device, such as by grasping and rotating a knob of the device. In some instances, increased ease of operating the closure device is desired.

BRIEF DESCRIPTION OF THE INVENTION

According to one aspect, a tension adjustment mechanism is provided. The tension adjustment component includes a tension input component that is coupled with a bicycle in an area that is easily accessible to a user's hands. The tension input component is configured to receive input corresponding to an adjustment of a motorized tensioning device for a shoe. The shoe includes: a main body that is configured to be fit about a foot of the user, a tension member coupled with the main body such that tensioning of the tension member effects tightening of the main body about the user's foot, and the motorized tensioning device. The motorized tensioning device is operably coupled with the tension member and is configured to adjust the tension member in accordance with the input received from the tension input component, which tightens or loosens the main body about the user's foot.

According to another aspect, a mechanism for wirelessly adjusting tension of an article is provided. The mechanism includes a tension input component that is coupleable with a vehicle in an area that is easily accessible to a user, which enables the tension input component to easily receive input corresponding to an adjustment of a motorized tensioning device that is attached to the article. The motorized tensioning device is configured to adjust a tension of a tension member and thereby tighten or loosen the article in accordance with the input received from the tension input component. The input received at the tension input component is wirelessly transmitted to the motorized tensioning device.

According to another aspect, a method for adjusting the fit of a shoe is provided. The method includes providing a shoe that includes: a main body configured to be fit about a foot of a user, a tension member that is coupled with the main body so that adjusting a tension of the tension member effects tightening or loosening of the main body about the user's foot, and a motorized tensioning device that is operably coupled with the tension member and that is configured to adjust the tension of the tension member to effect tightening or loosening of the main body about the user's foot. The method also includes receiving input via a tension input component that is coupled with a vehicle in an area that is easily accessible to a user's hands, where the received input corresponds to an adjustment of the tension of the tension member. The method further includes transmitting information from the tension input component to the motorized tensioning device in accordance with the input received via the tension input component to effect adjustment of the tension of the tension member and thereby tighten or loosen the main body about the user's foot.

BRIEF DESCRIPTION OF THE DRAWINGS

The present invention is described in conjunction with the appended figures:

FIGS. 4A-4J illustrate various methods that may be used to couple or attach a lace or tension member with a shoe.

FIGS. 5A-5I illustrate embodiments of shoes that include straps instead of or in addition to lace.

FIGS. 20A-22C illustrate various controls or user interfaces that may be used to tighten or tension a shoe or other article via a motorized tensioning device in which FIGS. 20A-K illustrate embodiments of remote control devices positioned on handle bars of a bicycle, FIGS. 22A-C illustrate embodiments of remote control device positioned elsewhere.

Figures 1C, 1D:
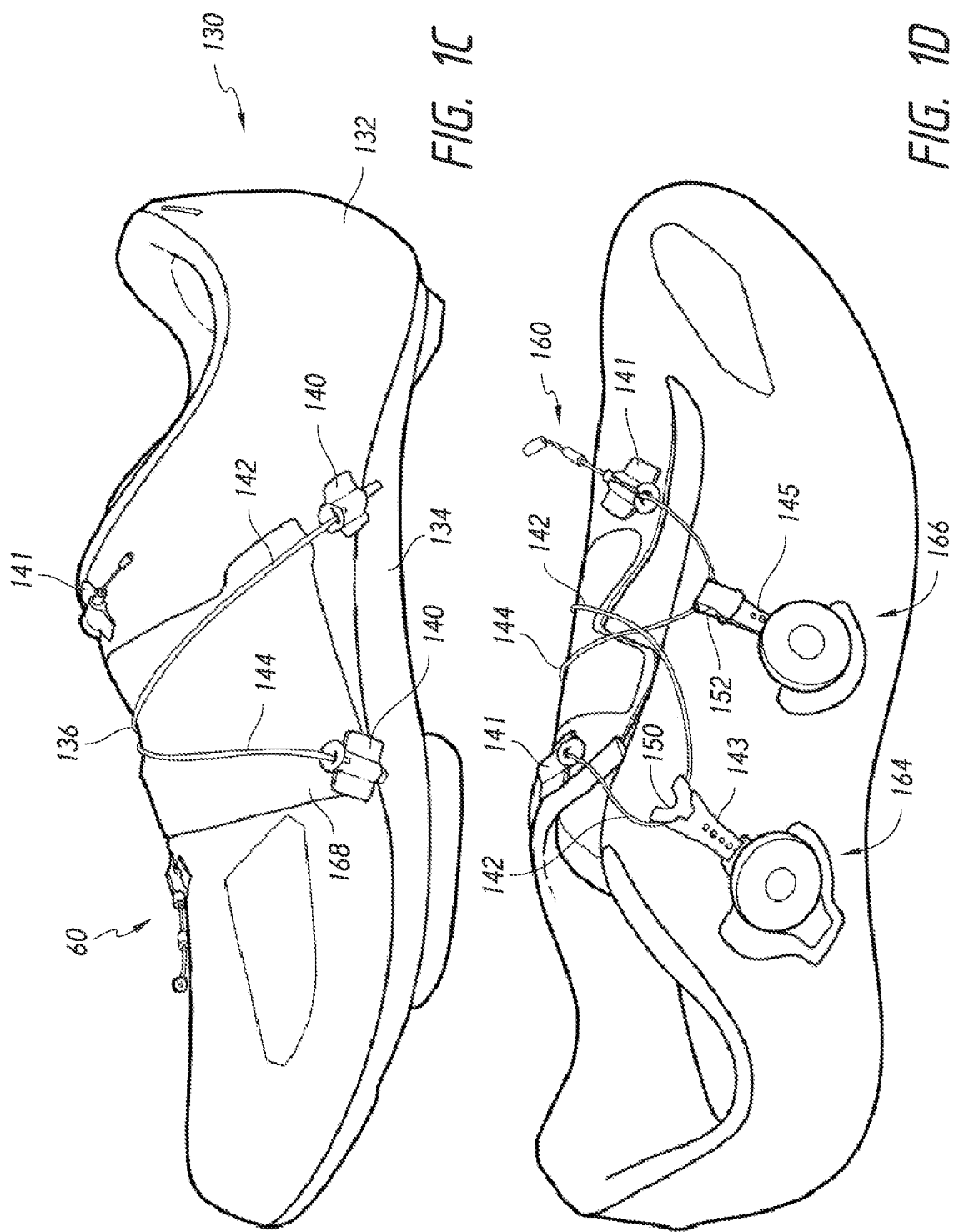
FIGS. 1A-3D illustrate exemplary embodiments of lace or tension member configurations about a shoe.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims. For ease in describing the various embodiments herein, the disclosure will be directed mainly toward the closure of footwear and specifically various shoes. It should be realized, however, that the closure device configurations, mechanisms, and/or motorized device user interfaces may be used to close and/or tighten various other articles. As such, the applicability of the disclosure herein is not limited to embodiments involving shoes or footwear.

High/Low Lace Guide/End Configurations

FIGS. 1A-3D and 10A-19 are directed to exemplary embodiments of configurations of lace or tension members (hereinafter lace) about a shoe. The embodiments illustrated in FIGS. 1A-3D and 10A-19 may improve the fit and/or closure of the shoe about a user's foot. The various lace configurations illustrated in FIGS. 1A-3D and 10A-19 are illustrated using manual reel based closure devices. In other embodiments, a motorized device, such as that illustrated in FIG. 6, may be used in place of the manual closure device. In such embodiments, the user interface or tension adjustment mechanism illustrated in FIGS. 20A-22C may be used to control the motorized device.

Referring again to FIGS. 1A-3D and 10A-19 the illustrated embodiments may provide improved comfort and/or functionality of the shoe or article. In a specific embodiment, the embodiments may improve the functionality and/or fit of cycling shoes. Among other things, the improvements of the cycling shoe may include: the ability to quickly and easily adjust the tightness of the shoe during use, the ability to sense activity conditions or use of the shoe and automatically respond appropriately, increased fit of the shoe about the foot, increased comfort during wearing of the shoe, increased tightness of the shoe about the foot, and the like. Improved comfort and/or fit may be realized in other non-cycling shoes as well. For example, using the embodiments described herein, the medial surface of the shoe may be pulled or pressed against the medial surface of the user's foot, which may increase the overall contact of the shoe with the foot and provide a comfortable or desired sock like feel.

Closure of the shoe is typically achieved via a tensioning system that may include conventional shoelace, a pull cord system, a reel based tensioning system, and the like. In many of the embodiments described herein, closure of the shoe is achieved via a reel based tensioning system that includes a reel assembly that may be operated to tension or tighten lace. The lace is commonly a wire-like elongate material, or strap, that is wrapped or positioned around or along the shoe via one or more lace guides that are configured to guide or direct the lace along or about the shoe. The lace and lace guides form a lace path about the shoe. Tensioning of the lace causes the shoe to close and/or tighten about the user's foot, typically by pulling or urging opposing lace guides toward one another. The opposing lace guides are typically positioned on opposing sides of an opening of the shoe, such as the tongue. Conventional closure of tensioning the edge of a shoe upper does not enable the material to conform about the user's foot.

The reel assembly often includes a knob or tightening mechanism that may be rotated, or otherwise operated, to wind the lace around a spool of the reel assembly and thereby tension the lace. In some embodiments, rotation of the knob in an opposite direction causes the lace to unwind from the spool and thereby release tension on the lace. Exemplary embodiments of reel based tensioning systems are described in the following U.S. Patent Applications, the entire disclosures of which are incorporated by reference herein: U.S. patent application Ser. No. 13/343,658, filed Jan. 4, 2012, entitled "Reel Based Closure System," U.S. patent application Ser. No. 13/273,060, filed Oct. 13, 2011, entitled "Reel-Based Lacing System," and U.S. patent application Ser. No. 13/098,276, filed Apr. 29, 2011, entitled "Reel Based Lacing System."

In some embodiments, the fit or closure of the shoe about the foot is improved by positioning the lace guides, or terminating the lace ends, at varying positions about the shoe. For example, the lace guides, or lace ends, may be positioned at staggered "high" and "low" positions relative to the shoe. The term "high point or position" as used herein with reference to the lace guides and/or lace ends means that the lace guide/lace ends are positioned at or near the eyestay of the shoe, typically within 10 cm of an edge of the eyestay, and more commonly within 1 cm of the edge of the eyestay. The term "low point" as used herein with reference to the lace guides and/or lace ends means that the lace guide/lace ends are positioned away from the eyestay of the shoe and commonly near the outsole, typically within 1 cm of the outsole or within 1 cm of the interface between the outsole and upper. In some embodiments, the lace guide/lace ends may be positioned within the outsole.

Staggering of the lace guides/lace ends in this manner distributes the lace force or lace load relatively uniformly between pulling on the edge of the upper while also pulling or pressing the shoe's material against the foot. In some embodiments, the high point lace guides/lace ends function to distribute the lace force or load while the low point lace guides/lace ends pull or press the shoe's material against the foot. For example, because the low point lace guides/lace ends extend beyond the eyestay and to near the outsole, the shoe's material is pulled or pressed against the foot as the lace is tensioned. This configuration causes increased contact between the shoe's material and the user's foot, which may increase the comfort and/or fit of the shoe. Stated differently, the configuration minimizes gaps between the user's foot and the shoe's material, which provides a sock-like feel that may increase user comfort.

In some embodiments, the high and low point lace guides may be paired so that one or more independent closure zones are created about the shoe. The independent closure zones may prevent dynamic shifting of the lace due to tensioning of the lace and/or flexing of the shoe. For example, while the lace is able to dynamically shift within a given closure zone, the lace does not necessarily shift due to lace tension and/or shoe flexing in an adjacent closure zone because the closure zones are independent from one another. As such, upper or lower portions of the shoe, such as near the heel and toe respectively, may maintain a set and desired lace tension as the user engages in various activities and/or flexes the shoe.

Having described several embodiments generally, additional aspects and features of the shoes and/or the closure devices will be evident with reference to the description of the several figures provided hereinbelow.

Figure 1E:
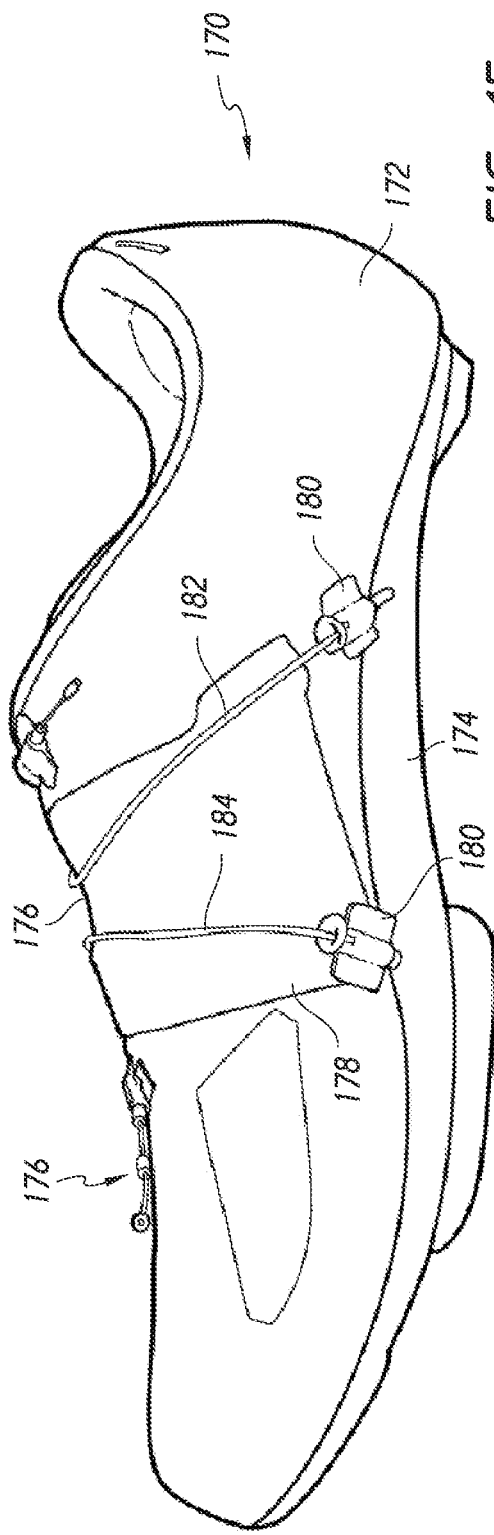
Figure 1F:
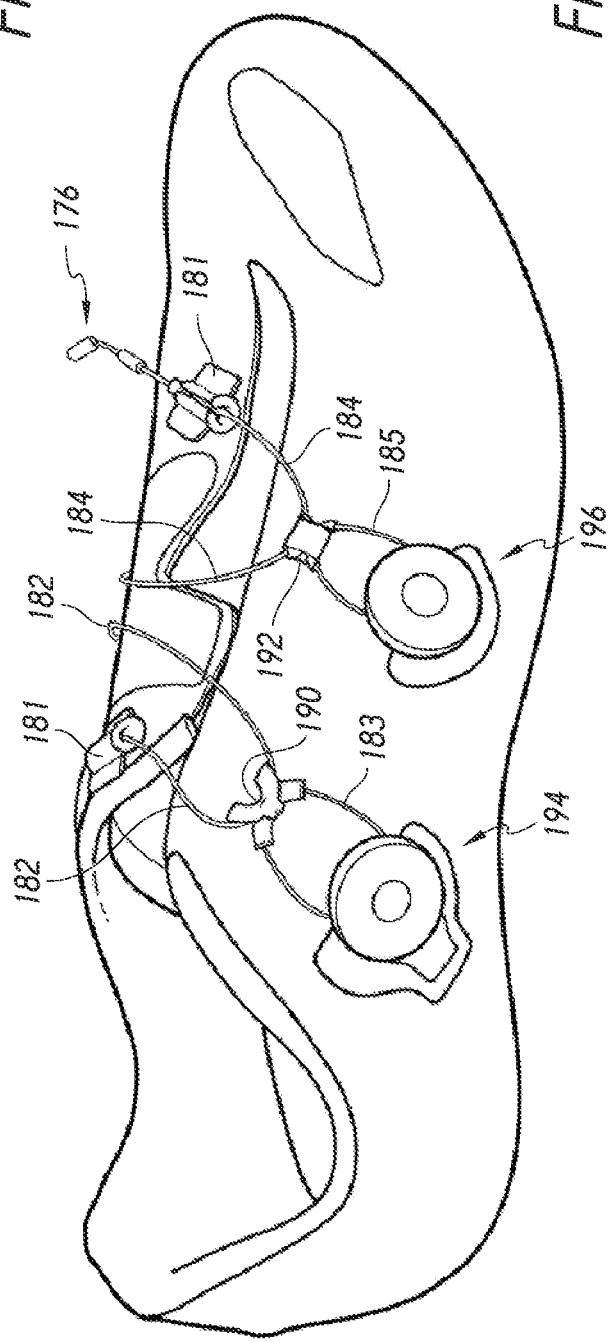
Figure 2A:
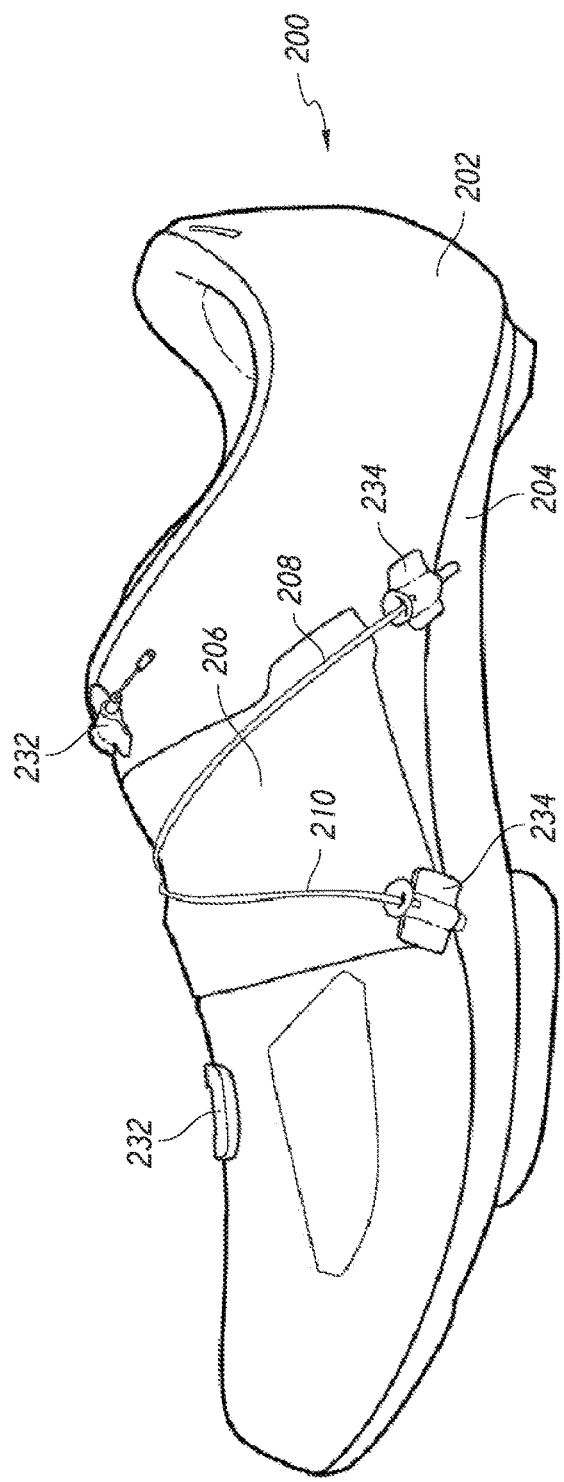
Figure 2B:
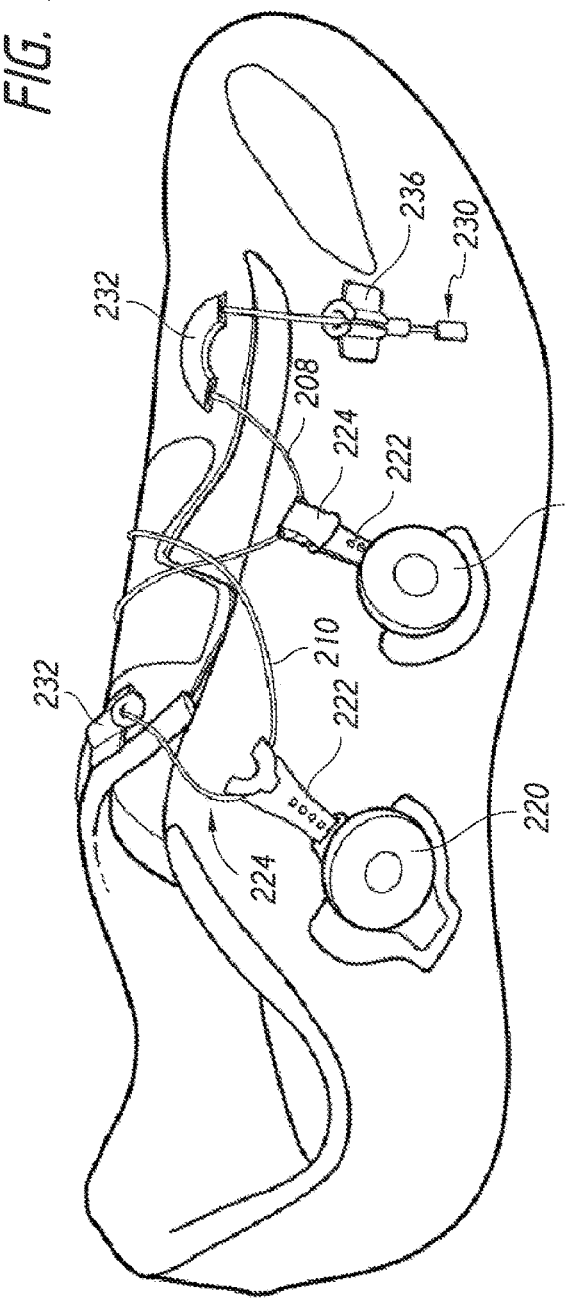

Referring now to FIGS. 1E and 1F, illustrated is an embodiment of a shoe 170 having a lacing system coupled therewith. The shoe 170 includes an outsole or sole 174 and an upper 172 coupled or attached to the outsole 174. A first reel assembly 194 and a second reel assembly 196 are coupled with the upper 172 near the lateral side of the shoe 170. The first and second reel assemblies, 194 and 196, include a knob, a spool, a housing, and the like as described in the '658, '060, and '276 patent applications incorporated herein. The knob of the first reel assembly 194 may be operated to tension a first lace 183 while the knob of the second reel assembly 196 may be independently operation to tension third lace 185.

The first lace 183 is coupled with a proximal end of a first transition guide 190. A distal end of the first transition guide 190 is coupled with second lace 182. Operation of the knob of first reel assembly 194 tensions first lace 183, which causes first transition guide 190 to be pulled toward first reel assembly 194. First transition guide 190 transfers the lace tension of first lace 183 to second lace 182. Similarly, the third lace 185 is coupled with a proximal end of a second transition guide 192 while a distal end of the second transition guide 192 is coupled with a fourth lace 184. Operation of the knob of second reel assembly 196 tensions third lace 185, which causes second transition guide 182 to be pulled toward second reel assembly 196. Second transition guide 192 transfers the lace tension of third lace 185 to fourth lace 184.

The second lace 182 and the fourth lace 184 each include a first end that is coupled with a high point guide 181 and a second end that is coupled with a low point guide 180. The high point guides 181 are positioned on or near the eyestay 176 of the shoe 170, such as within 1 cm of the eyestay 176, 170 while the low point guides 180 are positioned away from the eyestay 176 and on or near the outsole 174, such as within 1 cm of the outsole 174 or within 1 cm of an interface between outsole 174 and upper 172. In other embodiments, the low point guides 180 may be positioned within the outsole 174.

In the embodiment illustrated in FIGS. 1E and 1F, the low point guides 180 are each positioned on a medial side of shoe 170 near the first metatarsal and heel respectively. It should be realized that these positions are for illustrative purposes only and that the low points guides 180 may be positioned elsewhere on or near the outsole 174 as desired, such as closer to or adjacent the toes and/or closer to the heel of the shoe 170.

Separate and independent closure zones are formed about shoe 170 with each closure zone including a reel assembly (i.e., first or second reel assembly), a high point lace guide 181, a low point lace guide 180, and lace (i.e., second or fourth lace). The separate closure zones are independently tightenable about the foot by operating the respective reel assembly. Further, as described above, the lace tension and/or shoe flexation within one of the closure zones does not necessarily affect the tightness of the adjacent closure zone and/or cause lace shifting within the adjacent closure zone. In this manner, the tightness in each closure zone may be maintained at a set and/or desired level. Stated differently, the closure force in each zone is independent of the other zone(s). However, the second lace 182 and the fourth lace 184 are able to dynamically shift within the respective closure zones by sliding within a channel (not shown) of first transition guide 190 and second transition guide 192, respectively. Shifting of the second lace 182 and the fourth lace 184 within the respective zones allows the lace tension or load to be balanced within the closure zone between the high point lace guide 181 and the low point lace guide 180, thereby preventing increased or uneven pressure on one of the lace guides.

In other embodiments, the multiple closure zones may be tensioned by a single reel assembly or motorized tensioning device. In such embodiments, each zone may remain independent and non-dynamic if the individual laces extend to the load balance guides and are terminated—i.e., the lace ends 183 and 185 terminate from each side of the tensioning mechanism to guide 190 and 192.

Because each closure zone includes both a high point lace guide 181 and a low point lace guide 180, each closure zone is able to close and tighten both an upper and lower portion of the shoe. Further, each closure zone is able to pull the opposing eyestays together via the high point lace guides 181, while pulling or pressing the outer surface or material of the shoe's (e.g., the medial side of the shoe) against the user's foot via the low point lace guides 180. The shoe's outer surface or material is pulled or pressed against the foot due to positioning the second and fourth lace, 182 and 184, across the tongue opening and along the shoe's outer surface or material to a respective low point lace guide 180. Tensioning of the laces causes the laces to press against the shoe's outer surface or material, which presses the outer surface or material against the user's foot. In this manner, the outer surface of the shoe conforms to or fits about the foot. Conventional lacing system typically do not conform or fit the shoe to the foot in this manner as conventional systems typically pull on the shoe's material from near the eyestay. Further, other lacing systems do not pull on the shoe's material from both near the eyestay and near the outsole and, thus, do not provide a balanced closure and/or tightening of the shoe from these positions.

To distribute the lace force about the shoe's outer surface or material, a panel 178 may be coupled with the shoe's outer surface. In some embodiments, the panel 178 is a relatively dense fabric material that is flexible yet firm enough to distribute the force exerted on the shoe's outer surface by the tensioned lace. In some embodiments, the panel 178 may include a low friction material that allows the lace to slide longitudinally along the panel 178 surface. The term longitudinally as used herein means a direction corresponding to a direction from the toe to the heel. In other embodiments, the panel 178 material may include various plastics, fabric, and/or a combination thereof as desired. The configuration of the panel 178 may also be modified to fit a specific need and/or provide a desired functionality. For example, the panel 178 may be relatively thin and/or small as illustrated in some embodiments herein to provide a desired point force or load, or multiple panel sections could be used for each closure zone. One or more portions of the panel 178 may be open or flexible to allow the panel 178 to flex and/or conform to the foot in a desired manner.

In some embodiments, the panel 178 and/or second and fourth laces, 182 and 184, may be positioned under an outer material of the upper 172 so that the panel 178 and/or laces are hidden from view. Such a configuration prevents the laces from contacting external objects, such as the crank of a bicycle, which may damage the laces. This configuration may also provide a cleaner and more appealing visual appearance for the shoe 170.

In some embodiments, the panel 178 or upper 172 may include a lace guide (not shown) or other component that prevents or limits longitudinal movement of the lace about or along the panel 178. Preventing or limiting movement of the lace about the panel 178 may be used to hold the foot in position within the shoe 170 as described hereinbelow. In some embodiments, the lace guide or other component of panel 178 may be formed via stitching, RF welding, adhesive bonding, and the like as described in the '173 Patent Application incorporated by reference herein.

In some embodiments, the position of the second and/or fourth laces, 182 and 184, across the shoe's outer surface may be configured or arranged to hold the foot in position within the shoe 170. For example, as illustrated, the fourth lace 184 may be positioned to extend across the shoe's outer surface adjacent the first metatarsal. As the fourth lace 184 is tensioned, the fourth lace 184, and thus the shoe's outer surface, may be pressed against the first metatarsal to hold the foot in position within the shoe 170 and prevent rearward or backward movement of the foot toward the heel counter. The second and/or fourth lace, 182 and 184, may be positioned elsewhere about the shoe 170 as desired to provide a similar foot hold. In this manner, the overall fit of the shoe 170 may be improved.

In some embodiment, the first and/or second reel assemblies, 194 and 196, may be replaced with other tightening mechanisms. For example, a spiral-type reel assembly may be used in place of the first and/or second reel assemblies, 194 and 196. As shown in FIGS. 1C and 1D, the spiral-type reel assembly uses a strap, 143 and 145, instead of lace. Operation of the spiral-type reel assemblies, 164 and 166, causes a respective strap, 143 and 145, to move radially inward and outward relative to the reel assemblies, 164 and 166. Exemplary embodiments of spiral-type reel assemblies are further described in U.S. patent application Ser. No. 12/355,675, filed Jan. 16, 2009, entitled "Closure System," the entire disclosure of which is incorporated by reference herein.

In other embodiments, a motorized lace tensioning mechanism may be used in place of the first and/or second reel assemblies, 194 and 196. The motorized lace tensioning mechanism may include an electric motor that rotates a spool about which the lace is wound. The motorized lace tensioning mechanism may be controlled via a wired or wireless connection. In some embodiments, the shoe may include one or more control buttons that may be used to actuate the electric motor and/or include an external controller that actuates the electric motor. Other aspects of motorized lace tensioning mechanisms are described below.

In some embodiments, any or all of the above laces may be replaced with webbing, straps, and the like. The webbing, straps, and the like, may be wider than the lace, which may help distribute the load or tension force about the shoe 170 and foot. In other embodiments, the lacing system(s) may include a combination of small diameter lace and larger width webbing, straps, and the like. For example, small diameter lace may be coupled with the reel assembly while larger width webbing, straps, and the like are positioned across the shoe's surface. Conventional shoelace and/or pull cords may also be used instead of, or in addition to, the reel assemblies, 194 and 196, to tension lace and/or straps.

In some embodiments, the second and/or fourth lace, 182 and 184, may include a gross or macro adjustment mechanism that allows an initial gross or macro adjustment or closure of the shoe 170 to be performed. This may be particularly useful if the reel assemblies are replaced with either a single reel or with a motorized device that pulls on the laces at the same rate. The gross or macro adjustment mechanism may also be useful when a reel based closure system is used that has limited lace capacity or stroke. The gross or macro adjustments help create a "preferential zonal" fit in such embodiments. FIGS. 1E and 1F illustrate a distal end of the fourth lace 184 including a gross/macro adjustment mechanism 176. The illustrated gross adjustment mechanism 176 includes a plurality of crimp components that are coupled with a distal end of the fourth lace 184. Similarly, the high point lace guide 181 that couples with the distal end of the fourth lace 184 includes an open channel that allows the distal end of the fourth lace 184 to be removed from the lace guide 181, pulled distally or tensioned, and repositioned within the lace guide 181. The distal end of the fourth lace 184 may be repositioned to position one of the plurality of crimp components within or adjacent the lace guide 181. The crimp components prevent the distal end of the fourth lace 184 from being pulled proximally through the lace guide 181 and uncoupled therefrom. As the fourth lace's distal end is pulled distally and a more proximal crimp component positioned within or adjacent the lace guide 181, the shoe 170 is closed by varying degrees. The portions of the fourth lace's distal end that are positioned distally of the lace guide 181 may then be cut or separated and discarded. In this manner, a gross or macro initial adjustment of the fourth lace 184 may be achieved. Those of skill in the art will recognize that the second lace 182 and/or any of the laces described herein may similarly include a gross or macro adjustment mechanism.

Other gross or macro adjustment mechanisms may be used instead of, or in addition to, that shown in FIGS. 1E and 1F. Exemplary embodiments of gross or macro adjustment mechanisms are further described in U.S. patent application Ser. No. 14/073,773, filed Nov. 6, 2013, entitled "Devices and Methods for Adjusting the Fit of Footwear," the entire disclosure of which is incorporated by reference herein.

Referring now to FIGS. 1A and 1B, illustrated is another embodiment of a shoe 100 having relatively small lace termination points or guides 106 (hereinafter termination point). Shoe 100 has an outsole 104 and an upper 102 coupled with the outsole 104. Shoe 100 also includes a pair of reel assemblies 120 that may be similar to the spiral-type reel assembly described in the '675 application incorporated herein. A strap 122 is operationally coupled with a respective reel assembly 120 as described in the '675 application. A first lace 110 and second lace 112 extend from the respective reel assemblies and across the outer surface of the shoe 100 as described herein.

A first end of each lace, 110 and 112, is coupled with a low point termination point 106a while a second end of each lace, 110 and 112, is coupled with a high point termination point 106b. The termination points, 106a and 106b, are relatively small materials or points compared with other lace guides. FIGS. 4A-J illustrate various embodiments of termination points, 106a and 106b, and/or of attaching or coupling the lace ends directly with the upper 102 or outsole 104 of the shoe 100.

A portion of each lace, 110 and 112, that couples with the low termination point 106a traverses across an outer surface of the medial side of the shoe. The laces, 110 and 112, may traverse across a panel 108 that is coupled with the shoe's outer surface. The panel 108 may be a relatively dense fabric material that is flexible yet firm enough to distribute the force exerted on the shoe's outer surface by the tensioned laces, 110 and 112, as described in greater detail herein. The portion of each lace, 110 and 112, traversing across the outer surface of the medial side of the shoe pulls or presses the upper material 102 at or near this region inward and against the surface of the foot. As shown in many of the embodiments herein, the laces, 110 and 112, are often positioned adjacent the arch of the foot so that the upper material 102 of the shoe 100 is pressed inward and against the foot's arch.

Since the foot's arch typically has a three dimensional concave or arcuate geometry, a gap commonly exists in conventional shoes between the upper material and the foot's arch. Due to the concave or inwardly curved foot geometry, it is difficult to design or configure a shoe to sufficiently contact this portion of the foot. The difficulty is further enhanced due to the unique configuration of each individual foot. The high-low lace configuration of the embodiments described herein eliminates or minimizes this gap by causing the upper material to be pressed inwardly against the concave or arcuate geometry of the foot as the lace is tensioned. The high-low lace configuration described herein compensates for the unique configuration of individual feet by pressing the shoe's material against the foot. The result is an increased sock-like fit of the shoe about the foot due to an increase overall contact between the shoe and the foot. The increased sock-like fit may increase the comfort of the shoe, decrease shifting or sliding of the foot within the shoe, increase lateral stability in any ball/court sports where side to side movements are common, increase the power transfer to the plate (i.e., sole of the shoe), add arch wrap/support resulting in increased support and/or decreased foot fatigue, and the like. Increased user performance may be realized as a result due to increased traction, decreased blister formation or foot irritation, increased sensitivity, and the like.

Referring now to FIGS. 1C and 1D, illustrated is another embodiment of a shoe 130 (e.g., cycling shoe) having an outsole 134 that is coupled with the upper 132. The shoe 130 includes multiple reel assemblies, 164 and 166, that use spiral-type assemblies as described in the '675 application. The spiral-type reel assemblies, 164 and 166, pull on respective straps, 143 and 145, as illustrated. The straps, 143 and 145, include transition guides, 150 and 152 respectively, that pull on first and second laces, 142 and 144 respectively, to transfer the tension in the straps, 143 and 145, to the first and second laces, 142 and 144. The first and second lace, 142 and 144, couple with high point lace guides 141 and low point lace guides 140 as described herein. A panel 168 may be positioned on an outer surface of the medial side of shoe 130 to distribute the force or load from first and second lace, 142 and 144. In some embodiments, a gross or macro adjustment mechanism 160 may be used to provide an initial gross closure and/or tightening of the shoe 130.

The shoe 130 of FIGS. 1C and 1D differs from the shoe of other embodiments in that the first and second laces, 142 and 144, crisscross near the eyestay and/or over a tongue portion of the shoe 130. In such a configuration, even though the two closure zones are independent, they each influence the other closure zone to some degree due to the crisscrossing first and second laces, 142 and 144. Stated differently, the first lace 142 and the second lace 144 each close and tighten a portion of the shoe near the heel and near the toe.

In certain circumstances the crisscrossing first and second laces, 142 and 144, may provide improved fit of the shoe 130 about a foot. For example, the crisscrossing laces may provide some longitudinal fit and/or closure of the lace about the foot to aid in conforming the shoe 130 to the unique shape and/or characteristics of the foot. The crisscrossing laces may also focus the force on the medial surface of the foot and/or elsewhere as desired.

Additional Closure Zones and/or Lace Crossings

Referring now to FIGS. 2A-2D, illustrated is another embodiment of a shoe 200 having an outsole 204 and an upper 202 coupled with the outsole 204. The shoe 200 includes the other features described herein, such as the reel assembly 220, strap 222, transition guide 224, first lace 208, second lace 210, upper lace guide 232, lower lace guides 234, and panel 206. A difference between the cycling shoe 200 of FIGS. 2A and 2B and some of the previous embodiments is that the first lace 208 does not terminate at the upper lace guide 232. Rather, the first lace 208 is directed back across the tongue opening via upper lace guide 232 to another lace guide 236. The redirection of the first lace 208 back across the tongue opening forms an additional lace crossing near the toe of the shoe 200. The additional lace crossing provides forefoot closure to aid in fitting and tightening the shoe 200 about the forefoot, which removes the need for a Velcro strap or other closure mechanism in the forefoot, thereby reducing the overall weight and/or providing convenience to the end user.

The additional lace crossing configuration of shoe 200 may be especially useful for shoes having longer eyestay lengths. The configuration may also provide improved fit of the shoe 200 while reducing the overall weight of the lacing system and/or shoe 200. As shown in FIGS. 2C and 2D, in some embodiments, a third reel assembly 240 may be coupled with lace 242 and a guide 244 to form the additional lace crossing and/or closure zone at the front of the shoe 200 so that three independent closure zones are formed. Such a configuration would keep the zones separate and independent and/or prevent or reduce shifting or movement in one of the zones from influencing the other zones. In other embodiments, additional lace crossings could be employed to provide additional fit and/or tightness in desired areas of the shoe. In some embodiments, the upper lace guide 232 that redirects the first lace 208 back across the tongue portion of the shoe could be a stitched or welded guide and the like as described in the '173 application incorporated herein. In some embodiments, a gross adjustment mechanism 230 of first lace 208 may be used with lace guide 236.

Figure 3C:
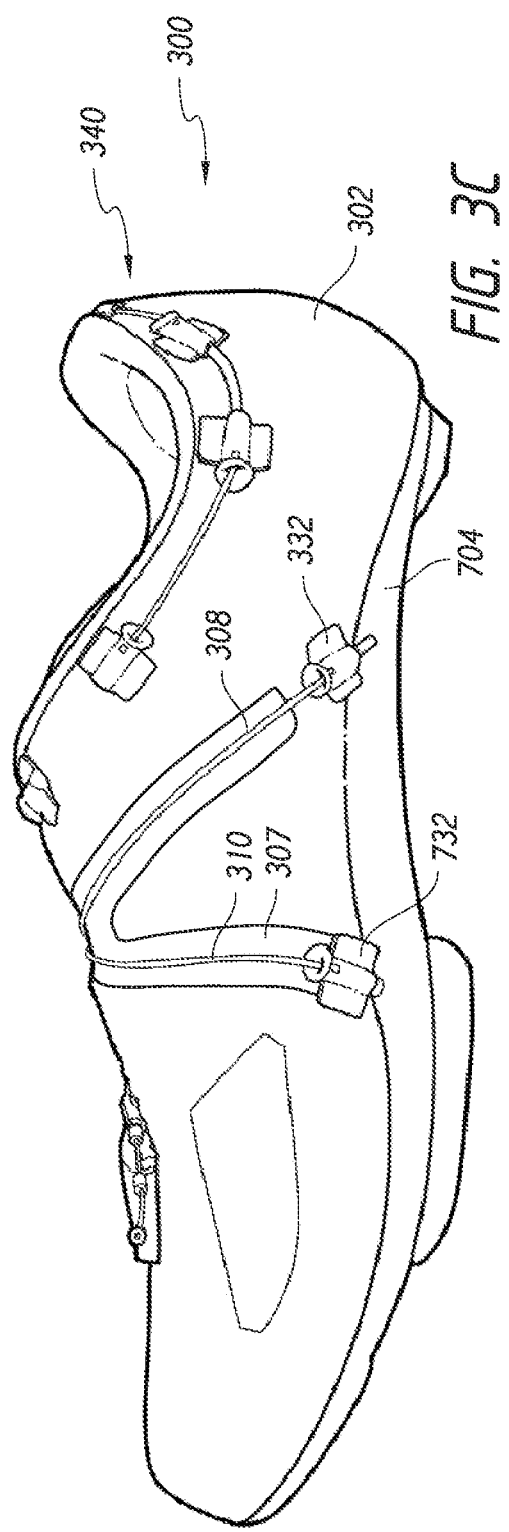
Figure 3D:
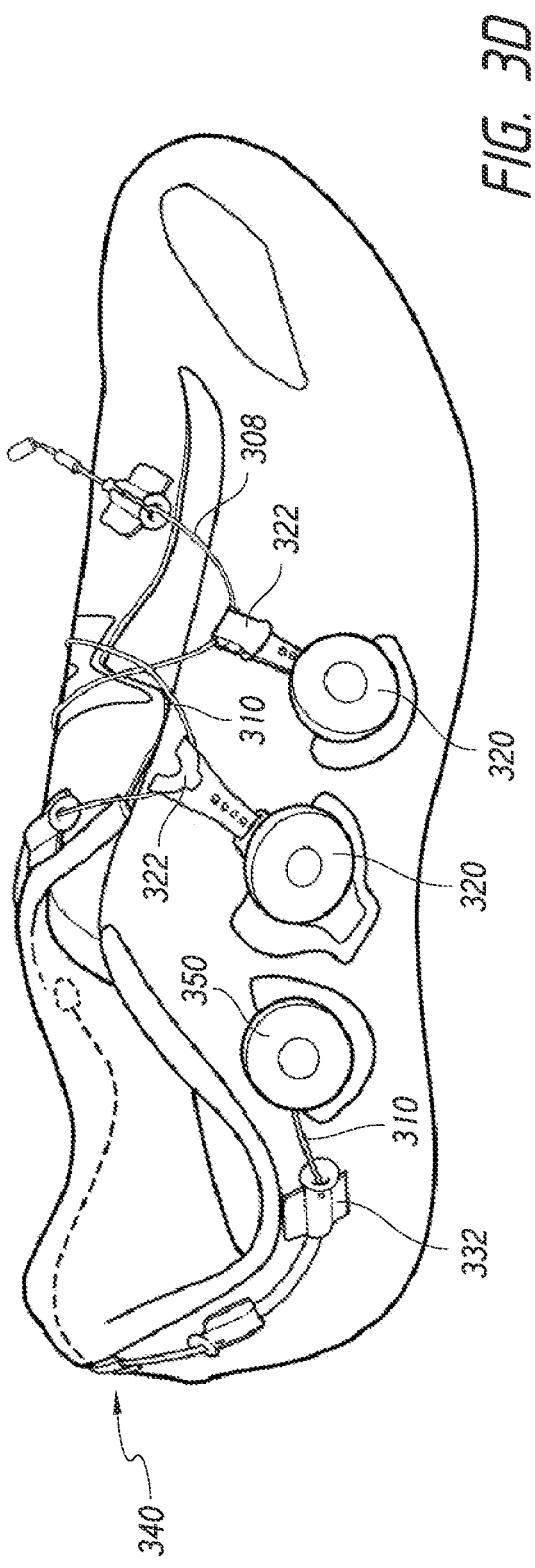

Referring now to FIGS. 3A-3D, illustrated is another embodiment of a shoe 300 having an upper 302 coupled with an outsole 304 and having the various other components described herein, such as a reel assembly 320, strap 322, transition guide (not numbered), first lace 308, second lace 310, upper and lower lace guides 332, panel 306, gross adjustment mechanism 330, and the like. As shown in FIGS. 3A and 3B, in some embodiments, the second lace 310 may be wrapped or positioned around the heel or collar 340 of the shoe 300 via one or more lace guides 332. In this embodiment, tensioning of the second lace 310 causes the collar or heel 340 of the shoe to compress or constrict about the heel of the foot in addition to tightening the upper and lower portion of the shoe 300 via upper and lower lace guides 332. The compression/constriction of the second lace 310 about the heel may improve the overall fit of the shoe 300 about the user's foot. In some embodiments, a distal end of the second lace 310 may include a gross adjustment mechanism 330 as described herein. As shown in FIGS. 3C and 3D, in other embodiments, the distal end of the second lace 310 may be coupled with a third reel 350. The third reel 350 may be used to provide gross adjustment of the second lace 310. As also shown in FIG. 3C, in some embodiments the panel 306 may be replaced with strips 307 that are positioned directly beneath the first and second lace, 308 and 310, and that distribute a pressure exerted by the respective laces.

Alternative Lace Ends, Coupling Methods, and/or Gross Adjustment Mechanism

Coupling of the lace ends with the shoe may occur in various manners. In some embodiments, the lace ends may be coupled with the shoe so that gross or macro closure of the shoe may be easily achieved. In other embodiments, the lace may be coupled with the shoe to allow the lace to be easily removed and replaced. FIGS. 4A-4J illustrate various methods that may be used to couple or attach the lace with the shoe and/or to provide gross or macro closure of the shoe.

Figure 4C:
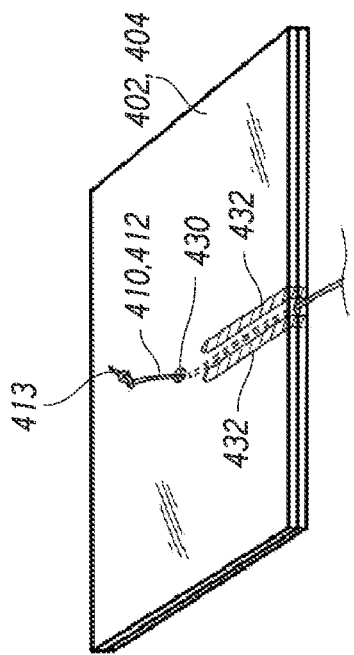
Figure 4D:
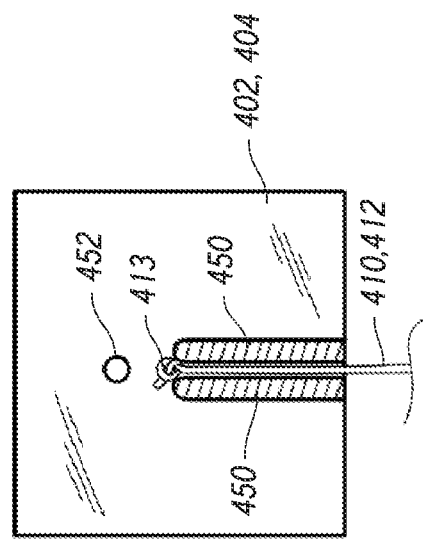
Figure 4A:
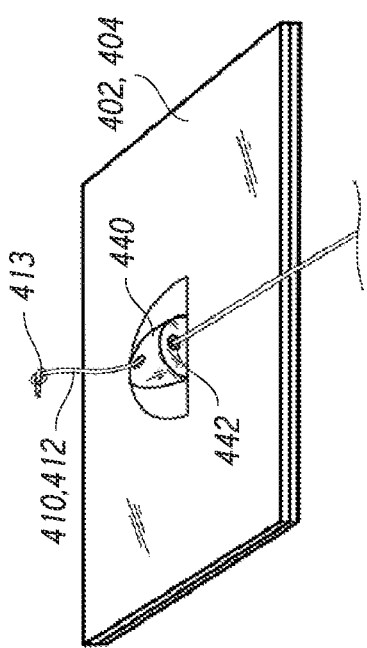
Figure 4B:
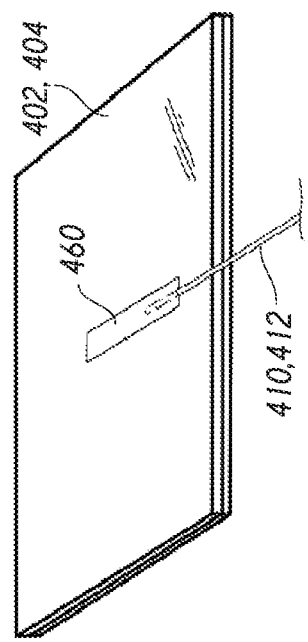

As shown in FIG. 4B, in some embodiments the lace ends 410/412 may be stitched 460 with the upper 402 or outsole 404, or may be adhesively bonding, RF welded, heat welded, and the like to the upper 402 or outsole 404 material. In some embodiments, the lace ends may include be pre-tipped with a weldable material (e.g., TPU and the like) or may include a knot or bulge that aids in stitching, welding, adhesive bonding, and the like, the lace ends to the shoe.

As shown in FIG. 4C, in other embodiments small holes or channels may be formed into the upper 402 or outsole 404 material. For example, a channel 432 may be formed via stitching, RF welding, heat welding, and the like as described in the '173 application incorporated herein. A hole or aperture 430 may be formed in or near the channel 432 and the lace end 410/412 may have a knot or bulge 413 that prevents the lace from being pulled through the hole/aperture 430 and/or channel 432. As shown in FIG. 4D, in some embodiments the knot or bulge 413 may be pulled within an aperture 452, but contact a channel 450 to prevent the knot/bulge 413 from further proximal movement.

As shown in FIG. 4A, in other embodiments a small housing 440 may be formed atop the upper and/or outsole material, 402 and 404. The housing 440 may include a lumen 442 that extends through the housing. The lace 410/412 may be inserted through the lumen 442 and a knot 413 tied at the distal end to prevent the lace 410/412 from being pulled proximally through the housing 440.

As shown in FIGS. 4E-4H, small guides may be coupled with the shoe or the shoe may include one or more apertures that function as the lace termination points. As shown in FIGS. 4E and 4F, in one embodiment a small housing 406d may be formed on the surface of the shoe 400. The housing 406d may include a recessed portion within which a knot or bulge 413 of a distal end of the lace 410/412 is positioned. The knot 413 may prevent the lace 410/412 from being pulled through the housing 406d. As shown in FIGS. 4G and 4H, in another embodiment the shoe may include one or more apertures or holes 406c. The lace 410/412 may be inserted through the aperture 406c and a knot 413 tied in the distal end of the lace 410/412. The knot 413 prevents the lace 410/412 from being pulled through the aperture 406c. The aperture 406c can also be present within the outsole of the shoe in addition to or in place of the aperture that is positioned on the upper.

Figure 4I:
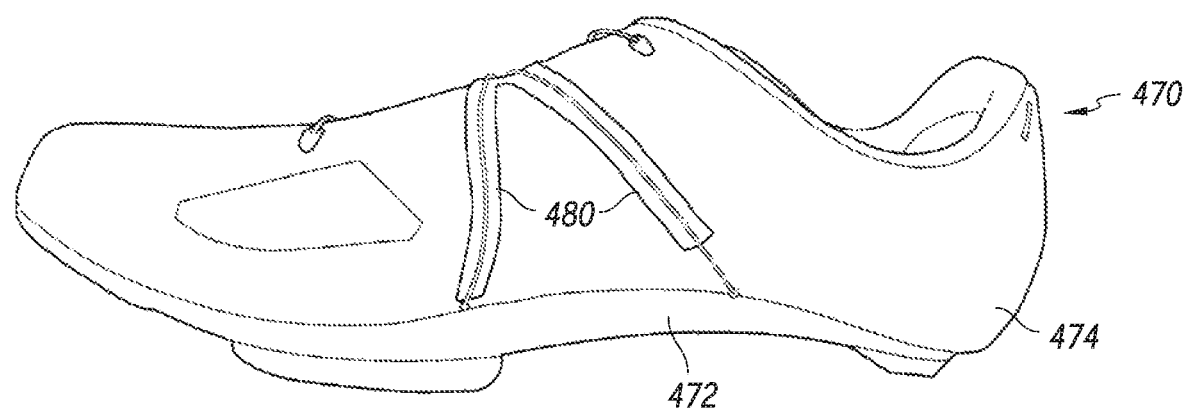
Figure 4J:
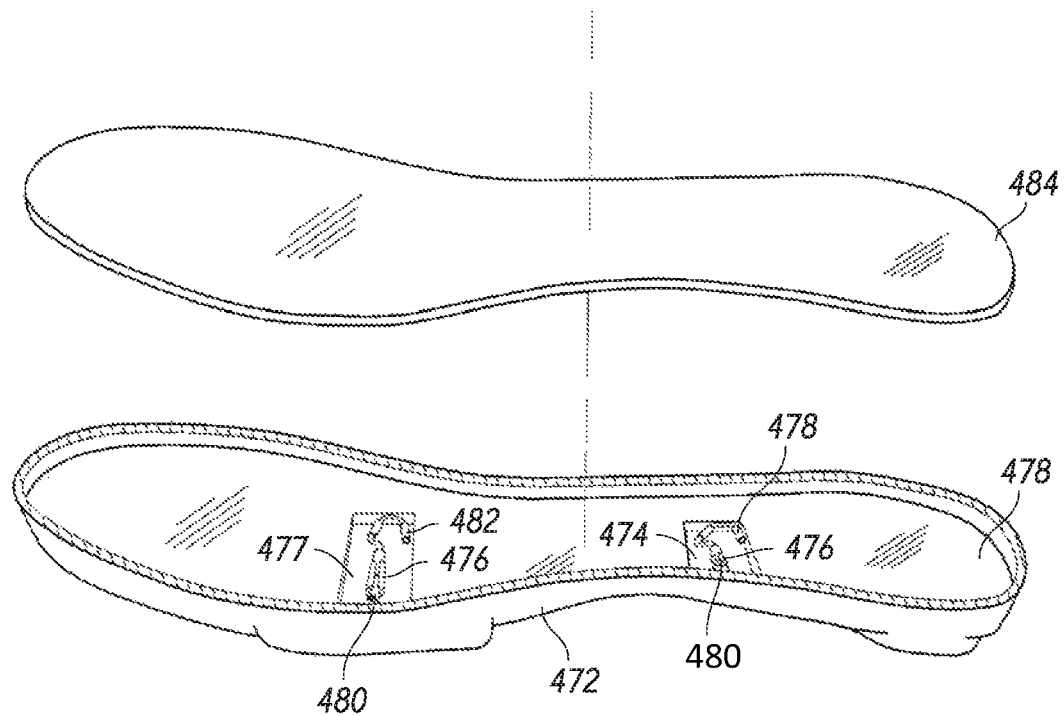

Referring now to FIGS. 4I and 4J, illustrated is an embodiment of a shoe 470 having an outsole or foot bed 472 and an upper 474 coupled with the outsole 472. Positioned between the outsole 472 and the upper 474 and within the shoe 470 is an insole or insert 484, which may provide padding for the foot and the like. Lace 480 is positioned over the upper 474 and coupled with high and low point lace guides as described herein. Shoe 470 also includes a gross adjustment mechanism 482 that is positioned within a recess 477 on an inner surface 478 of outsole 472. A distal end of the lace 480 extends from the outer medial surface of the shoe 470 and into recess 477, commonly through an aperture on the side of the outsole 472 (see FIGS. 4G and 4H). Crimp components are coupled with the distal end of lace 480, which contact guide 476 to prevent proximal movement of the lace 480 as previously described. The crimp components may be replaced with any of the gross or macro adjustments mechanisms described in the '773 application incorporated herein. The guide 476 includes an open channel that allows the lace 480 to be removed and pulled distally relative to guide 476.

The inner surface 478 of outsole 472 may be accessed by removing the insole 484. Accessing recess 477 allows the lace to be adjusted for gross adjustment purposes. Recess 477 may be large enough to function as a lace reservoir for any lace 480 that is positioned distally of the guide 476. In other embodiments, the distal end of the lace 480 may be cut, removed, and discarded from the proximal portions of the lace 480. The recess 477 and outsole 472 configuration of FIGS. 4I and 4J allows the gross adjustment mechanism of shoe 470 to remain hidden from view, which may provide a more visually appealing look for shoe 470. In other embodiments, the recess 477 could be positioned on or near the side of outsole 472 or on the bottom of the outsole 472 and shoe 470.

The relatively small termination points that may be achieved via the attachment methods of FIG. 4A-4J provide a sleek and visually appealing look that may enhance the attractiveness of the shoe. The small termination points may also remove the need for large and/or hard plastic or other components. The small termination points may also reduce the overall weight of the shoe, which may be desired in cycling or other activities.

Strap Based High/Low Lace Configurations

Referring now to FIGS. 5A-5I, illustrated are other embodiments of shoes 500 that include straps instead of or in addition to the previously described lace. Because the straps are wider than the lace, the force exerted on the shoe may be distributed across the shoe's surface as the straps are tensioned. This may eliminate or reduce the need for force distributing components, such as the previously described panels. The straps may also provide a desired visual appearance.

The shoes 500 include an outsole 502 and an upper 504 coupled with the outsole 502. The shoes 500 also include two reel assemblies 520 that are coupled with first lace 522 and transition guides 510 and 512, which in the illustrated embodiment are strap rings or pulleys that redirect the straps approximately 180 degrees. A first webbing or strap 506 is coupled with one of the transition guides 510 and reel assemblies 520 while a second webbing or strap 508 is coupled with the other transition guide 512 and reel assembly 520. The reel assemblies 520 are operable to tension the lace 522, which tensions the first and second webbing or straps 506 and 508 via the transition guides, 510 and 512 respectively.

A first end of the first and second webbing or straps, 506 and 508, is coupled at or near the outsole 502 of shoe 500 (i.e., coupled at a low point position). The first end of the first and second webbing or straps, 506 and 508, is coupled with the shoe or outsole 502 via stitching, adhesive bonding, RF welding, heat welding, and the like. A second end of the first and second webbing or straps, 506 and 508, is coupled with a high point guide 514 at or near the shoe's eyestay. In some embodiments, the high point guide 514 is a D-ring through which the webbing or strap 506 and 508 may be pulled to provide gross adjustment. The webbing or straps, 506 and 508, are typically wider than the lace, which helps distribute the load or force across the outer medial surface of, and/or elsewhere on, the shoe 500. A panel 516 may be positioned on or near the medial surface of the shoe 500 to further help distribute the load or force across the shoe and/or shoe's outer medial surface.

As described herein, tensioning of the straps, 506 and 508, via reel assembly 520 and first lace 522 causes the eyestays to be pulled together via the second end of straps, 506 and 508, and high point guides 514, thereby closing the tongue opening of the shoe. Tensioning of the straps, 506 and 508, also causes the medial outer surface of the shoe 500 to be pulled into contact with the medial surface of the foot via the first end of straps, 506 and 508, and the coupling of the first end at the low point position. In this manner, the fit and/or comfort of the shoe 500 is improved.

Figure 5C:
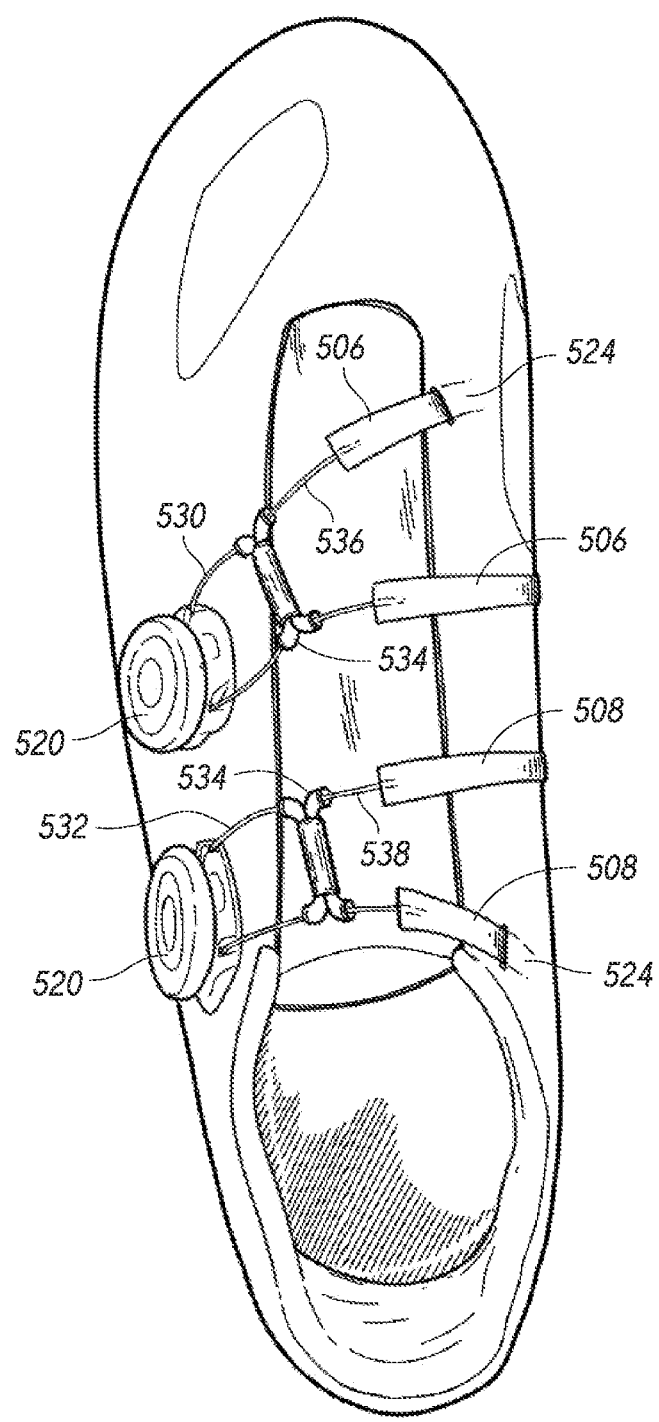
Figure 5D:
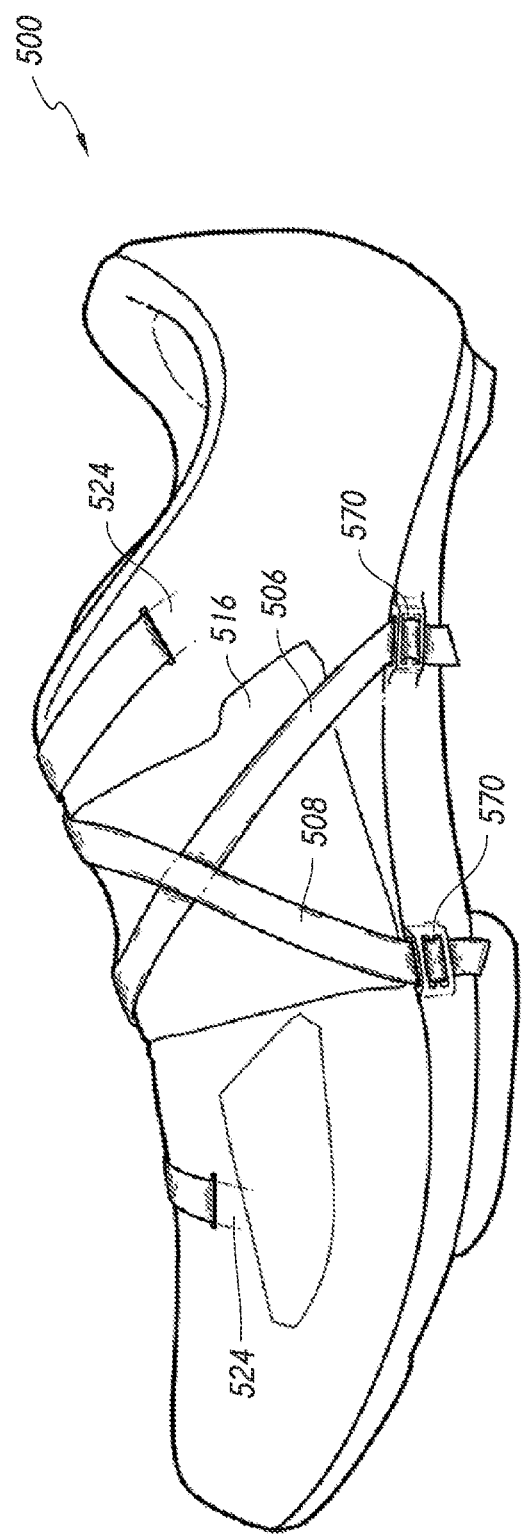
Figure 5E:
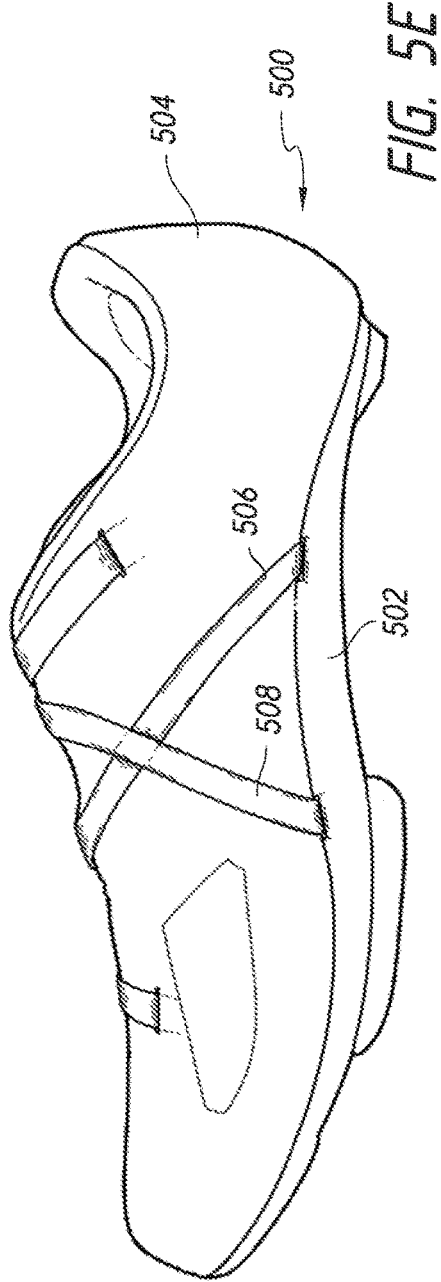
Figure 5F:
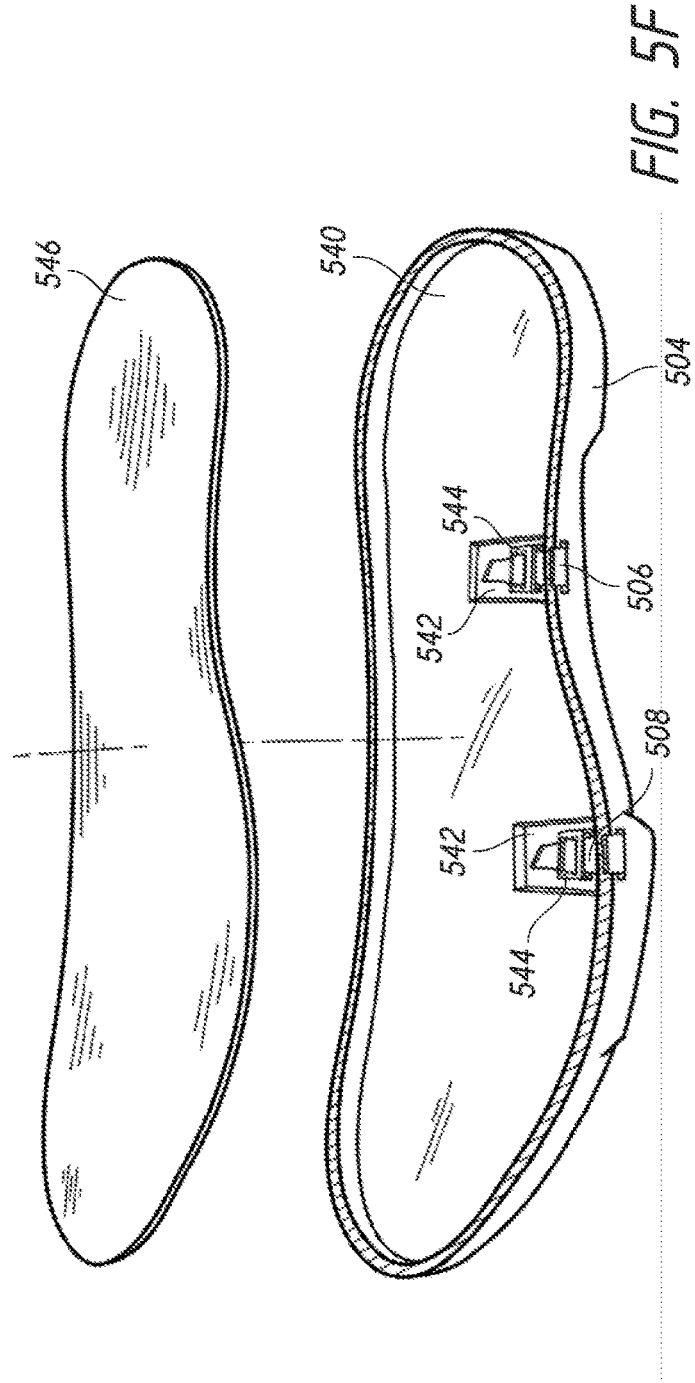

As shown in FIGS. 5E and 5F, in some embodiments the first end of the first and second webbing or straps, 506 and 508, may be coupled with a D-ring 544 that is positioned within a recess 542 on an inner surface 540 of the outsole 502. A removable insole or insert 546 may cover the inner surface 540 of the outsole 502 to allow access to the recess 542 and D-ring 544. As shown in FIG. 5D, in other embodiments the D-ring 570 may be positioned on an outer surface of the shoe 500 on or near the outsole 502.

Figure 5G:
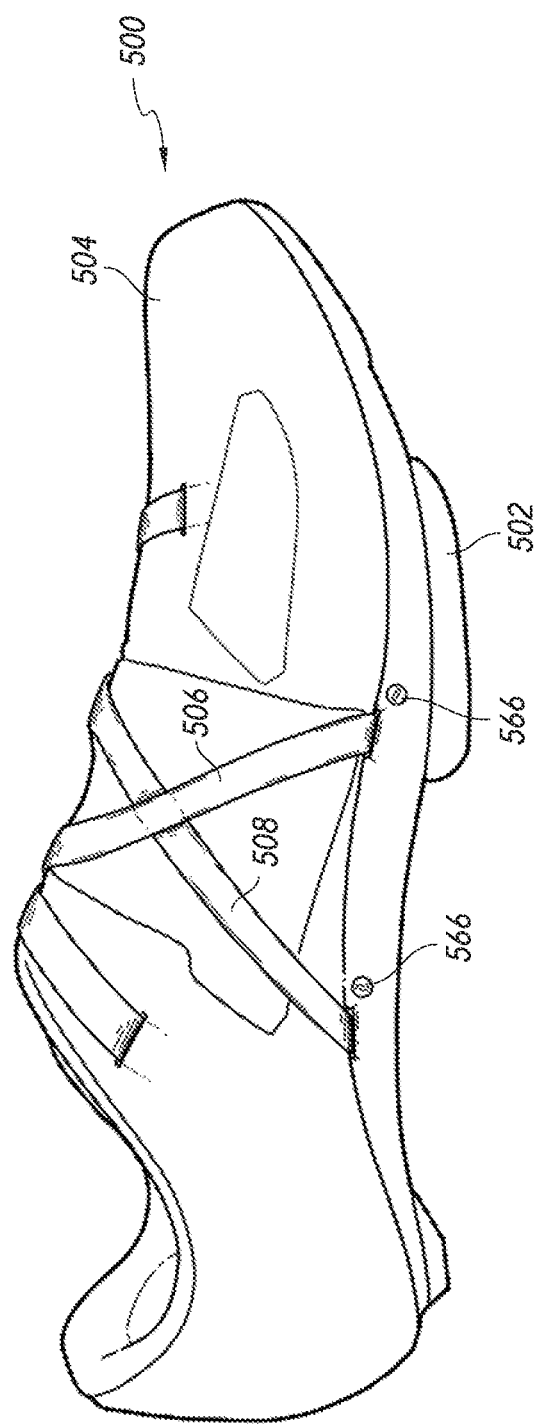

As shown in FIGS. 5G-5I, in other embodiments one or more of the straps, 506 and/or 508, may be coupled with a torsion bar or rod mechanism 560 that is positioned within an interior portion 550 of the outsole 502 and covered by an insole or insert 552. The torsion bar or rod mechanism 560 includes a rod 562 that may be rotated to wind the straps, 506 and 508, around the rod 562 and thereby shorten the straps, 506 and 508. The rod 562 may be coupled with a gear mechanism 564 (e.g., bevel gear and the like) that is in turn coupled with a tensioning mechanism 566, which in the illustrated embodiment is a screw-type component that rotates a torque or drive shaft. In other embodiments, the tensioning mechanism 566 may be a reel-based or other component. An exemplary torsion bar or rod mechanism 560 is further described in U.S. patent application Ser. No. 14/073,773, filed Nov. 6, 2013, entitled "Devices and Methods for Adjusting the Fit of Footwear", the entire disclosure of which is incorporated by reference herein.

As shown in FIG. 5C, in still other embodiments the straps, 506 and 508, may be positioned within the upper material 524, such as by being inserted within slots cut or formed into the upper material 524. The straps, 506 and 508, may extend under the upper material 524 and be hidden from view, which may enhance the visual appeal of the shoe 500. In some embodiments, a proximal end of the straps, 506 and 508, may each be coupled with lace. For example, separate segments of the first strap 506 may be coupled at a proximal end with lace 536 that is in turn coupled with lace 530 via transition guide 534. A reel assembly 520 may tension lace 530, which in turn tensions lace 536 and first strap 506 via transition guide 534. Similarly, separate segments of the second strap 508 may be coupled at a proximal end with lace 538 that is in turn coupled with lace 532 via transition guide 534. A reel assembly 520 may tension lace 532, which in turn tensions lace 538 and second strap 508 via transition guide 534.

Motorized Tensioning Embodiments

Figure 6:
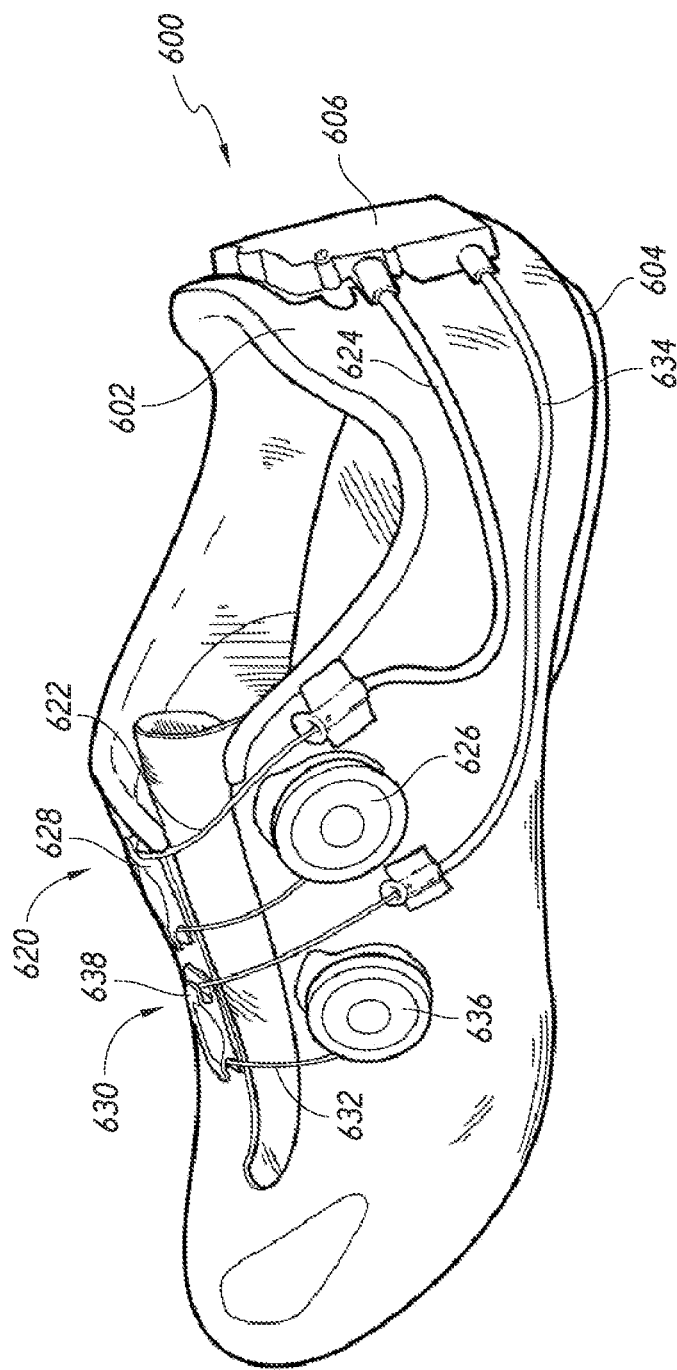
FIG. 6 illustrates an embodiment of a shoe having a motorized tensioning device coupled with the shoe's upper.

As described herein, in some embodiments, one or more of the manual reel assemblies may be replaced by a motorized tensioning device that includes an electric motor that drives a spool around which lace, webbing, and/or straps are wound. An exemplary embodiment of a motorized tensioning device is described in U.S. patent application Ser. No. 14/014,491, filed Aug. 30, 2013, entitled "Motorized Tensioning System," the entire disclosure of which is incorporated by reference herein. FIG. 6 illustrates an embodiment of a shoe 600 having a motorized tensioning device 606 coupled with the shoe's upper 602. As in previous embodiments, the upper 602 is coupled with an outsole 604. The motorized tensioning device 606 is coupled with a pair of laces that form a first closure zone 620 and a second closure zone 630.

The first closure zone 620 includes a first lace 622 that is coupled with the motorized tensioning device 606 and routed through first tubing 624. The first lace 622 is also coupled with a first guide 628 and/or other guides (not shown). A distal end of the first lace 622 may also be coupled with a first reel assembly 626. The first reel assembly 626 may be used to provide gross adjustment and/or tightening of the first closure zone 620. Similarly, the second closure zone 630 includes a second lace 632 that is coupled with the motorized tensioning device 606 and routed through second tubing 634. The second lace 632 is also coupled with a second guide 638 and/or other guides (not shown). A distal end of the second lace 632 may also be coupled with a second reel assembly 636, which may be used to provide gross adjustment and/or tightening of the second closure zone 630.

In some embodiments, the guides of the first and/or second closure zones (e.g., 628 and 638) may be arranged in a high point and low point configuration as described herein. For example, the first and second reel assemblies, 626 and 636, may be positioned at or near the outsole 604 and function as the low lace termination point. In other embodiments, the first and second reel assemblies, 626 and 636, may be replaced with lace guides (not shown) that are positioned at or near the outsole 604 and that function as the low lace termination points. Lace guides 628 and 638 may function as the high lace termination points so that the combination of lace guides and/or reel assemblies have the high-low lace configuration described herein. The motorized tensioning device 606 may be coupled with the heel portion of the shoe and used to independently tension the first lace 622 and the second lace 632. As described herein, the motorized tensioning device 606, or any other motorized tensioning device, may be used with any of the lace configuration embodiments described herein. For example, the motorized tensioning device 606 may replace the illustrated manual tensioning devices, or may be used in addition to those devices.

In some embodiments, a control device may be used to control the motorized tensioning device 606 and tighten the shoe 600. Exemplary embodiments of control devices for the motorized tensioning device 606 are illustrated in FIGS. 20A-22C. The control device may include one or more buttons/controls that control the motorized tensioning device 606 to tighten and/or loosen the shoe 600. The control device may include an incremental tension increase button/control and an incremental tension release button/control that are used to incrementally tighten and/or loosen the shoe 600. The control device may also include a pre-set lace tension value that is used to automatically tension the lace by a predetermined amount. The control device may also include a full-release type button that functions to fully release the lace tension to allow the shoe 600 to be easily removed.

In some embodiments, the control device may include a fast-type tighten or release button that functions to increase or decrease tension on the lace by a set step or amount, such as increase or decrease lace tension by 15%. Using the fast-type button, the user may easily and quickly tighten or relieve pressure on the foot. In some embodiments, the control device may be mounted on the shoe 600, may be a bracelet or other apparel that is worn by the user, may be an application of a smart-phone or other electronic device, or may be a device that is couplable with a vehicle, such as a bicycle, as illustrated in FIGS. 20A-22C. The motorized device 606 may also be controlled via a website or other program of a computer system. As illustrated if FIGS. 20A-22C, in cycling applications, the control device may be mounted on the bicycle, such as on or near the handle bars so as to be easily accessible to the cyclist. Positioning the control device on or near the handle bars may allow the cyclist to keep their hands on the handle bars and/or keep their attention focused on the road or bike path.

In other embodiments, the motorized device 606, or control device, may be programmed to sense various conditions and to respond reactively or proactively to changes in the conditions. For example, sensors may be positioned within the shoe 600 and information obtained from the sensors used to control the motorized device 606. The sensor(s) could include pressure sensors within the shoe 600, temperature sensors, accelerometers, strain/stress sensors, and the like. The sensors can measure when pressure within the shoe 600 is increased or decreased, which may correspond with the cyclist exerting force to drive the bicycle or allowing the bicycle to coast. The control device may respond by increasing the tightness of the shoe 600 to aid in driving the bicycle or decrease the tightness to provide comfort.

In another embodiment, a power output monitor or meter (e.g., strain gauge in the hub or crank, and the like) may be used to determine a wattage or power generated as the bicycle is being ridden. The power generation may be used to adjust the tightness and/or fit of the shoe 600 about the foot as needed, such as when additional torque is needed to drive the pedals or when additional comfort is desired as the bicycle coasts. Sensors may also be placed in the seat and/or pedals, or elsewhere on the bicycle, to aid in determining if the cyclist is standing or sitting, such as when the bicycle is being driven or is coasting. The control device may response according to the determined situation, such as according to a measured acceleration. In other embodiments, the sensor could determine the pitch and/or chatter of the road or bike path to determine if increased or decreased tightness is needed.

In some embodiments, the control device may learn the desired tightness settings of the cyclist and may adjust a tightening/loosening program accordingly. In this manner, the automatic response of the control device may be customized or tailored to the individual cyclist. In some embodiments, data may be collected by the control device and used to determine the desired tightness setting of the cyclist. The data may be transmitted to a centralized database and analyzed to determine the desired settings. In another embodiment, the control device may include a "learn" mode in which the cyclist manually adjusts the shoe's tightness and lace tension as the bicycle is being driven, allowed to coast, and/or ridden over various terrains. The learn mode process may be repeated one or more times and the collected data used to determine an average preferred tightness setting of the user for various terrains and/or operation conditions. The control device may then configure a tightening/loosening program to incorporate the learned settings of the cyclist. The learned settings may be associated with other measurable conditions, such as a generated power (e.g., wattage), pressure, acceleration and the like. The control device may automatically tighten/loosen the shoe based on the measured condition. Any incremental adjustments of the tightness may then be monitored and the program updated to reflect any determined changes in the cyclist's preferred settings. In this manner, the cycling shoe may be customized and tailored to fit the individual and unique needs of the cyclist.

The automatic reactive/proactive abilities of the motorized device 606 allows the user to forget about adjusting the shoe 600 during use. This reduces the mental stress placed on the cyclist and allows the cyclist to focus on more important activities, such as the conditions of the bicycle and/or road.

Exemplary Processes

Figure 7A:
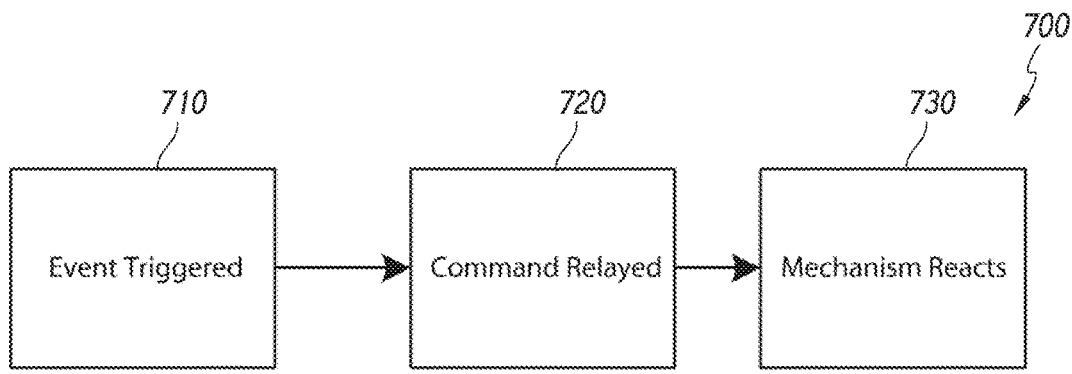
FIG. 7A illustrates an embodiment of a flow diagram of operation of a motorized tensioning device.
Figure 7B:
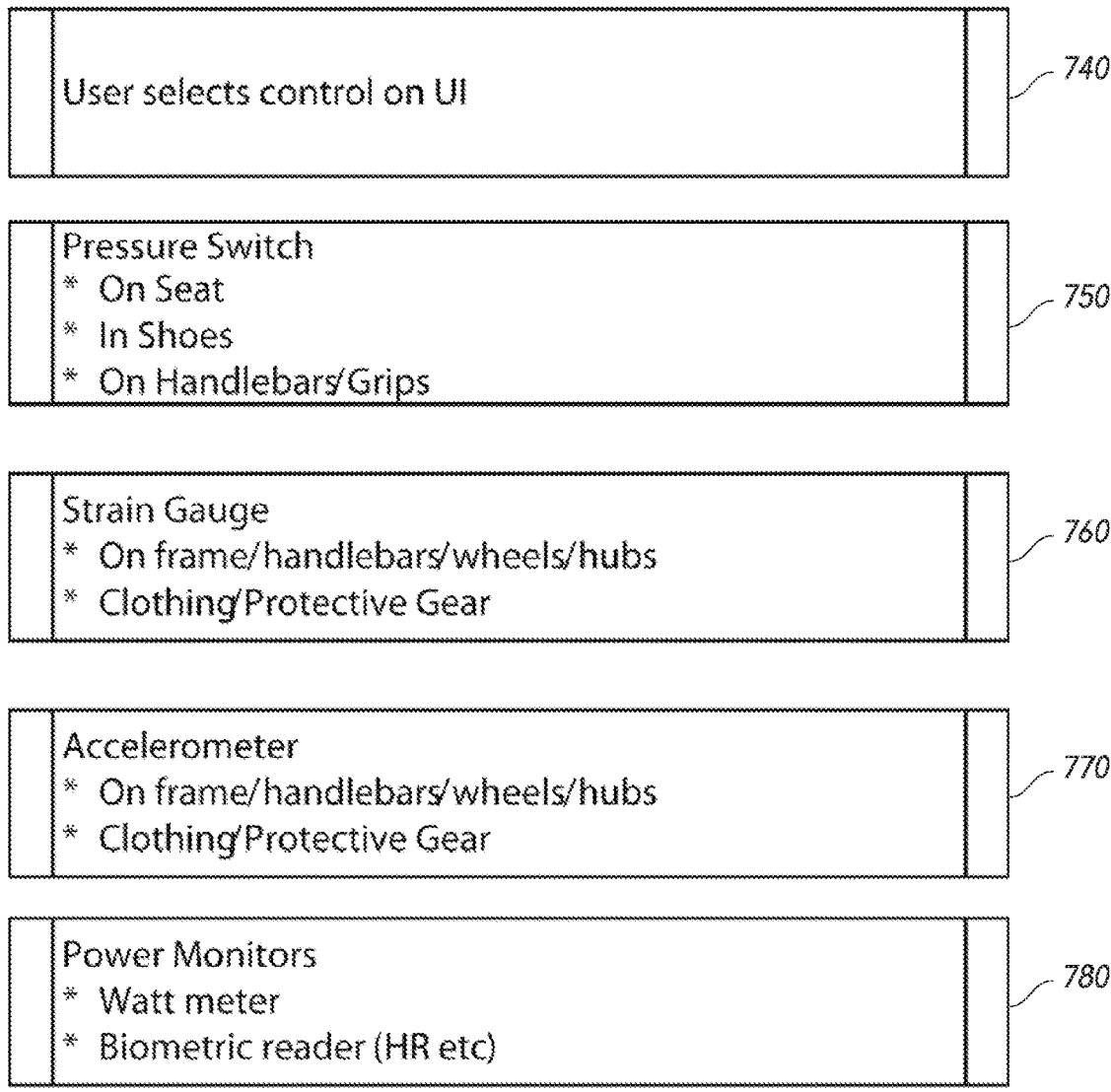
FIG. 7B illustrates exemplary triggering events associated with a motorized tensioning device.
Figure 8:
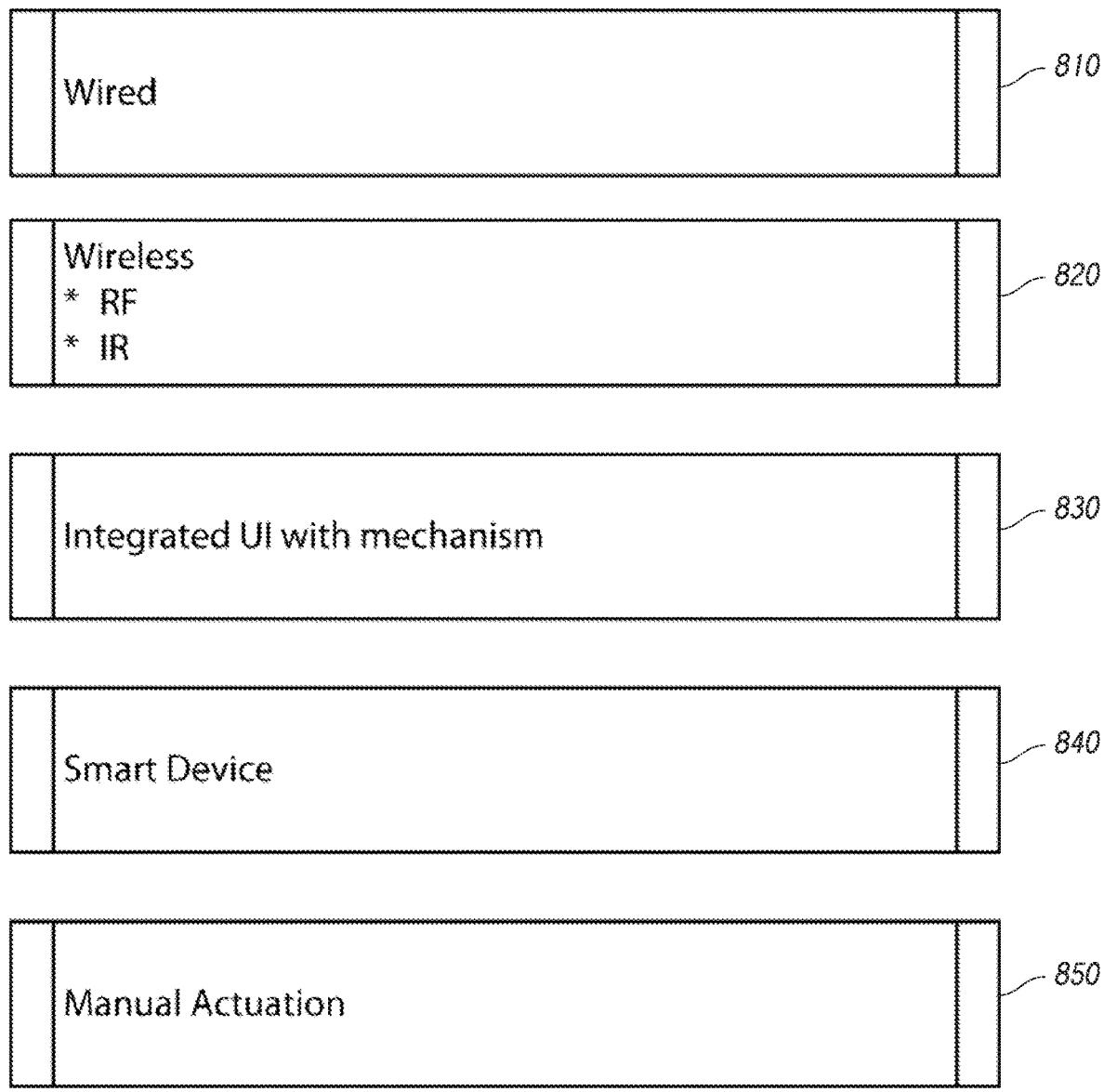
FIG. 8 illustrates exemplary command relays associated with a motorized tensioning device.
Figure 9:
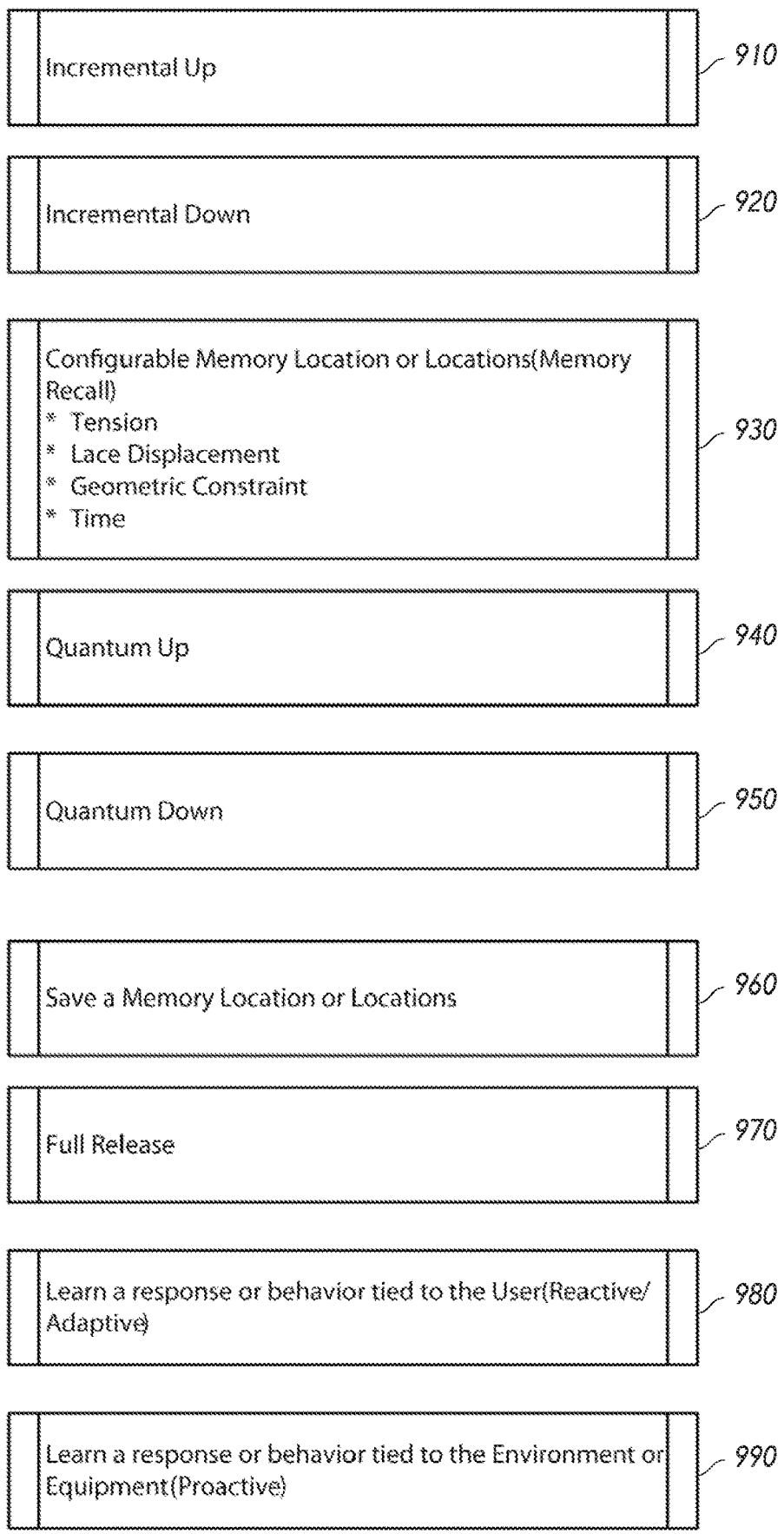
FIG. 9 illustrates exemplary reactions of a motorized tensioning device.

Referring now to FIG. 7A, illustrated is an embodiment of a flow diagram 700 of operation of a motorized tensioning device, such as device 600. At block 710, an event is triggered. Exemplary triggering events are illustrated in FIG. 7B. At block 720, a command is relayed to the motorized tensioning device. A control device may be used to relay the command to the motorized tensioning device. Exemplary command relays are illustrated in FIG. 8. At block 730, the motorized tensioning device or mechanism reacts to the relayed command. Exemplary reactions of the motorized tensioning device are illustrated in FIG. 9.

Referring now to FIG. 7B, exemplary triggering events are illustrated. At block 740, in one embodiment the triggering event may be a selection by a user of a control on a user interface of a control device. The selection may be a selection of an incremental tighten, incremental release, full release, tighten or loosen by a predetermined amount, and the like. At block 750, in another embodiment the triggering event may be a measured or detected signal of a pressure sensor or switch. The pressure sensor/switch may be positioned on the bicycle seat, in a cycling shoe, on the handlebars or grip, and the like.

At block 760, the triggering event may be a measured or detected signal of a strain gauge, which may be positioned on the bicycle's frame, handlebars, wheels, hubs, or on the cyclist's clothing, protective gear, and the like. At block 770, the triggering event may be a measured or detected signal of an accelerometer that is positioned on the bicycle's frame, handlebars, wheels, hubs, or on the cyclist's clothing, protective gear, and the like. At block 780, the triggering event may be a measured or detected signal of one or more power monitors. The power monitor(s) may be a watt meter or a biometric reader (e.g., heart rate reader, etc.), and the like.

Referring now to FIG. 8, exemplary command relays are illustrated. At block 810, in one embodiment the command may be relayed to the motorized tensioning device via a wired connection. For example, the control device may be coupled with the shoe and wired to the motorized tensioning device, or may be positioned remotely from the shoe and wired to the motorized tensioning device. At block 820, the command may be relayed via a wireless signal from a control device, such via radio frequency (RF) and infrared (IR) signals. At block 830, the command may be relayed via a user interface that is integrated with the motorized tensioning device or mechanism. Stated differently, the motorized device may include a user interface that allow the user to control the tension/tightness settings. In other embodiments, the user interface may be located remotely from the motorized tensioning device, such as on a bicycle as illustrated in FIGS. 20A-22C.

At block 840, the command may be relayed via a smart computing device. For example, in one embodiment a smart phone, tablet computing device, and the like, may include a motorized tensioning device tensioning/shoe tightening application that allows a user to control lace tension and/or shoe tightness from a smart phone, tablet computer device, or other smart device. At block 850, the command may be relayed or actuated via manual actuation, such as a user operating a knob or other mechanism or a reel assembly or other tightening device.

Referring now to FIG. 9, illustrated are reactions of the motorized tensioning device to relayed commands. At block 910, the motorized tensioning device incrementally increases the lace tension and/or tightness of the shoe. At block 920, the motorized tensioning device incrementally loosens the lace tension and/or tightness of the shoe. At block 930, the motorized tensioning device increases or decreases the lace tension and shoe tightness by a predetermined amount or setting that is stored in memory. The memory setting may include a set or customized lace tension, a lace displacement (e.g., winding or unwinding lace from a spool by a set amount), a geometric constraint, or a time (e.g., winding or unwinding lace for a defined time).

At block 940, the motorized tensioning device may increase the lace tension or shoe tightness by a quantum or gross amount, such as a 5-20% increase (e.g., 15% increase and the like). At block 950, the motorized tensioning device may decrease the lace tension or shoe tightness by a quantum or gross amount, such as a 5-20% decrease (e.g., 15% decrease and the like). At block 960, the motorized tensioning device may react according to a saved memory location(s), such as for example a learned lace tension/shoe tightness based on power generation, road condition, cyclist condition, road pitch, and the like.

At block 970, the motorized tensioning device may perform a full release of lace tension and/or shoe tightness. The full release operation may involve operating the motorized tensioning device to release lace tension until a stop is contacted or the lace tension decreases by a certain amount. At block 980, the lace tension is increased or decreased according to a learned response or behavior that is tied to the user. In such embodiment, the reaction of the motorized tensioning device is reactive or adaptive to the user's condition. At block 990, the lace tension is increased or decreased according to a learned response or behavior that is tied to the environment or equipment. In such embodiment, the reaction of the motorized tensioning device is proactive to the environment (e.g., weather, road condition, and the like) or equipment.

Exemplary High-Low Strap Configurations

Referring now to FIGS. 10A-10E, illustrated are various exemplary high-low strap configurations. In each of the embodiments, the straps include: i) a first end that is coupled at or near the shoe's eyestay that provides a high shoe tensioning point and ii) a second end that is coupled at or near the shoe's outsole, or an interface between the outsole and the upper, that provide a low shoe tensioning point. The high shoe tensioning point pulls opposing eyestays together to close an opening across the shoe's tongue while the low shoe tensioning point tensions the outer surface of the shoe to pull or press the shoe against the user's foot. The outer surface of the medial and/or lateral sides of the shoe may be pulled or pressed against the user's foot as desired.

In some embodiments, the straps may be positioned on a single side of the shoe. In such embodiments, the straps are typically positioned on the medial side of the shoe so as to pull the outer surface of the medial side of the shoe against the medial side of the user's foot. Positioning the straps in this manner may be preferred so that the shoe's upper material is pulled or pressed against the foot's arch. In some embodiments, however, the straps may be positioned only on the lateral side of the shoe so that the shoe's upper material is pulled or pressed against the lateral side of the user's foot. In other embodiments, the straps may be positioned on both the lateral and medial side of the shoe so that the upper material is pulled or pressed against both the lateral and medial sides of the user's foot.

The straps may be positioned either over the outer surface of the shoe or under the outer surface of the shoe. In embodiments where the straps are positioned under the outer surface of the shoe, the straps are typically coupled with the outer surface so that the outer surface is pulled or pressed against the user's foot as the straps are tensioned.

Figure 10A:
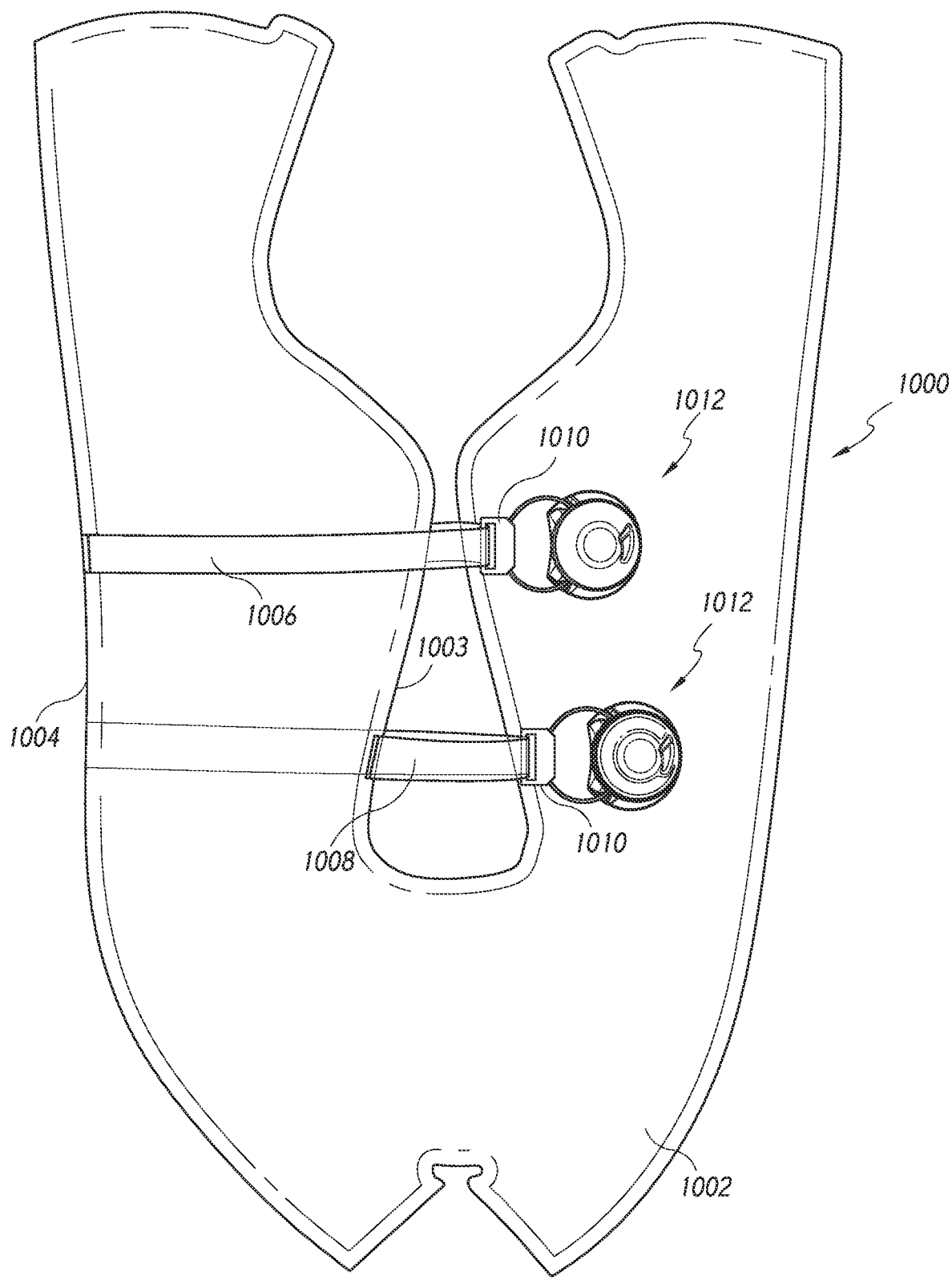
FIGS. 10A-10E illustrate various exemplary high-low strap configurations of a shoe.

Referring now to FIG. 10A, illustrated is one embodiment 1000 of a high-low strap configuration. As illustrated, straps, 1006 and 1008, are coupled with the upper 1002 to extend across an opening of the tongue portion of the shoe and between opposing eyestays. A first end of each strap, 1006 and 1008, is coupled at or near an edge or one eyestay 1003 while a second end of each strap, 1006 and 1008, is coupled at or near an the outsole (not shown) or an interface 1004 between the outsole and the upper 1002. In some embodiments, the first end may be coupled within 1 cm of the edge 1003 and the second end may be coupled within 1 cm of the interface 1004. Each strap, 1006 and 1008, in FIG. 10A is roughly parallel or in line with an adjacent strap and with the strap portion between the first and second ends.

The first end of each strap, 1006 and 1008, pulls the opposing eyestays together to close the upper portion of the shoe while the second end of each strap, 1006 and 1008, pulls the outer surface of the upper 1002 against the user's foot. Each strap, 1006 and 1008, may be coupled with a transition guide 1010, such as a D-ring that include lace inlet and outlet ports, that is tensionable via a tension mechanism, such as the illustrated reel assembly 1012 and lace. Other tension mechanisms may be used to tension the straps, 1006 and 1008.

As shown in FIG. 10A, the strap may be positioned above the upper 1002 (i.e., strap 1006) or positioned beneath the upper 1002 (i.e., 1008) depending on whether a visible strap is desired. When the strap is positioned beneath the upper 1002, the strap is coupled with the upper 1002 so that the upper 1002 is pulled or pressed against the user's foot as the respective strap is tensioned. Exemplary methods of coupling straps to the upper are described herein. The first end and/or second end of the straps, 1006 and 1008, may be coupled with the edge 1003 and/or interface 1004 via stitching, adhesive bonding, RF welding, sonic welding, heat press, and the like.

Figure 10B:
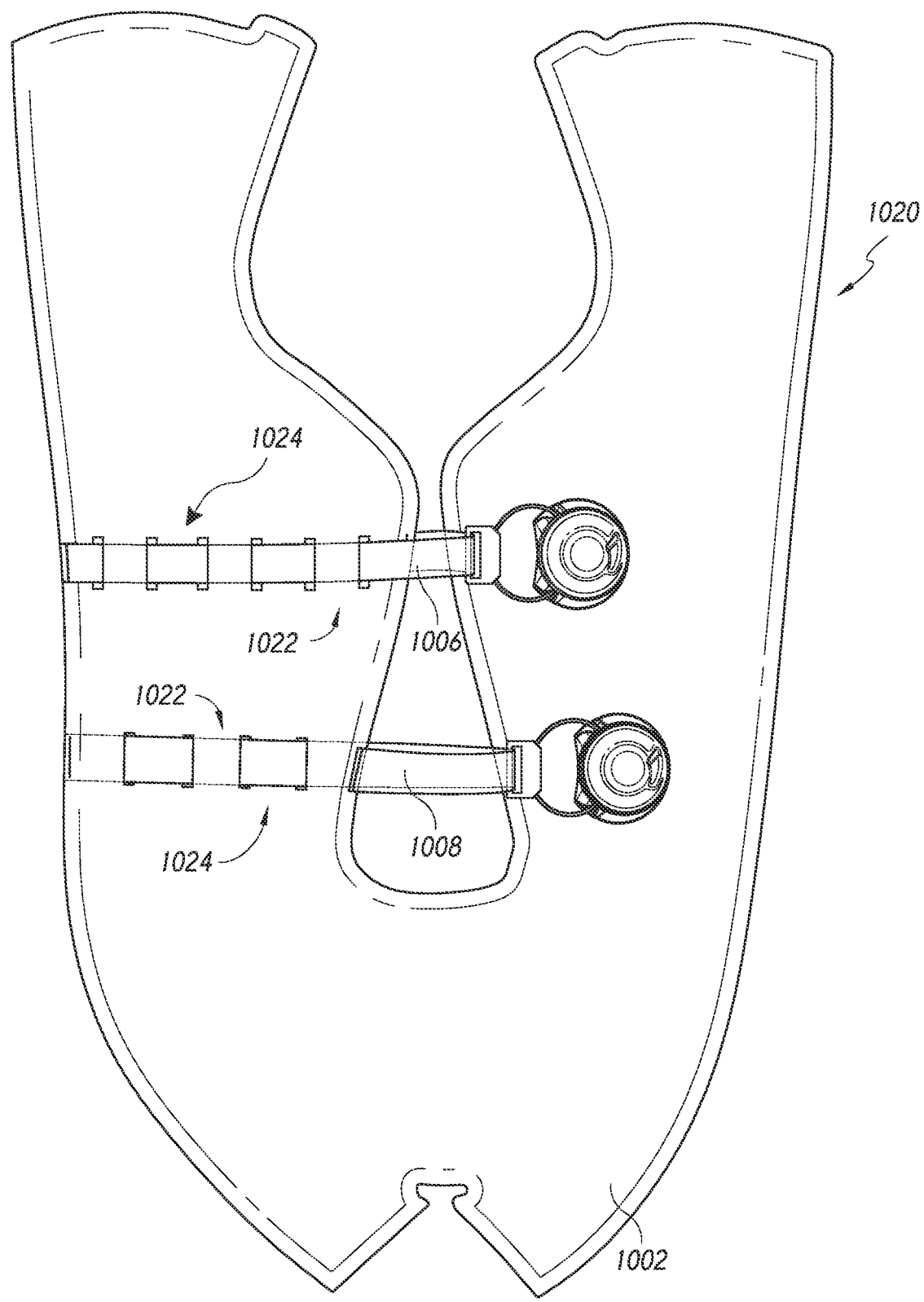

Referring now to FIG. 10B, illustrated is another embodiment 1020 of a high-low strap configuration. Embodiment 1020 is similar to embodiment 1000 except that each strap, 1006 and 1008, includes one or more sections that are positioned above and below the upper 1002. For example, each strap, 1006 and 1008, includes a first portion 1022 that is disposed beneath the upper 1002 and a second portion 1024 that is disposed above the upper 1002. The upper 1002 may include a plurality of slots or apertures that allow the straps, 1006 and 1008, to be woven or positioned above and below the upper 1002 as illustrated. The first and second portions, 1022 and 1024, may be intermittently or regularly arranged as desired. In some embodiments, the straps, 1006 and 1008, may be woven through a material that is positioned immediately beneath and coupled or attached to the upper 1002 so that the upper is pulled against the user's foot as the straps, 1006 and 1008, are tensioned while the straps, 1006 and 1008, remain hidden from view.

Figure 10C:
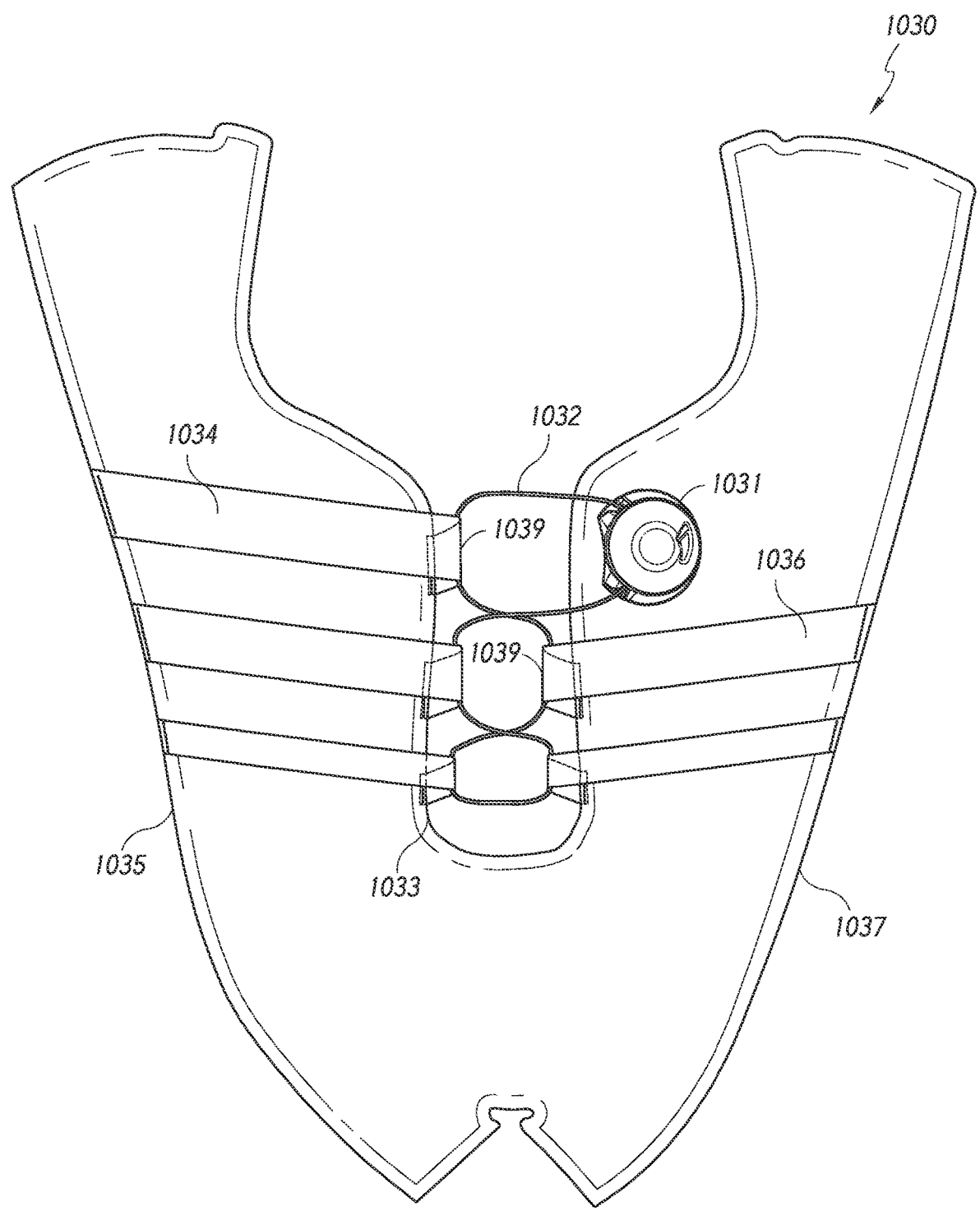

Referring now to FIG. 10C, illustrated is another embodiment 1030 of a high-low strap configuration. Embodiment 1030 includes a plurality of first straps 1034 that are positioned on a first side of the shoe (e.g., the medial side) and a plurality of second straps 1036 that are positioned on an opposite side of the shoe (e.g., the lateral side). Each of the first straps 1034, or some of the first straps, include a first end that attaches to the shoe near an edge of the eyestay 1033 and a second end that attaches to the shoe near the outsole 1035. Similarly, each or some of the second straps 1036 includes a first end that attaches to the shoe near the eyestay 1033 and a second end that attaches to the shoe near the outsole 1037. The straps, 1034 and 1036, form webbing loops 1039 that function as guides for lace 1032 of a reel based lacing system. The lace 1032 is coupled with a reel assembly 1031, which is positioned on the eyestay, and tensionable thereby. The lace 1032 is positioned along the tongue portion of the shoe between the first straps 1034 and the second straps 1036. The lace 1032 tensions both the first straps 1034 and the second straps 1036 to pull the eyestays together and pull the outer surface of the shoe against the user's foot. In the embodiment of FIG. 10C, both sides of the shoe (i.e., medial and lateral sides) are pulled against the user's foot.

Figure 10D:
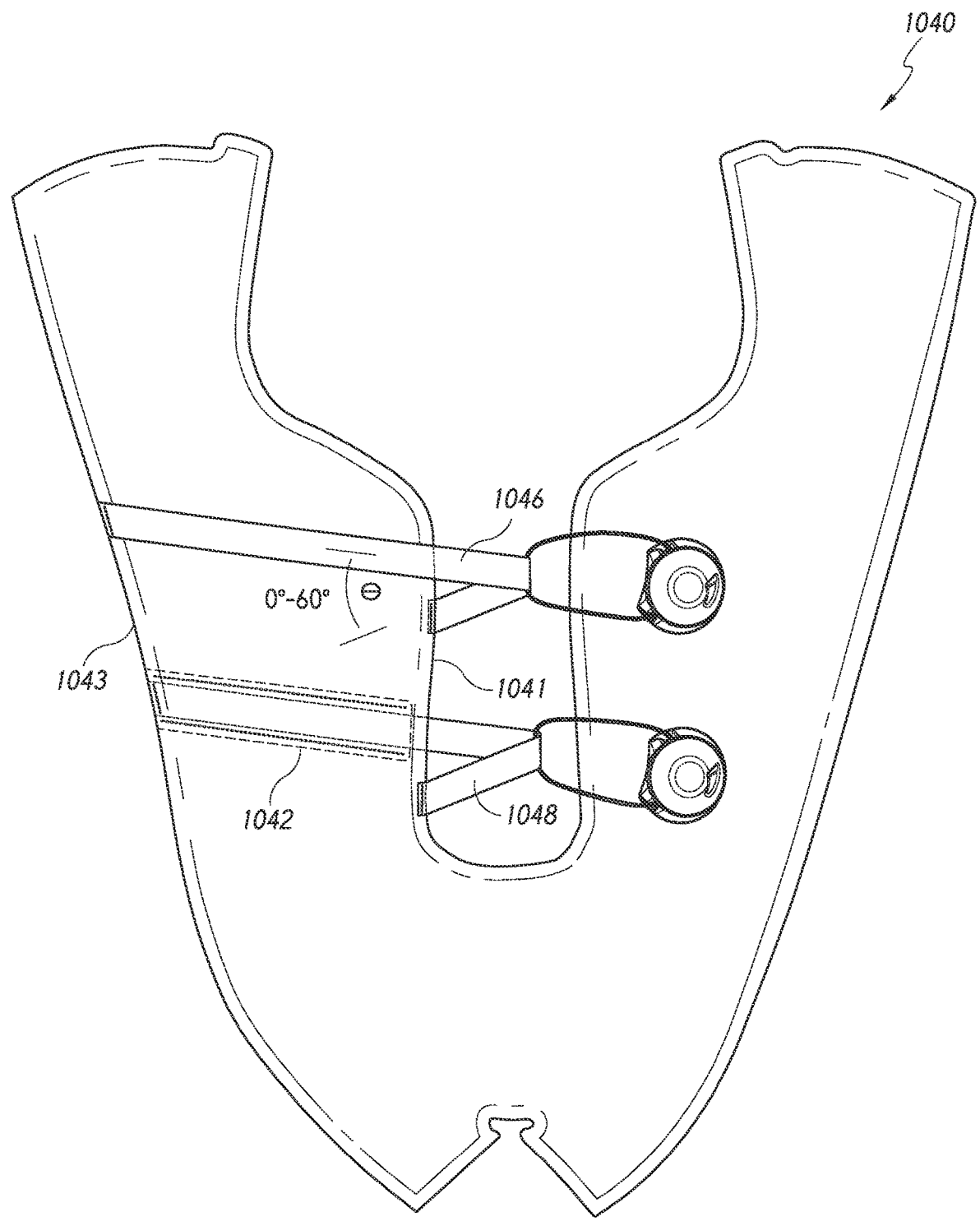

Referring now to FIG. 10D, illustrated is another embodiment 1040 of a high-low strap configuration. Embodiment 1040 is similar to embodiment 1000 in that a first strap 1046 and second strap 1048 each include a first end that is coupled near the shoe's eyestay 1041 and a second end that is coupled near the shoe's outsole 1043. The straps, 1046 and 1048, form webbing loops that function as lace guides as previously described. Embodiment 1040 differs in that a first portion of the lace and a second portion of the lace are angularly offset by a desired degree θ. Stated differently, the first portion of the lace and the second portion of the lace are arranged to form an angle θ. In some embodiments, the angle θ may be between about 0 and 60 degrees.

The first portion of the lace extends between the first end and the webbing loop and the second portion of the lace extends between the second end and the webbing loop. The angled arrangement of the first lace portion and the second lace portion allows the force to be distributed over a greater portion of the shoe and/or allows the applied closure force to be varied relative to the shoe and foot as desired. The angle arrangement may also aid in flaring the ends of the webbing loops as the lace is tensioned, which may reduce a frictional force between the webbing loops and lace and thereby prevent premature wearing and/or failure of these components. FIG. 10D also illustrates the second lace 1048 inserted under the upper material of the shoe and coupled thereto via a coupling 1042, which may be similar to those described herein.

Figure 10E:
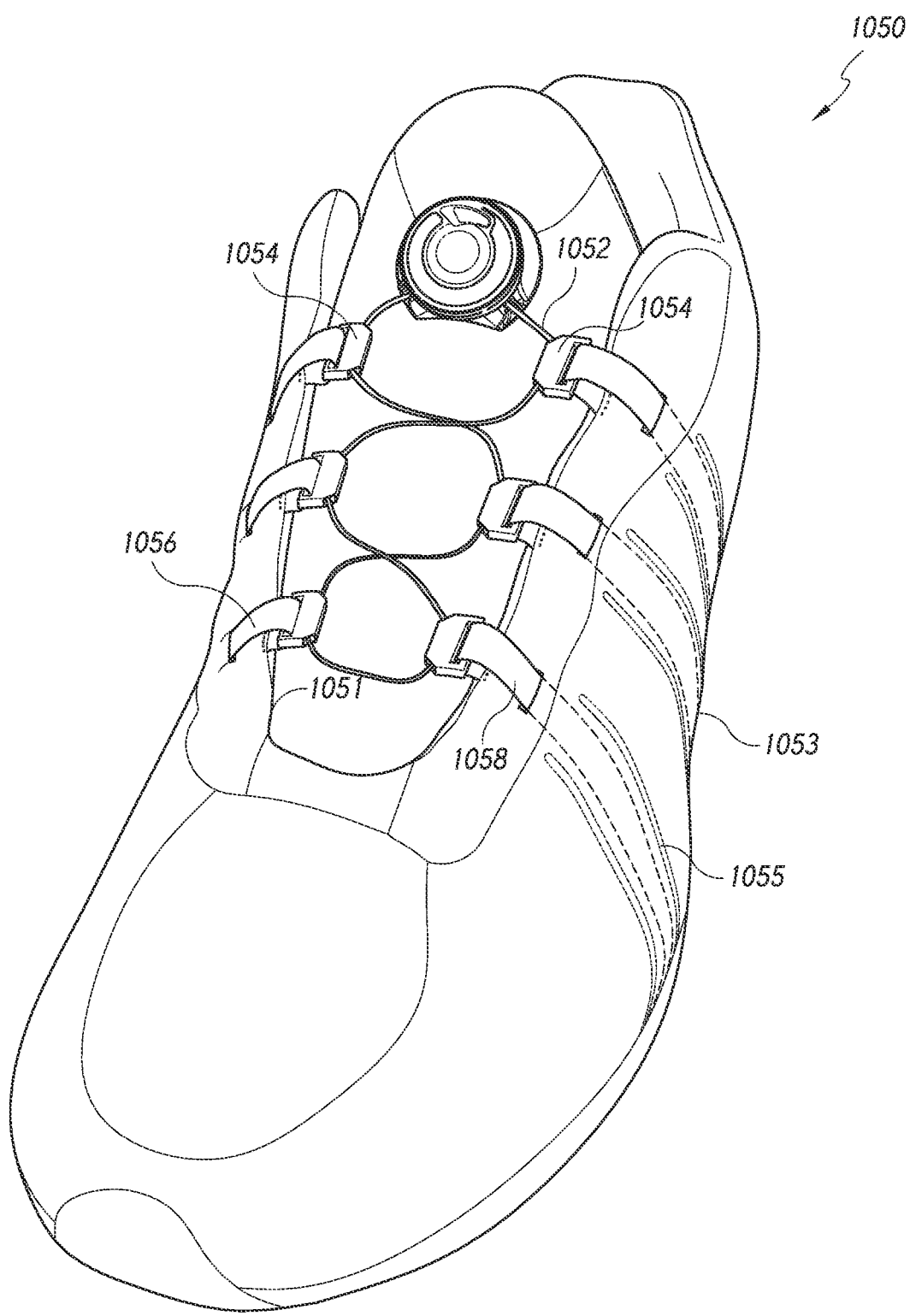

Referring now to FIG. 10E, illustrated is another embodiment 1050 of a high-low lace configuration. Embodiment 1050 includes a reel assembly (not numbered) that is mounted to the shoe's tongue. The reel assembly is coupled with lace 1052 and is configured to tension the lace 1052. The lace 1052 is positioned longitudinally along the shoe's tongue and is guided by a plurality of transition guides 1054 that each have a channel to direct the lace 1052 and a loop portion that couples with a strap. A plurality of first straps 1056 are positioned on a first side of the shoe (e.g., medial side) and a plurality of second straps 1058 are positioned on a second side of the shoe (e.g., lateral side).

Each strap, 1056 and 1058, is coupled with the lace 1052 via a transition guide 1054 and is tensionable thereby as the lace 1052 is tensioned. Each strap, 1056 and 1058, is also coupled at one end with the shoe's eyestay 1051 and coupled at an opposite end with the shoe's outsole (e.g., 1053). The straps, 1056 and 1058, are positioned under the shoe's upper material so as to be hidden from view. In some embodiments, the straps, 1056 and 1058, are slidably disposed within channels 1055 formed between the upper material and a material layer immediately beneath the upper material as described herein. The distal end of the straps, 1056 and 1058, is inserted within slots or apertures formed in the upper material to allow the distal end of the straps, 1056 and 1058, to be coupled near the shoe's eyestay 1051. The arrangement of embodiment 1050 provides a relatively even pull on the straps, 1056 and 1058, and pulls the medial and lateral sides of the shoe against the user's foot as described herein.

Exemplary Strap/Lace Coupling Configurations

Figure 11A:
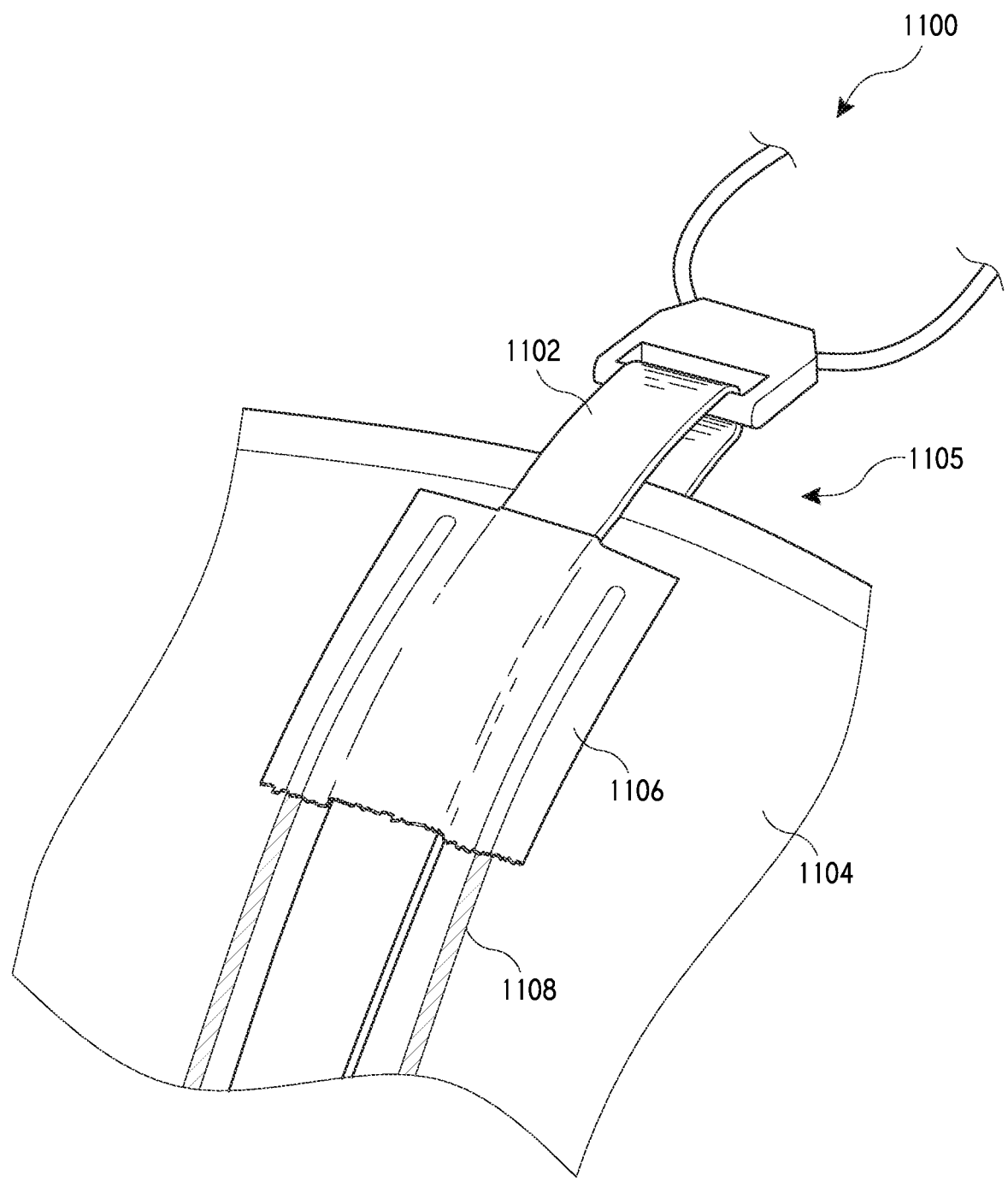
FIGS. 11A-11E illustrate embodiments of attaching or coupling straps of a high low lace configuration with an upper material of a shoe.
Figure 11B:
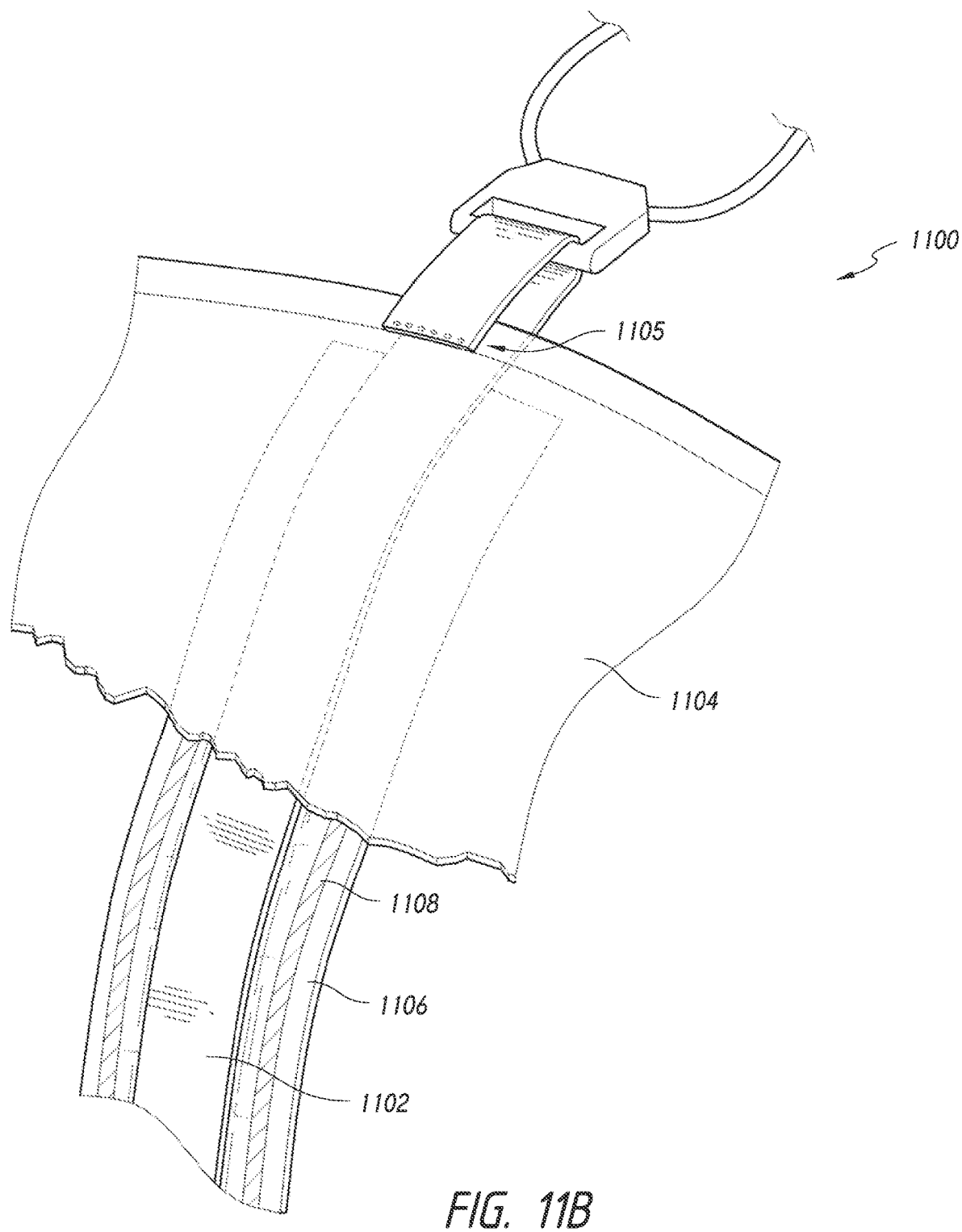

Referring now to FIGS. 11A-11E, illustrated are embodiments of attaching or coupling the straps of a high low lace configuration with the upper material of the shoe. Although the embodiments illustrate straps being coupled or attached with the upper material, in other embodiments lace or any other type of tension member may be similarly coupled with the upper material of a shoe. Referring now to FIGS. 11A and 11B, in one embodiment 1100 a strap 1102 is slidably positioned within a channel or sleeve 1106 that is coupled with the upper material 1104. The channel or sleeve 1106 is formed via an attachment 1108 that may be positioned on one or both sides of the strap 1102. In some embodiments, the attachment 1108 may be a continuous attachment that extends continuously along or about strap 1102, while in other embodiments attachment 1108 may include one or more discrete attachment sections. Attachment 1108, which couples sleeve 1106 with upper material 1104, may be adhesive bonding, stitching, RF welding, sonic welding, heat press, or any other known attachment method.

The strap 1102 is positioned within the sleeve 1106, and in some embodiments between opposing attachments 1108, so as to be able to slide within sleeve 1106 and relative to upper material 1104. Sliding of the strap 1102 within sleeve 1106 and relative to upper material 1104 allows the lower portion of the shoe (e.g., near the outsole) to be tensioned as strap 1102 is tensioned. Stated differently, if strap 1102 was unable to slide within sleeve 1106 and relative to upper material 1104, tensioning of the strap 1102 would merely tension the upper portions of sleeve 1106 and/or upper material 1104 rather than tensioning the lower portion of the shoe and pulling or pressing the upper material against the foot. In some embodiments, sleeve 1106 represents a material layer that is positioned immediately under upper material 1104. In other embodiments, sleeve 1106 may be a relatively thin piece of material that is coupled with the upper material 1104 specifically to define a channel within which strap 1102 may slide. Sleeve 1106 is commonly positioned beneath upper material 1104 so that the strap 1102 and sleeve 1106 are hidden from view. In other embodiments, sleeve 1106 may be positioned on an outer surface of the shoe so as to be visible.

In embodiments wherein the sleeve 1106 is positioned beneath upper material 1104, the attachment 1108 of sleeve 1106 and upper material 1104 functions to pull the upper material 1104 inward and/or against the user's foot as the strap 1102 is tensioned. Without the attachment of sleeve 1106 to upper material 1104, a gap would otherwise be created between the strap 1102 and the upper material 1104 as the strap 1102 is tensioned. FIGS. 11A and 11B also illustrate that a distal end 1105 of the strap 1102 is coupled near the shoe's eyestay via stitching, adhesive bonding, RF welding, and the like.

Figure 11C:
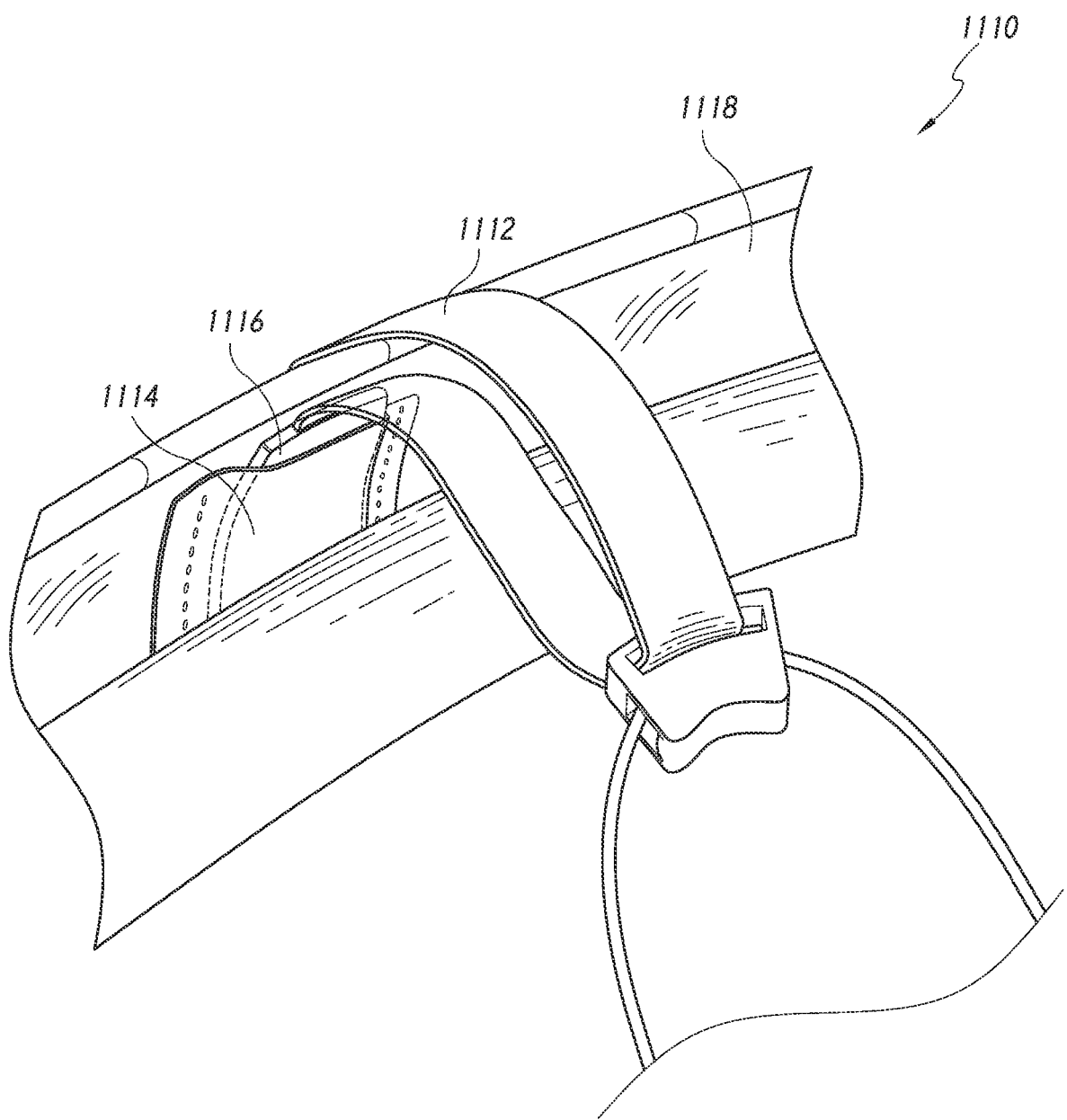

Referring now to FIG. 11C, illustrated is another embodiment 1110 of a strap 1112 that is coupled with a shoe's upper material 1118. As with embodiment 1100, the strap 1112 is slidably positioned within a sleeve 1114 that is typically disposed beneath the upper material 1118 and coupled therewith as previously described. Unlike embodiment 1100, however, strap 1112 is coupled with a slidable component 1116 that is positioned within the sleeve 1114. Specifically, a distal end of strap 1112 couples with a proximal end of the slidable component 1116 and a distal end of the slidable component 1116 is coupled near the shoe's outsole. Tensioning of the strap 1112 (e.g., via a strap of a reel based tensioning system) causes the strap to tension the slidable component 1116, which thereby tensions the lower portion of the shoe and pulls the upper material 1118 inward against the user's foot.

Figure 11D:
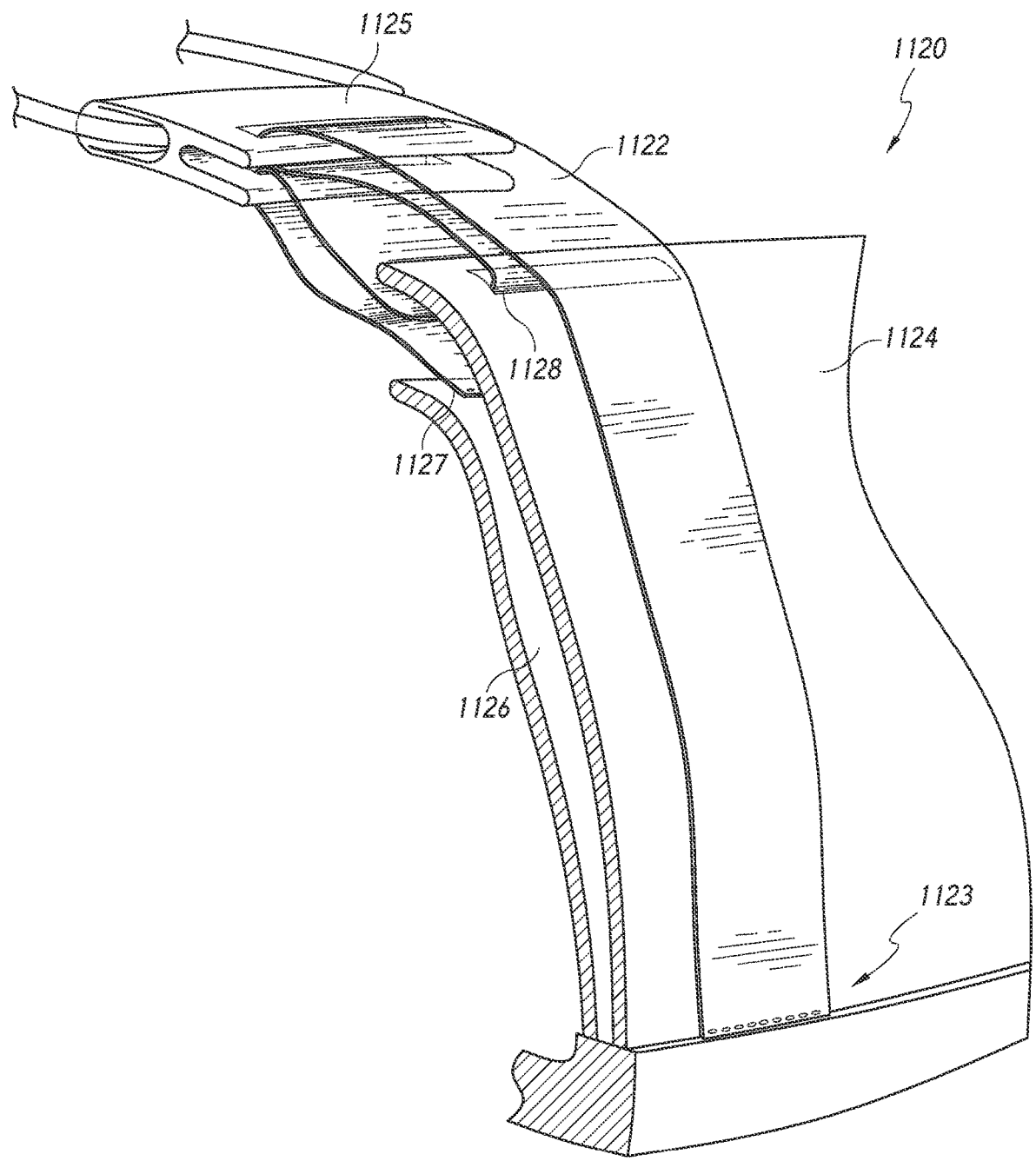

Referring now to FIG. 11D, illustrated is another embodiment 1120 of a strap 1122 that is coupled with a shoe in a high-low configuration. A distal end 1123 of the strap 1122 is coupled near the shoe's outsole while a proximal end or region of strap 1122 is coupled near the shoe's eyestay. Embodiment 1120 differs from previous embodiments in that the proximal region of the strap 1122 is coupled with both the upper material 1124 and with a material layer 1126 that is positioned immediately below the upper material 1124. Specifically, the strap 1122 is directed or guided toward upper material 1124 via a transition guide 1125 and inserted within a slot or aperture 1128 of the upper material 1124. The strap 1122 is then redirected or guided back toward the inner layer 1126 and a proximal end 1127 of the strap 1122 is coupled with the inner layer 1126 via adhesive bonding, stitching, RF welding, sonic welding, heat press, and the like. The strap arrangement of embodiment 1120 functions to simultaneously tension both the upper material 1124 and the inner layer 1126 while pulling or pressing the upper material 1124 inward against the user's foot.

Figure 11E:
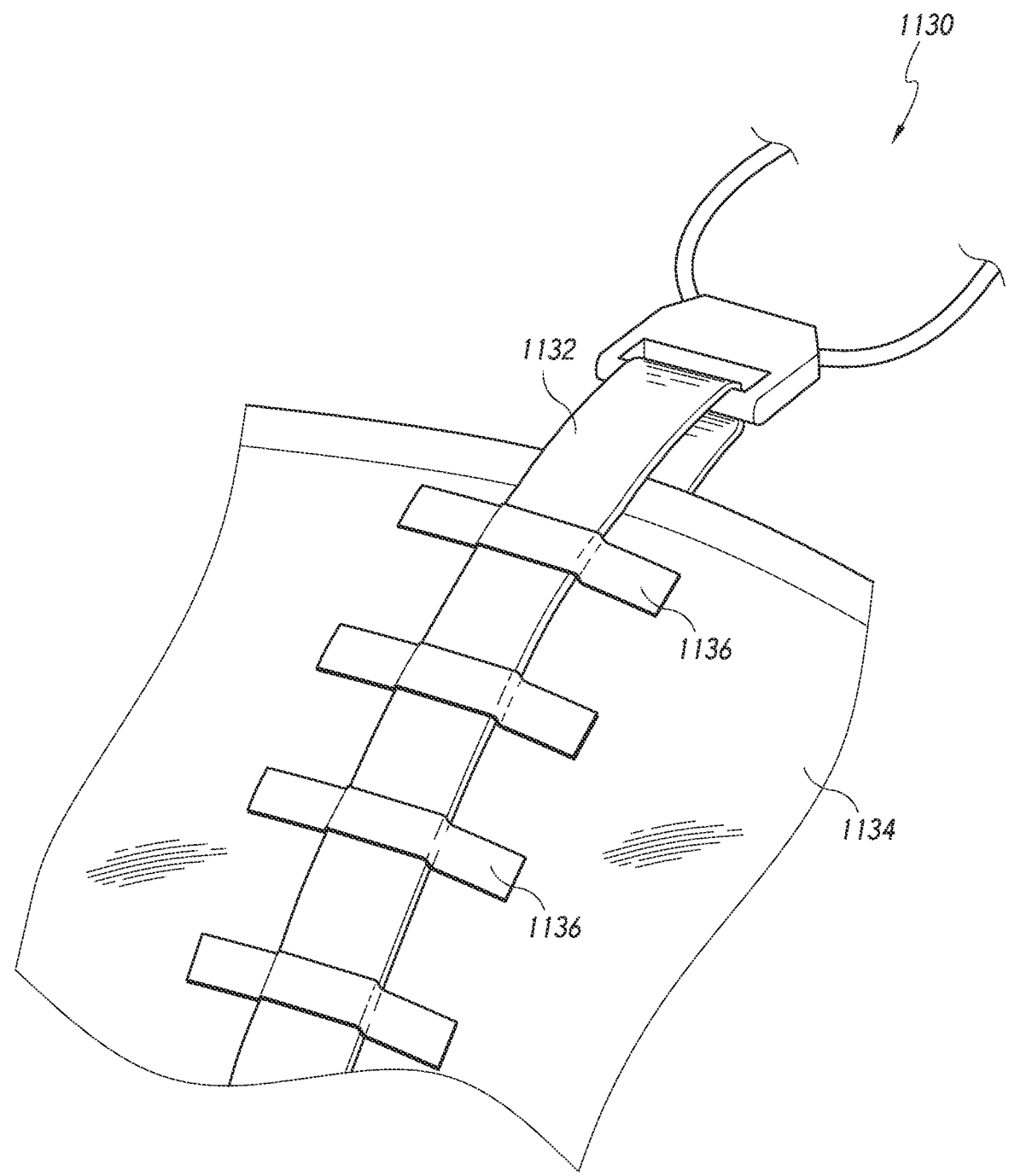

Referring now to FIG. 11E, illustrated is an embodiment 1130 of a strap 1132 that is coupled with a shoe in a high-low configuration. The strap 1132 is slidably coupled with the upper material 1134 via a plurality of strips 1136 that extend laterally across strap 1132 and that are coupled with the upper material 1134. The strips 1136 replace the need for a sleeve as in the previous embodiments while allowing the strap 1132 to be slidably coupled with upper material 1134.

The number and positioning of the strips 1136 may be selected as desired based on the shoe configuration and/or other needs.

Exemplary High-Low Panel Configurations

Referring now to FIGS. 12A-12G, in some embodiments, the straps, lace, or other tension elements of the shoe may be coupled with panels or other components that tensions the low and/or high portions of the shoe. The panels may distribute the force that is exerted on the shoe as the straps, lace, or tension elements are tensioned, thereby reducing or eliminating the need for pressure distribution panels. In some embodiments, the panels may be used to direct the force to a desired area of the shoe as desired.

Figure 12A:
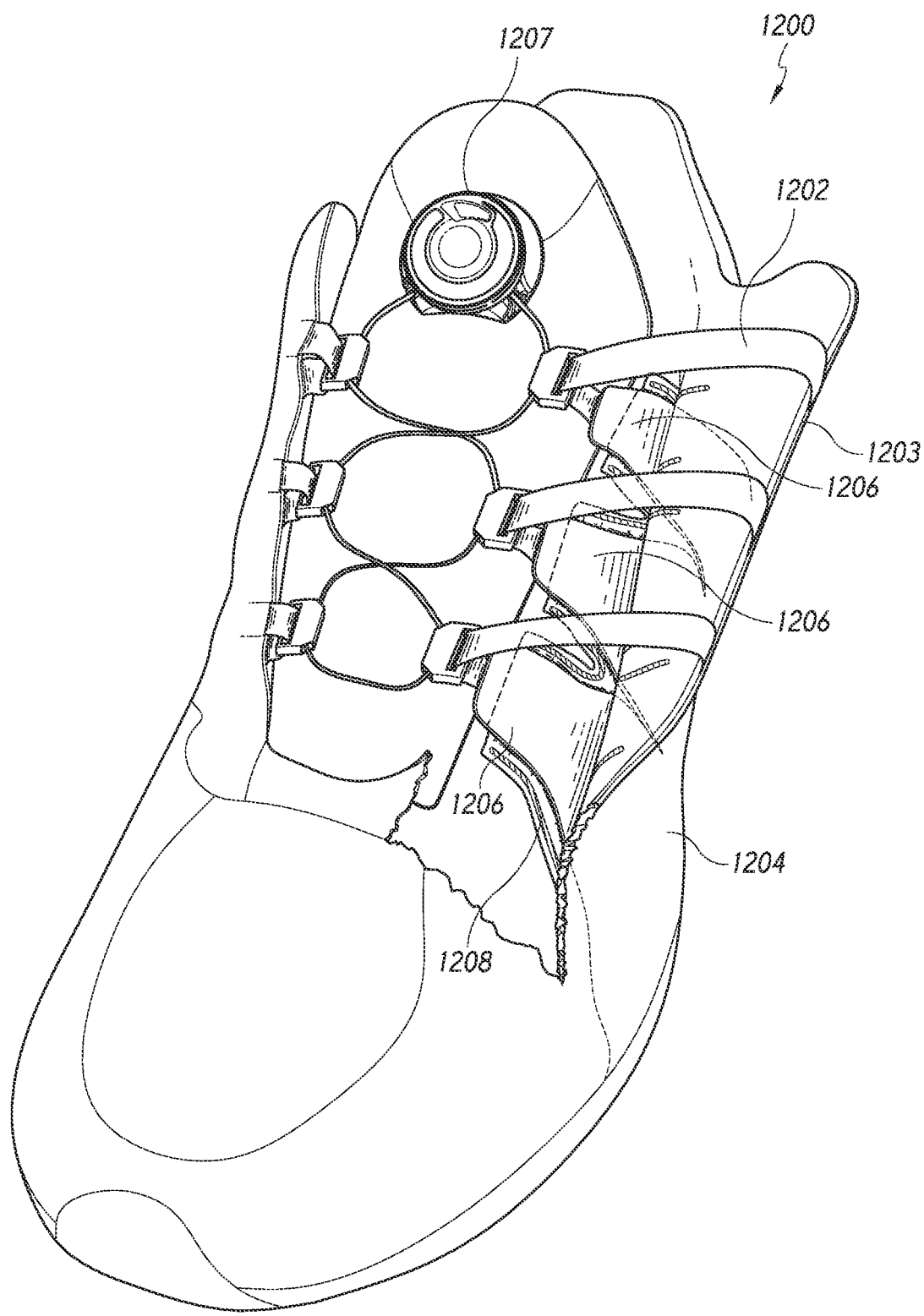
FIGS. 12A-12G illustrate straps, lace, or other tension elements of a shoe coupled with panels or other components that tension low and/or high portions of the shoe.

FIG. 12A illustrates an embodiment 1200 in which a plurality of panels 1206 are used to tension the lower portions of a shoe. The panels 1206 are slidably disposed between the upper material 1204 and an inner layer of material 1208. The inner layer of material 1208 is coupled with the upper material 1204 to allow the panels 1206 to slide relative to the upper material 1204 and/or inner layer 1208. The inner layer of material 1208 may be coupled with the upper material 1204 via stitching, adhesive bonding, RF welding, heat press, and the like. A proximal end of each strap 1202 is coupled with a respective panel 1206 while a distal end of each strap 1202 is coupled near the eyestay 1203 of the upper material 1204. In this manner, the straps 1202 pull or tension the eyestay 1203 while simultaneously pulling or tensioning the panels 1206. Because the inner layer of material 1208 is coupled with the upper material 1204, the upper material 1204 is tensioned as the panel 1206 is tensioned. Thus, the upper material 1204, or otherwise the outer material of the shoe, is pulled or pressed firmly against the user's foot as the panel 1206 is tensioned. Stated differently, because the upper material 1204 is coupled with the inner layer of material 1208, a gap is not created or otherwise formed between the upper material 1204 and the panel 1206 or inner layer of material 1208 as the panel 1206 is tensioned. In some embodiments, the panels 1206 may be discreet segments or components while in other embodiments, the panels 1206 may be a unitary or single panel component that is positioned between the upper material 1204 and inner layer 1208.

Figure 12B:
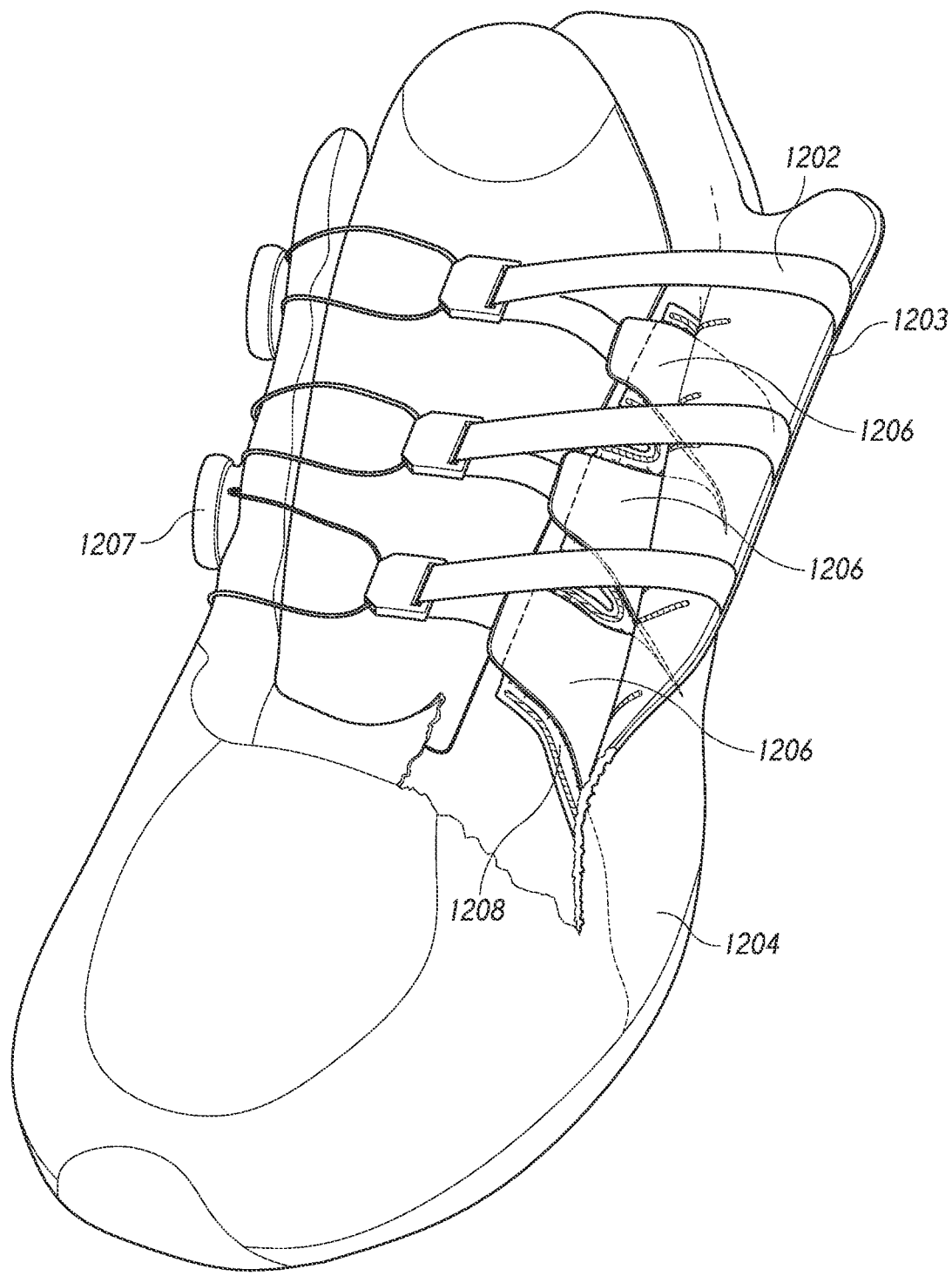

The embodiment 1200 illustrates the upper material 1204 on the lateral side of the shoe folded backwards to reveal the panels 1206 positioned between the upper material 1204 and the inner layer 1208. A similar panel arrangement may be utilized on the medial side of the shoe as well so that the upper material on both sides of the shoe is pulled or pressed against the user's foot as the panels 1206 are tensioned. The embodiment 1200 also illustrates a reel assembly 1207 of a reel based lacing system being positioned or coupled with the tongue of the shoe. This arrangement may provide a relatively uniform tensioning of the straps 1202 and panels 1206 on each side of the shoe. As illustrated in FIG. 12B, in other embodiments, one or more reel assemblies 1207 may be positioned on one side of the shoe and operated to tension panels 1206 positioned on the opposite side of the shoe.

Figure 12C:
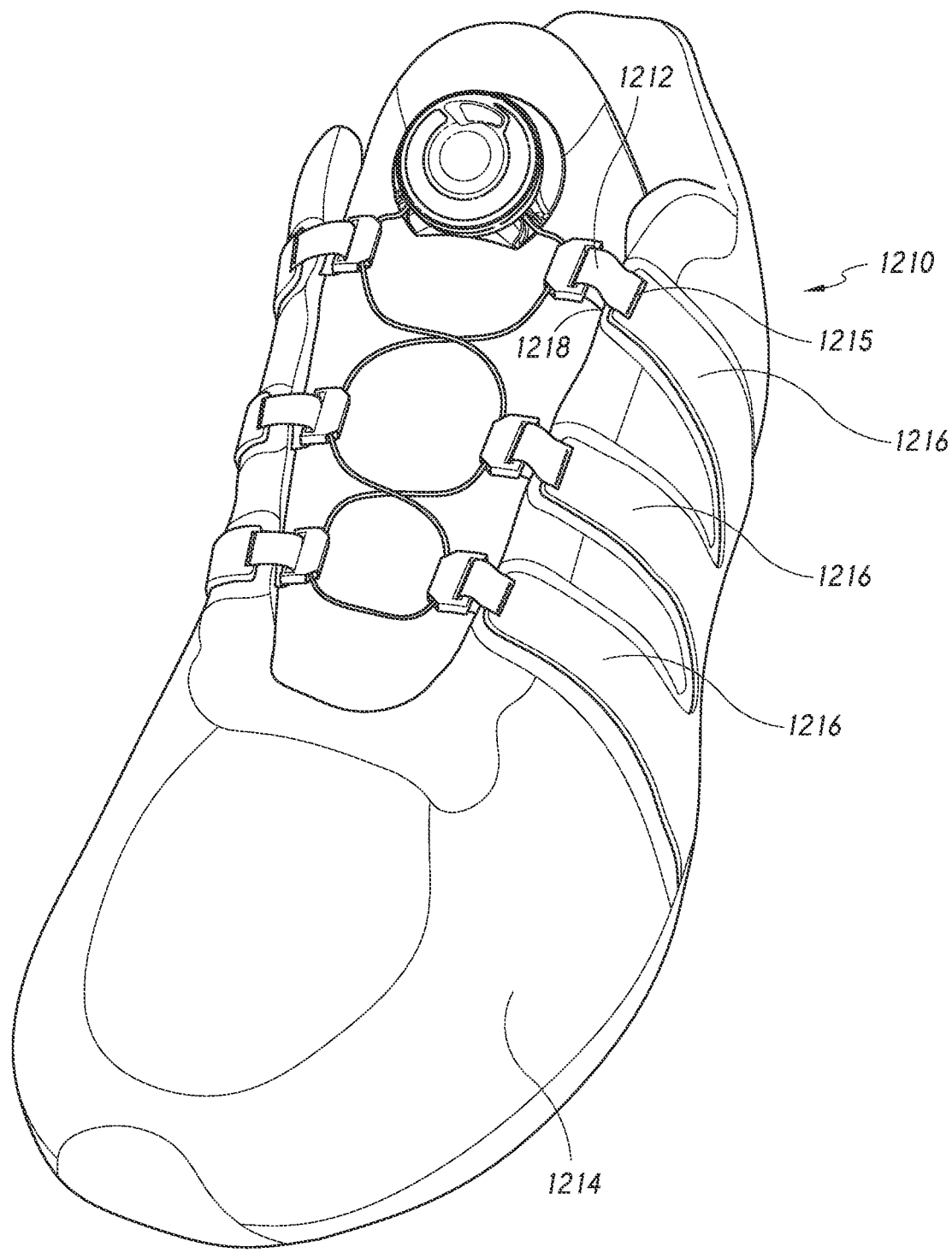

Referring now to FIG. 12C, illustrated is another embodiment 1210 of a high-low panel configuration that may be used to tension or close a shoe. Unlike embodiment 1200, the panels 1216 in embodiment 1210 are positioned on the outer surface of upper material 1214. Because the panels 1216 are positioned on the outer surface of upper material 1214, the panels 1216 do not need to be slidably disposed within a sleeve. Rather, as the panels 1216 are tensioned, the panels are pressed against the outer surface of the upper material 1214, which presses the upper material 1214 inward and against the user's foot. A distal end 1215 of each strap 1212 is coupled with a proximal end of a respective panel 1216, while a proximal end 1218 of each strap 1212 is coupled near the eyestay of the shoe. The straps 1212 simultaneously tension the eyestay of the shoe and each panel 1216. The panel 1216 in turn tensions the lower portions of the shoe (e.g., near the outsole) and pulls or presses the upper material 1214 inward against the user's foot. The straps 1212 may be coupled with transition guides that are in turn coupled with lace of a reel based tensioning system as described herein.

The panels 1216 may be individual in discrete panel segments, or may be fingers or projections of a solitary and/or single panel component. The design and/or arrangement of the panels 1216 may be customized to provide a unique look to the shoe and/or a unique fit of the shoe as desired. The medial and/or lateral sides of the shoe of FIG. 12C may include the panel arrangement as desired.

Figure 12D:
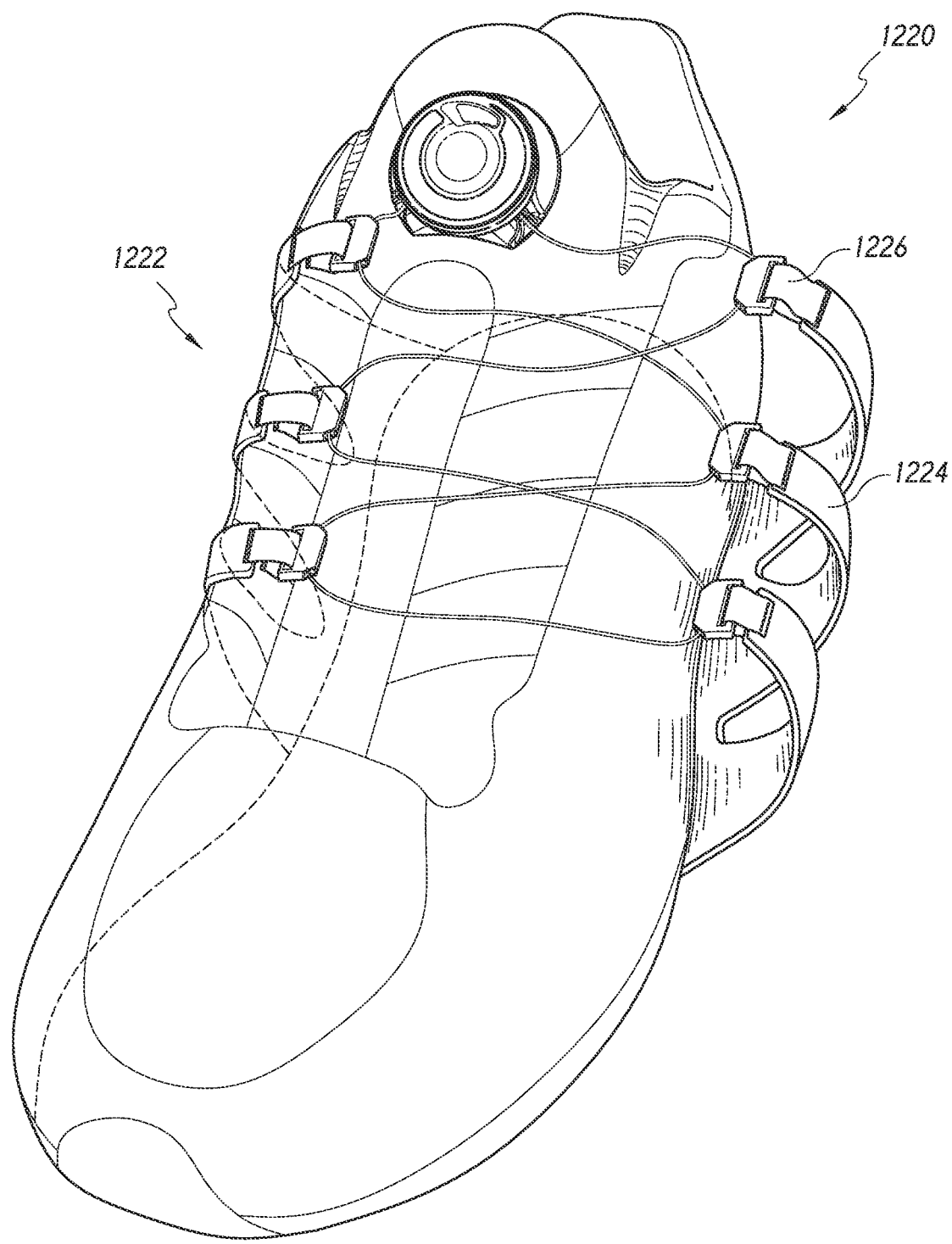

Referring now to FIG. 12D, illustrated is another embodiment 1220 of a high-low panel configuration. Embodiment 1220 differs from embodiment 1210 in that one side of the shoe includes the high-low panel configuration while an opposite side includes a panel cover or shell arrangement. Stated differently, one side of the shoe is able to tension both the upper and lower portions of the shoe while the opposite side only tensions the lower portions of the shoe. As illustrated in FIG. 12D, the medial side of the shoe includes a high-low panel arrangement 1222 similar to that described in embodiment 1210. The high-low panel arrangement 1222 of the medial side of the shoe is able to tension both the upper and lower portions of the shoe as previously described and to pull or press the upper material inward against the user's foot.

The lateral side of the shoe also includes a plurality of panels 1224, but each panel 1224 is directly attached to the proximal and distal ends of the straps 1226. Stated differently, one end of each strap 1226 is not attached to and/or near the eyestay of the shoe. Rather, both ends of the strap 1226 are attached to a respective panel 1224. Accordingly, the straps 1226 on the lateral side of the shoe are not able to tension the upper portions of the shoe, but are only able to tension the panels 1224 which tension the lower portions of the shoe. Tensioning of the panels 1224 pulls the upper material on the lateral side of the shoe into contact the user's foot, but does not function to tension or close the eyestay. In embodiments utilizing the panel configuration of FIG. 12D, it may be preferable to position the high-low panel arrangement 1222 on the medial side of the shoe so as to tension the eyestay on the medial side of the shoe and pull the upper material inward against the foot's arch. In other embodiments, the high-low panel arrangement 1222 may be positioned on the lateral side of the shoe.

Figure 12E:
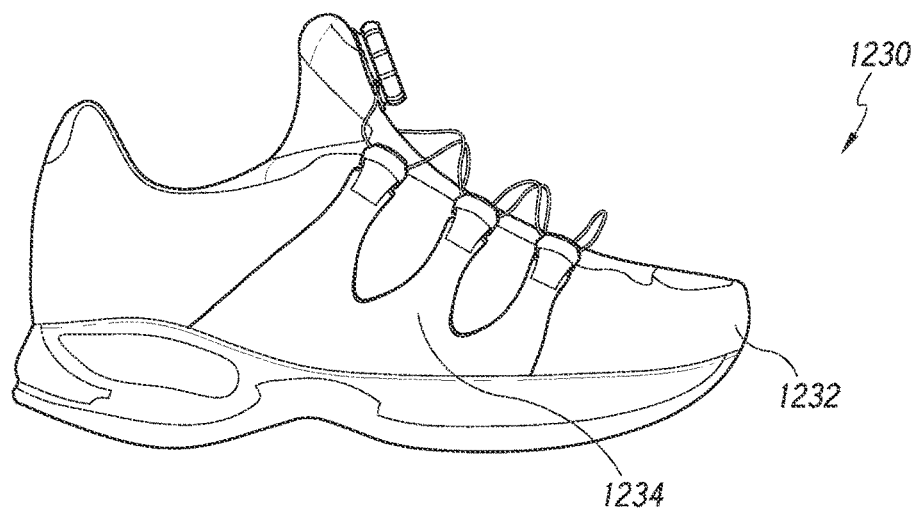
Figure 12F:
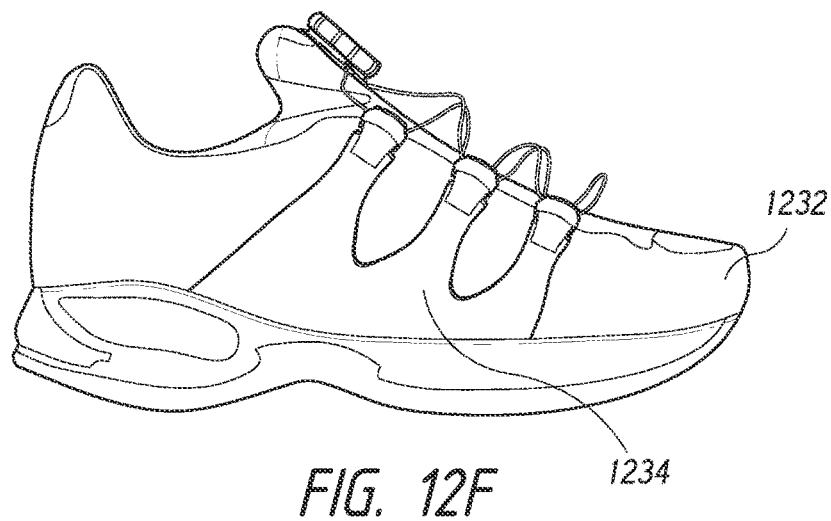
Figure 12G:
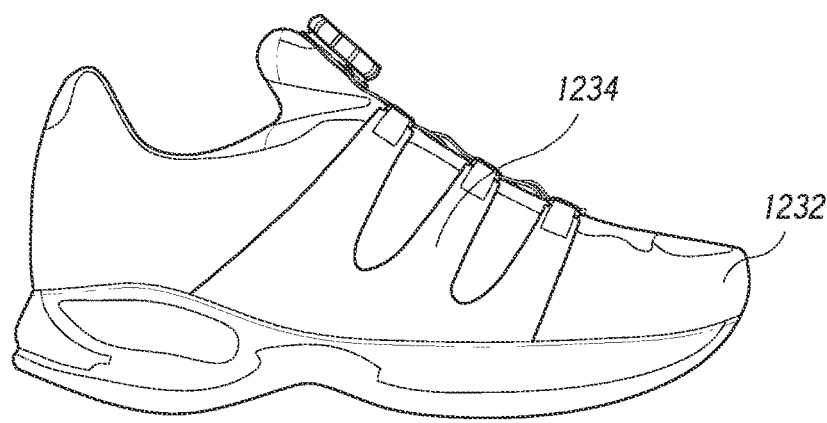

FIGS. 12E-12G illustrate panels 1234 being tensioned and sliding or moving relative to the shoe 1232. As illustrated, the panels 1234 may be made of a flexible or resilient material that allows the panels 1234 to stretch and move or slide relative to the shoe 1232 as the panels 1234 are tensioned. The flexible or resilient material of the panels 1234 may allow the panels 1234 to more closely conform to the user's foot as the panels 1234 are tensioned, which may increase the contact between the upper material and the user's foot. The panels 1234 may represent any of the panels described in FIGS. 12A-12D.

Multiple Zone High-Low Strap/Lace Configurations

Figure 13A:
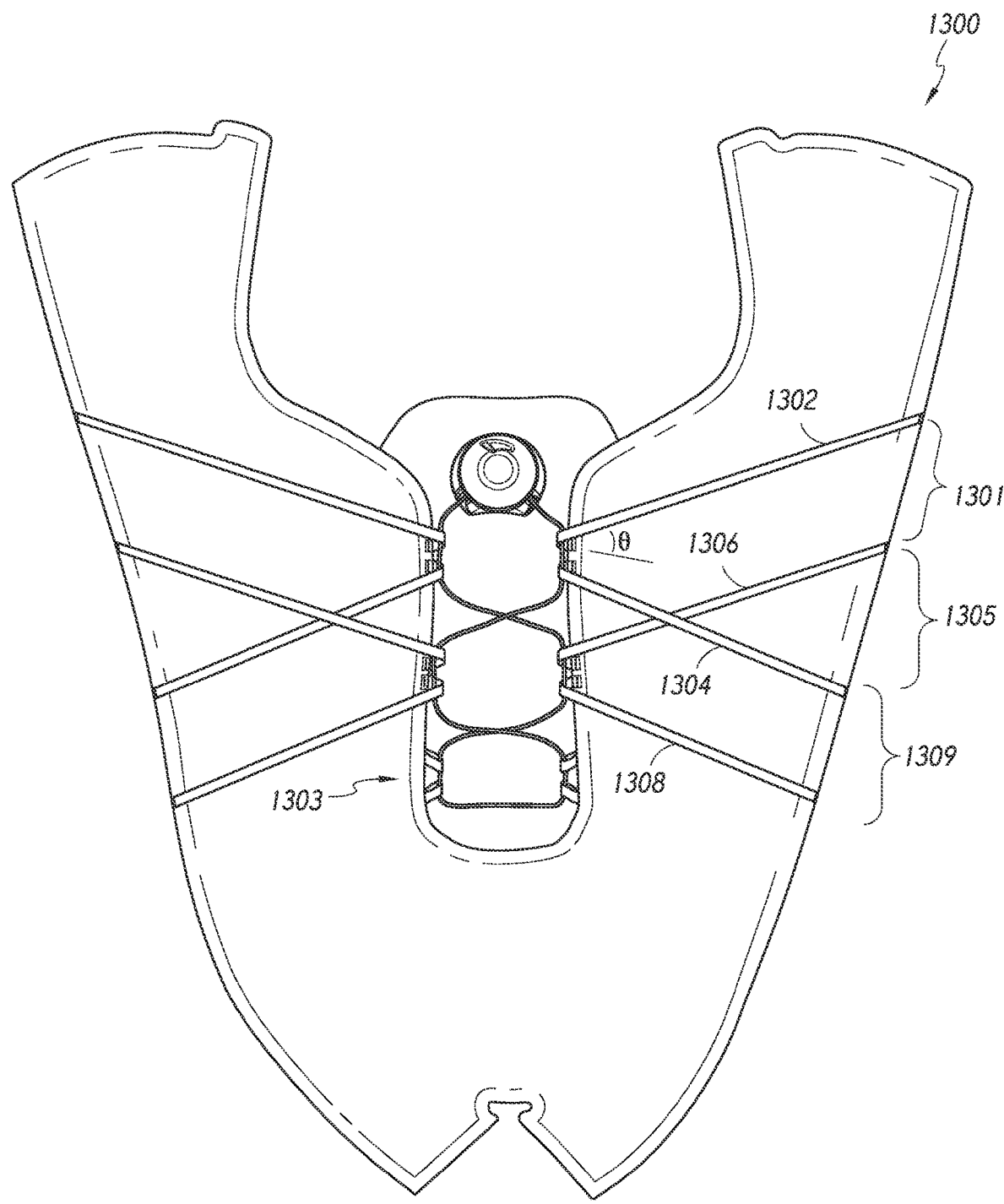
FIGS. 13A-13D illustrate embodiments where straps and/or lace are used to tension multiple zones of a shoe in an overlapping configuration.

In some embodiments, the straps and/or lace may be used to tension multiple zones of the shoe. The straps and/or lace may be overlapped to apply a specific pressure to a desired region of the shoe. The embodiments of FIGS. 13A-13D illustrate embodiments where straps and/or lace are used to tension multiple zones in an overlapping configuration. For example, FIG. 13A illustrates an embodiment 1300 in which a first strap 1302, a second strap 1304, a third strap 1306, and a fourth strap 1308 are each configured with a high-low arrangement with a first end coupled at or near the shoe's eyestay and a second end coupled at or near the shoe's outsole. Each strap is also arranged about the shoe to have an angled configuration, or in other words a first portion and a second portion of the strap form an angle θ so that the laces extend diagonally across the side of the shoe. The angle θ of adjacent straps may be roughly opposite so that the adjacent straps extend diagonally across the shoe in opposite directions.

The first strap 1302 and second strap 1304 may form webbing loops that cooperatively guide or direct a lace or another tension member of a reel based tensioning system. The third strap 1306 and fourth strap 1308 may likewise form webbing loops that cooperatively guide or direct the lace. The arrangement of the straps enables a first zone 1307 of the shoe to be tensioned via the first and third straps, 1302 and 1306, a second zone 1309 of the shoe to be tensioned via the second and fourth straps, 1304 and 1308, and a third zone 1305 of the shoe to be tensioned via the second and third straps, 1304 and 1306.

The arrangement of the straps also results in the first strap 1302 and the third strap 1306 extending diagonally across the shoe toward the heel portion of the shoe while the second strap 1304 and fourth strap 1308 extend diagonally across the shoe toward the toe portion of the shoe. This arrangement of the straps may aid in firmly holding the user's foot within the shoe by pulling both the heel portion and the toe portion of the shoe tightly against the user's foot. Further, the crisscrossing of the second lace 1304 and third lace 1306 may apply a greater pressure against the user's foot at this position. Additional advantages of the crisscrossing laces may include: covering or spanning a greater area of the upper for optimal tensioning, increasing the aesthetic appearance of the shoe, and the like. The shoe may also include one or more other webbing or fabric guides 1303, or other guides, that are coupled with the shoe in an arrangement other than the high-low configuration described herein.

Figure 13B:
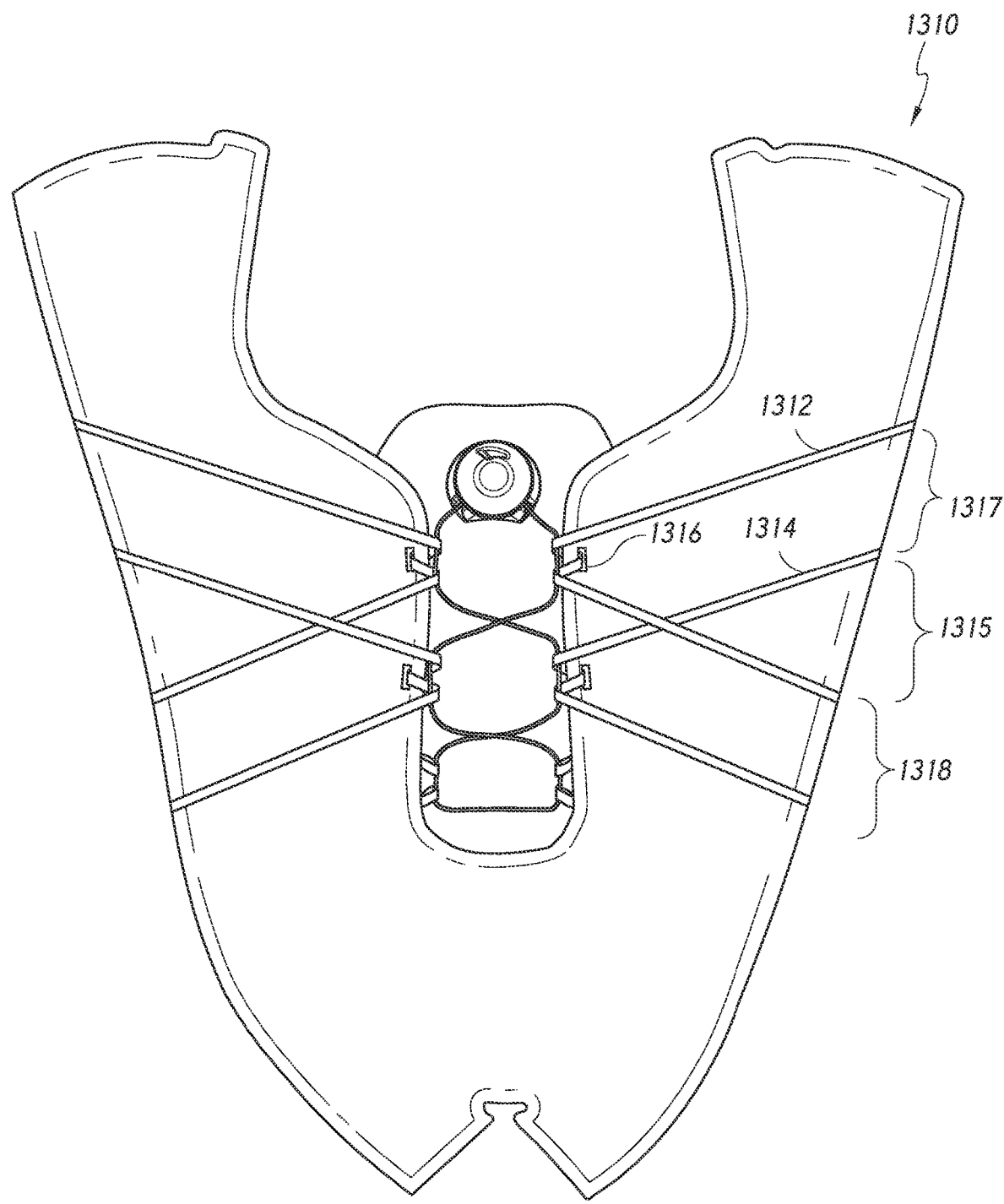

Referring now to FIG. 13B, illustrated is another embodiment 1310 of crisscrossing straps that are each arranged in the high-low configuration described herein. Embodiment 1310 includes a first strap 1312 and a second strap 1314 that have a configuration similar to the embodiment 1300 previously described. Embodiment 1310, however, utilizes two straps instead of the four strap arrangement of embodiment 1300. For example, a proximal end of first strap 1312 is coupled near the outsole of the shoe. The first strap 1312 extends diagonally across the outer surface of the shoe and winds around a lace of a reel based tensioning system. The first strap 1312 is then disposed through an aperture or hole 1316 positioned near the eyestay of the shoe and winds back around the lace of the reel based tensioning system. The first strap 1312 finally extends diagonally across the outer surface the shoe and a distal end of the first strap 1312 is coupled near the outsole the shoe. The result is a "W" type arrangement of the first strap 1312 about the upper material of the shoe. The second strap 1314 is similarly arranged.

A proximal portion of both the first strap 1312 and the second strap 1314 tension a first zone 1317 of the shoe while a distal portion of both the first strap 1312 and the second strap 1314 tension a second zone 1318 of the shoe. The proximal portion of the second strap 1314 and the distal portion of the first strap 1312 tension a third zone 1315. In this manner, two straps, 1312 and 1314, function to tension the shoe and/or provide the other benefits previously described.

Figure 13C:
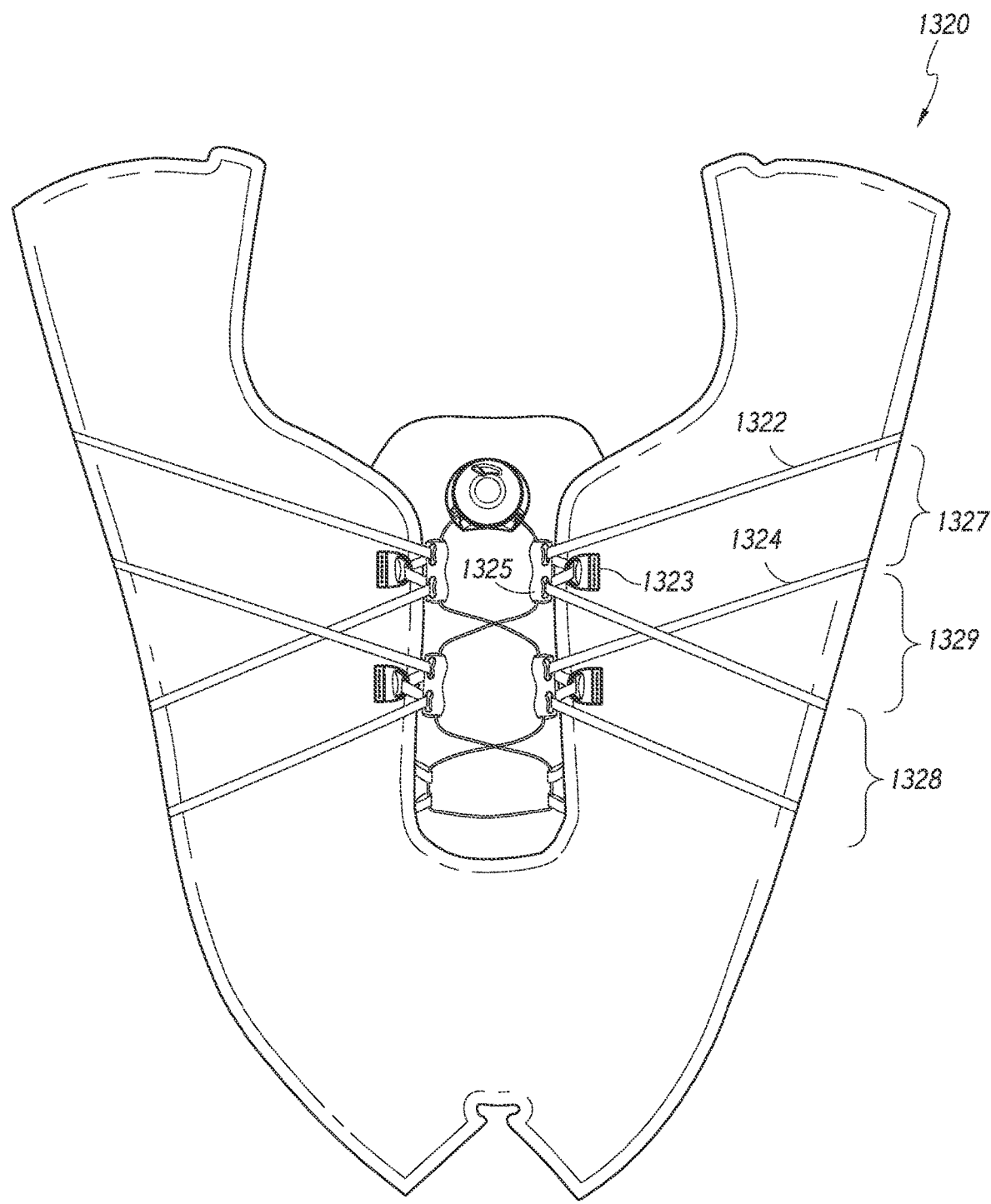

Referring now to FIG. 13C, illustrated is another embodiment 1320 of crisscrossing straps that are each arranged in the high-low configuration described herein. Embodiment 1320 is similar to embodiment 1310 in that embodiment 1320 includes a first strap 1322 and a second strap 1324 having a first portion and a second portion that extend diagonally across the outer surface of the shoe in a "W" type pattern and that tension a first zone 1327, a second zone 1328, and a third zone 1329 as previously described. Embodiment 1320 differs from embodiment 1310 in that the first strap 1322 and/or second strap 1324 are positioned and guided by a first guide 1325 that couples with the lace of a reel based tensioning system and/or are guided by a second guide 1323 that is coupled near the eyestay of the shoe. The use of the first guide 1325 and/or second guide 1323 allows the first lace 1322 and second lace 1324 to be positioned above the outer surface of the shoe. The use of the guides, 1325 and/or 1323, may also reduce friction loss in the system. The configurations of FIGS. 13B and 13C allow the straps to dynamically shift between the first and second tension zones as the user's foot shifts within the shoe and/or as various activities are performed. The dynamic shifting of the straps may provide an improved comfort and/or fit of the shoe about the user's foot.

It should be realized that the straps of the configurations of FIGS. 13A-13D may be replaced with lace or another tension member and/or that the described strap configurations may be applied to either the medial side of the shoe, the lateral side of the shoe, or both sides of the shoe as desired.

Figure 13D:
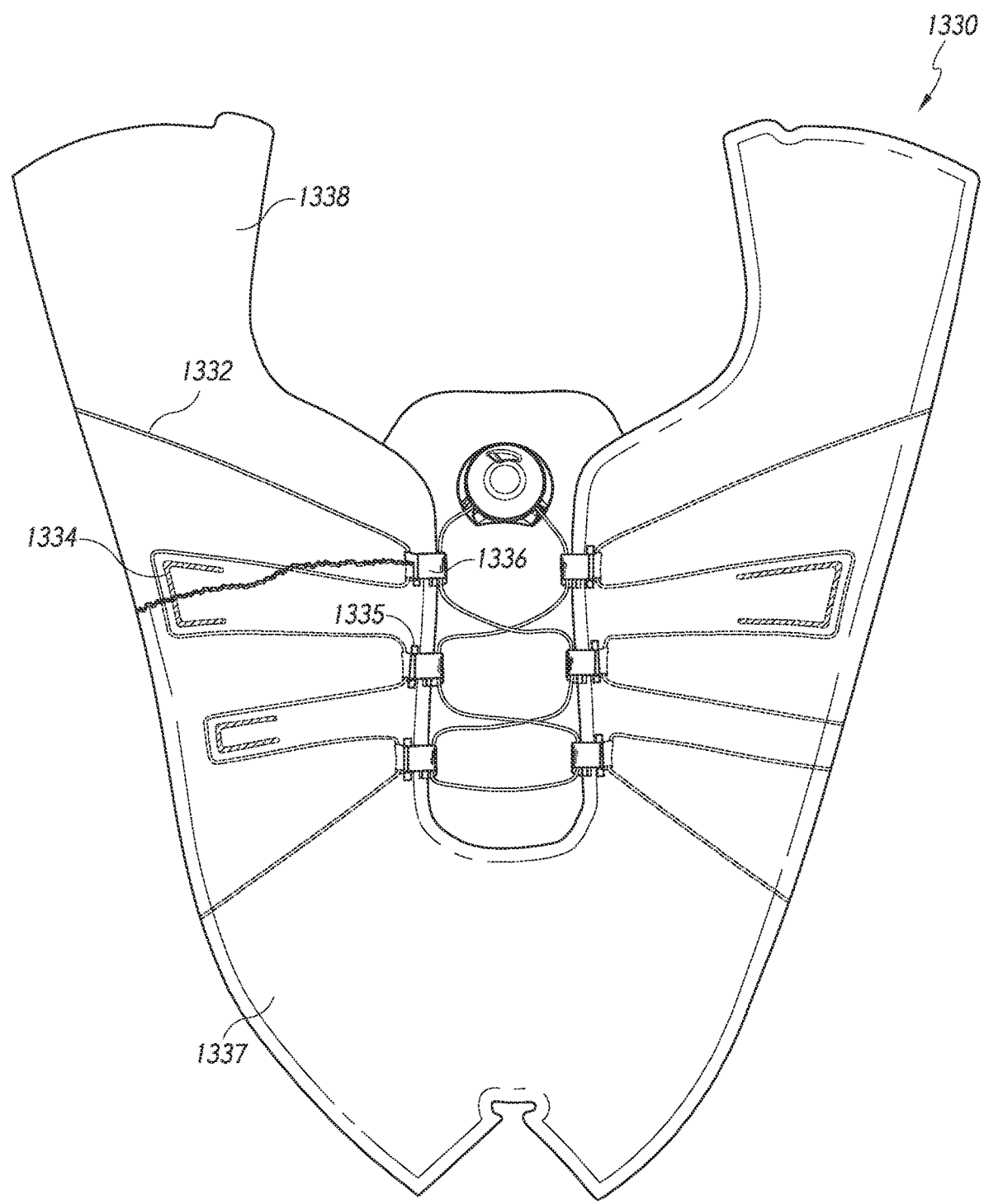

Referring now to FIG. 13D, illustrated is another embodiment 1330 of a high-low lace configuration that may be used in tightening a shoe. Embodiment 1330 includes a single lace 1332 that is routed or directed between the heel portion and the toe portion of the shoe via a plurality of guides to create multiple high-low tensioning zones. The lace 1332 may be positioned between the upper material 1337 and an inner layer of material 1338 so as to be hidden from view. A proximal end of the lace 1332 is coupled near the outsole of the shoe. The lace then extends diagonally across the shoe to a high-point guide 1336 having a proximal end that couples with and guides or directs the lace 1332 and a distal end that couples with the shoe, preferably near the eyestay. In some embodiments, the high-point guide 1336 is a fabric or soft (e.g., webbing) material while in other embodiments the high-point guide 1336 is a relatively rigid or plastic component. The proximal end of the high-point guide 1336 may be positioned within a slot or aperture 1335 of the upper material 1337 so as to be hidden from view.

The lace 1332 extends from the high-point guide 1336 and around a low-point guide 1334 that is positioned near the outsole of the shoe. The extension of the lace 1332 from the high-point guide 1336 to the low-point guide 1334 forms a first high-low tension zone or lace arrangement as described herein. The lace 1332 may extend from the low-point guide 1334 and through or around one or more high-point guides 1336 and low-point guides 1334 to create additional high-low tension zones as illustrated in FIG. 13D. A distal end the lace 1332 is ultimately coupled near the outsole of the shoe so that the lace 1332 extends between the heel portion and toe portion and forms a plurality of high-low tension zones or lace arrangements.

In some embodiments, the low-point guides 1334 may be formed by coupling the upper material 1337 and the inner material layer 1338 together to form an arcuate or u-shaped coupled material portion. The arcuate or u-shaped coupled material portion may function as a lace guide that directs, routes, or otherwise guides the lace along a lace path between adjacent high point guides 1336. Exemplary embodiments of coupling materials to form arcuate or u-shaped guides are provided in U.S. patent application Ser. No. 14/479,173, filed Sep. 5, 2014, entitled "Guides and Components for Closure Systems and Methods Therefor," the entire disclosure of which is incorporated by reference herein.

The single lace 1332 configuration of embodiment 1330 allows the lace to dynamically shift between the multiple high-low tension zones as the user wears the shoe and flexes their foot in response to various activities. In some embodiments, multiple laces may be used and arranged according to embodiment 1330 or according to any of the other embodiments described herein.

Dynamic Shifting High-Low Lace Configurations

Figure 14A:
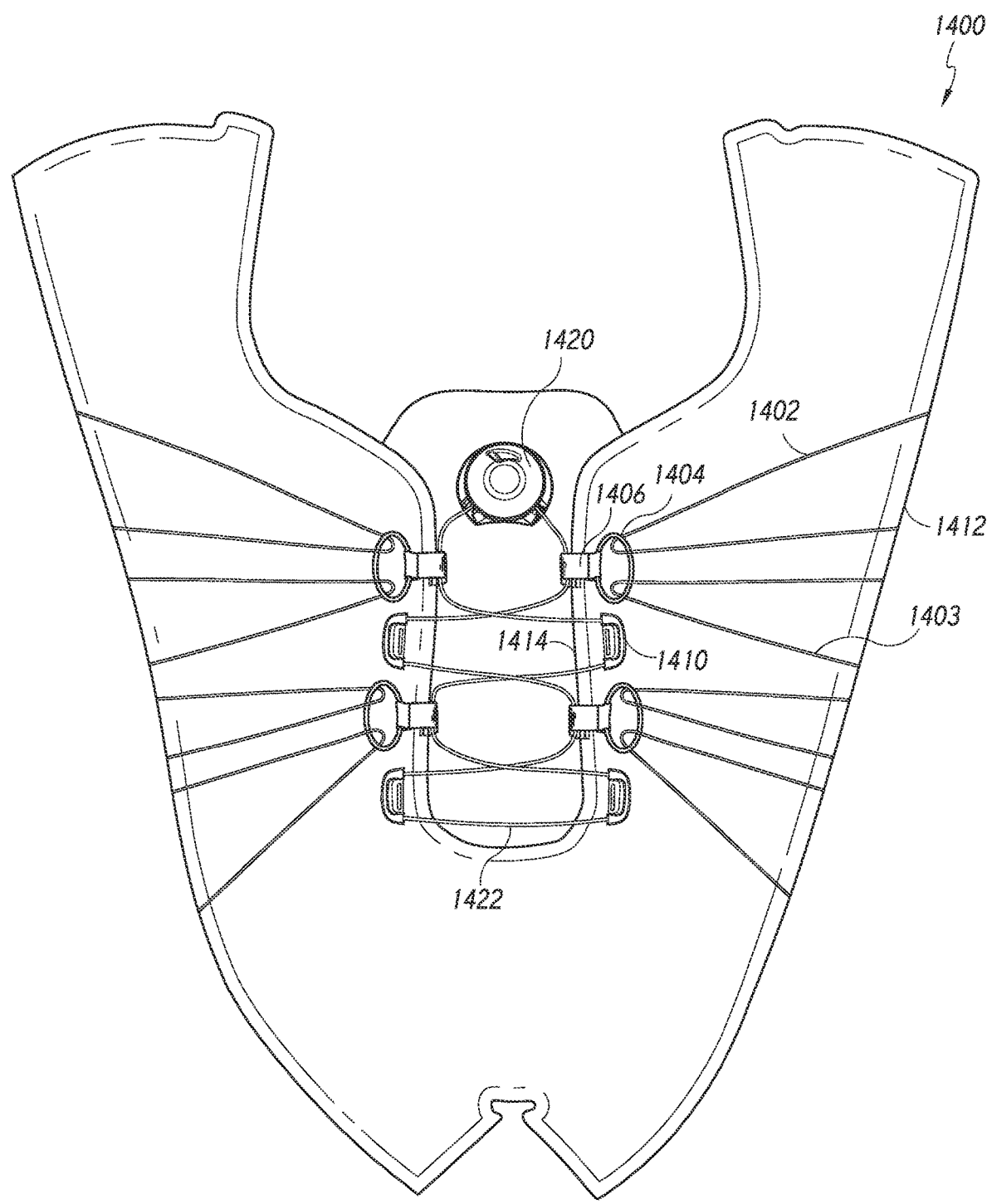
FIGS. 14A-14I illustrate embodiments of high-low lace configurations that allow the lace of tension member of a shoe to dynamically shift.
Figure 14B:
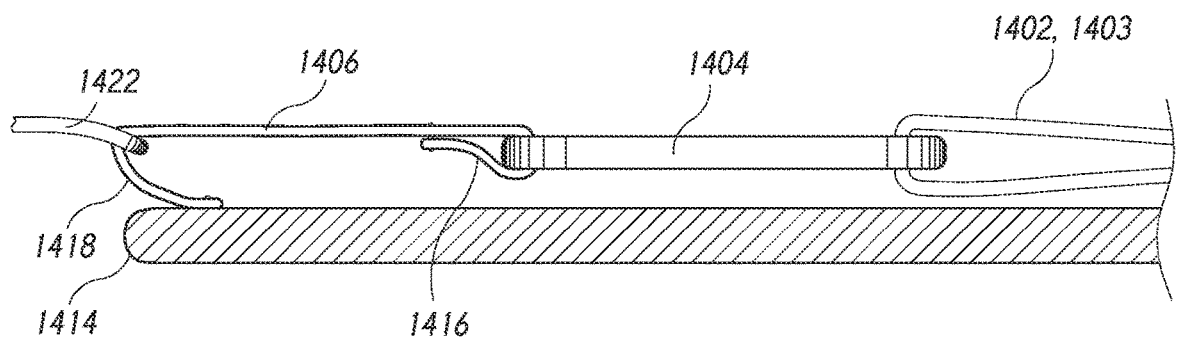
Figure 14C:
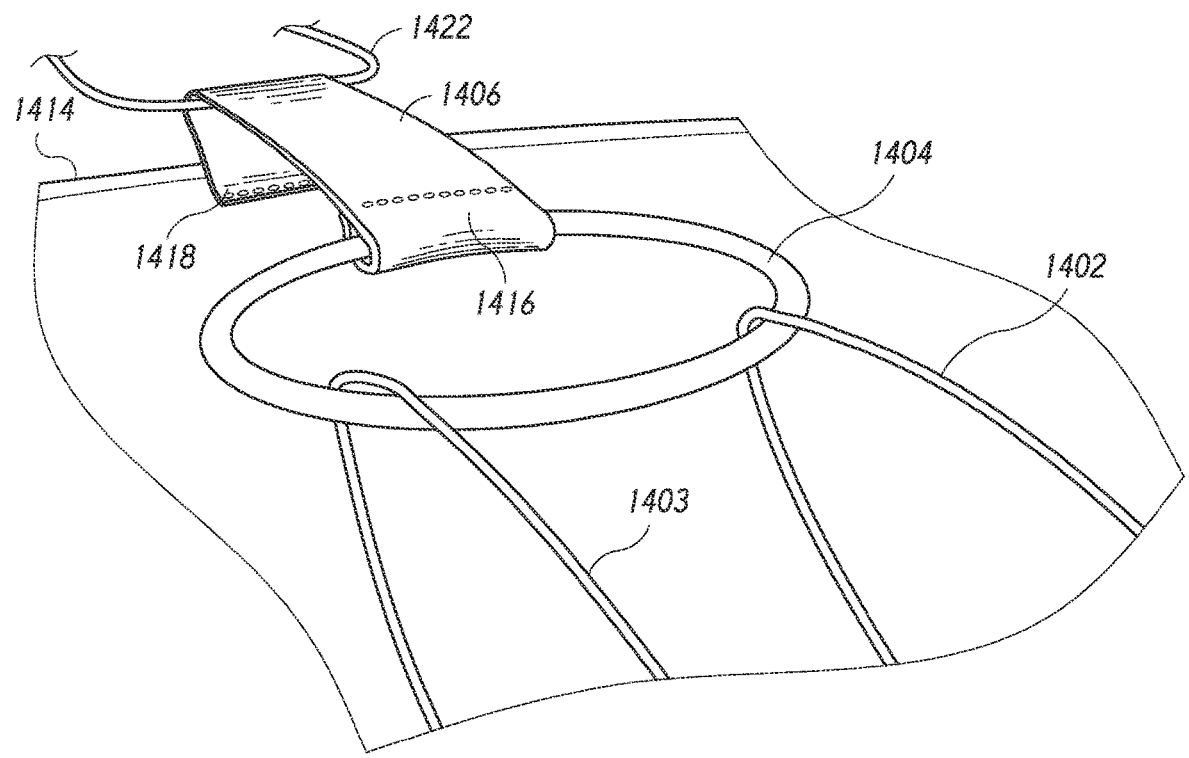

Referring now to FIGS. 14A-14I, illustrated is an embodiment 1400 of a high low lace configuration that allows the lace of the shoe to dynamically shift. The embodiment 1400 includes a ring-shaped guide 1404 that is coupled with a strap 1406 that is attached near the eyestay 1414 of the shoe. As shown in FIGS. 14B and 14C, strap 1406 is coupled at a proximal end 1418 near the shoe's eyestay 1414 while a distal end 1416 is coupled with the ring-shaped guide 1404. The strap 1406 forms a webbing loop through which lace 1422 of a reel based tensioning system 1420 is positioned. As the lace 1422 is tensioned via reel assembly 1420, the strap 1406 is pulled toward the eyestay 1414, which pulls the ring-shaped guide 1404 toward the eyestay 1414 as well. A first lace 1402 and a second lace 1403 are looped around the ring-shaped guide 1404 and coupled near the outsole 1412 of the shoe. Specifically, both the proximal and distal ends of the first lace 1402 and second lace 1403 are coupled near the outsole 1412 of the shoe.

Because the first lace 1402 and second lace 1403 are looped around the ring-shaped guide 1404, the first lace 1402 and second lace 1403 are able to slide around the ring-shaped guide body 1404 and thereby dynamically shift or move to equalize tension in the respective lace. In addition, the ring-shaped guide 1404 is able to pivot or move within the strap 1406 which allows the tension in the first lace 1402 and the second lace 1403 to be equalized. Stated differently, if the tension is greater in either the first lace 1402 or the second lace 1403, the unequal tension will cause the ring-shaped guide 1404 to move within or relative to strap 1406 until the tension in each lace is roughly equalized. The embodiment 1400 may also include one or more static lace guides 1410 that are similar to conventional lace guides.

Figure 14D:
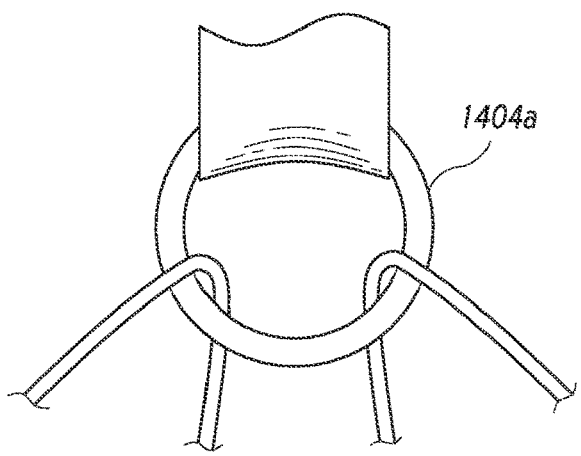
Figure 14E:
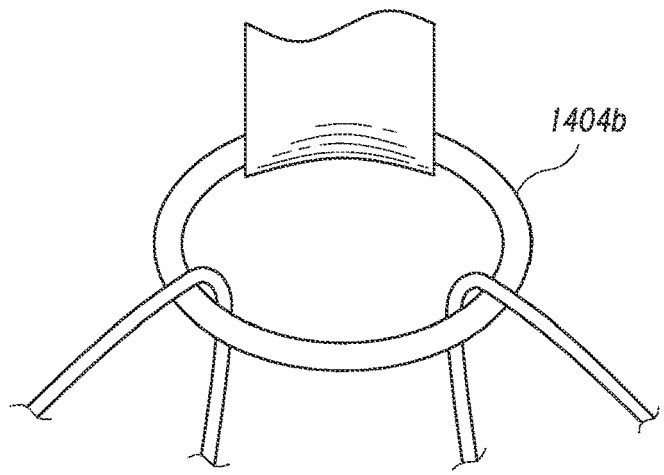
Figure 14F:
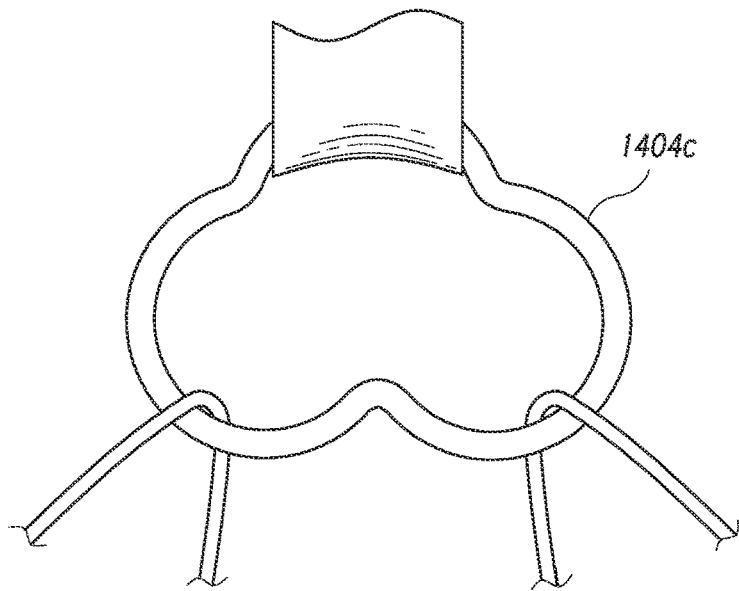

FIGS. 14D-14F illustrate various embodiments of ring-shaped guides 1404. Specifically, FIG. 14D illustrates that in some embodiments the ring-shaped guide 1404a may be a circular ring. In other embodiments, the ring-shaped guide 1404b may be oval in shape as shown in FIG. 14E. In yet other embodiments, the ring-shaped guide 1404c may be a combination of three circular portions as shown in FIG. 14F. Various other configurations of the ring-shaped guide 1404 are possible depending on the need and/or application.

Figure 14G:
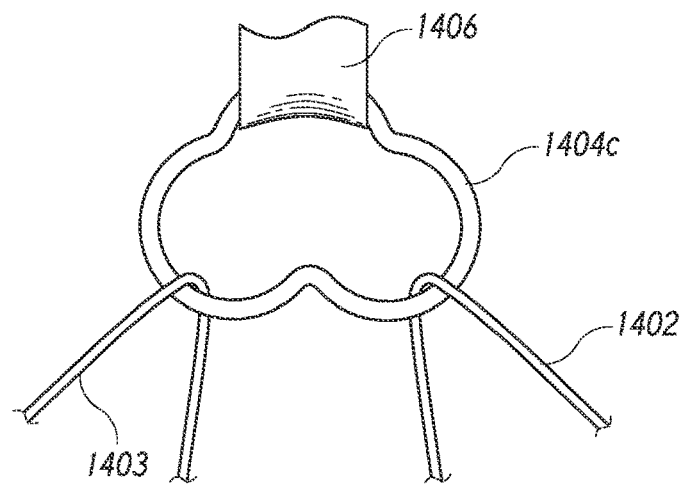
Figure 14H:
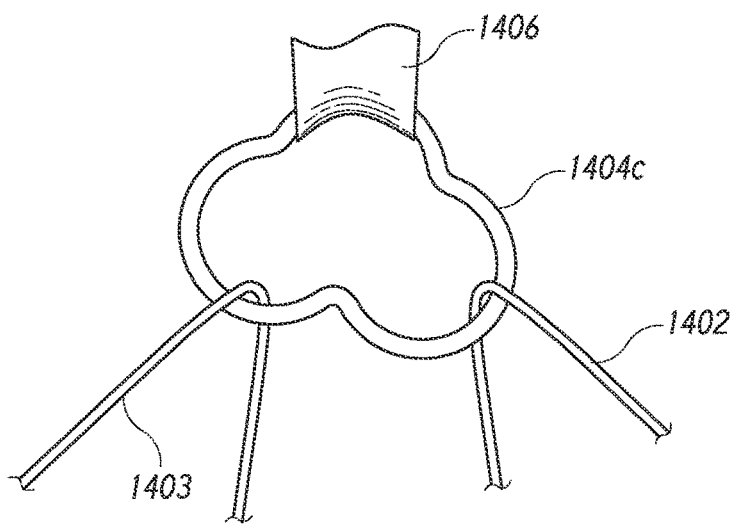
Figure 14I:
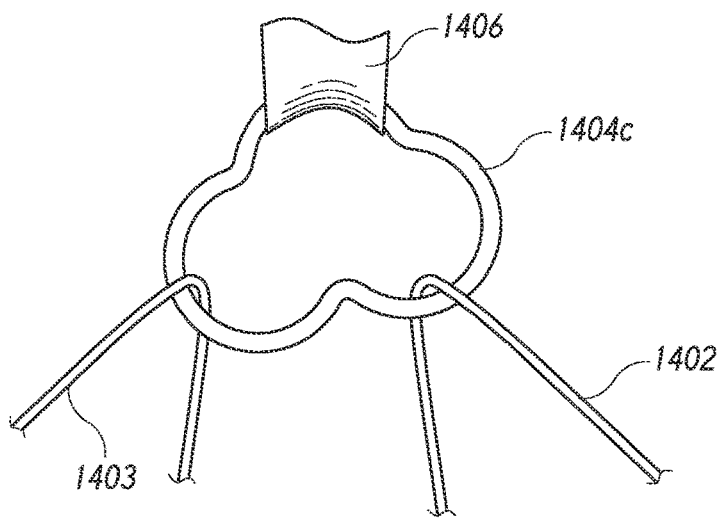

FIGS. 14G-14I illustrate the dynamic shifting of the ring-shaped guide 1404 within a strap 1406. As shown in FIG. 14G, an equal tension in the first lace 1402 and second lace 1403 will cause the ring-shaped guide 1404c to remain relatively still. As shown in FIG. 14H, if the tension in the first lace 1402 is greater than the tension in the second lace 1403, the ring-shaped guide 1404c will be forced to rotate toward the first lace 1402. As shown in FIG. 14I, if the tension in the second lace 1403 is greater than the tension in the first lace 1402, the ring-shaped guide 1404c will be forced to rotate toward the second lace 1403. In this manner, the ring-shaped guide 1404 dynamically shifts to equalize the tension in the lace coupled therewith.

Figure 15A:
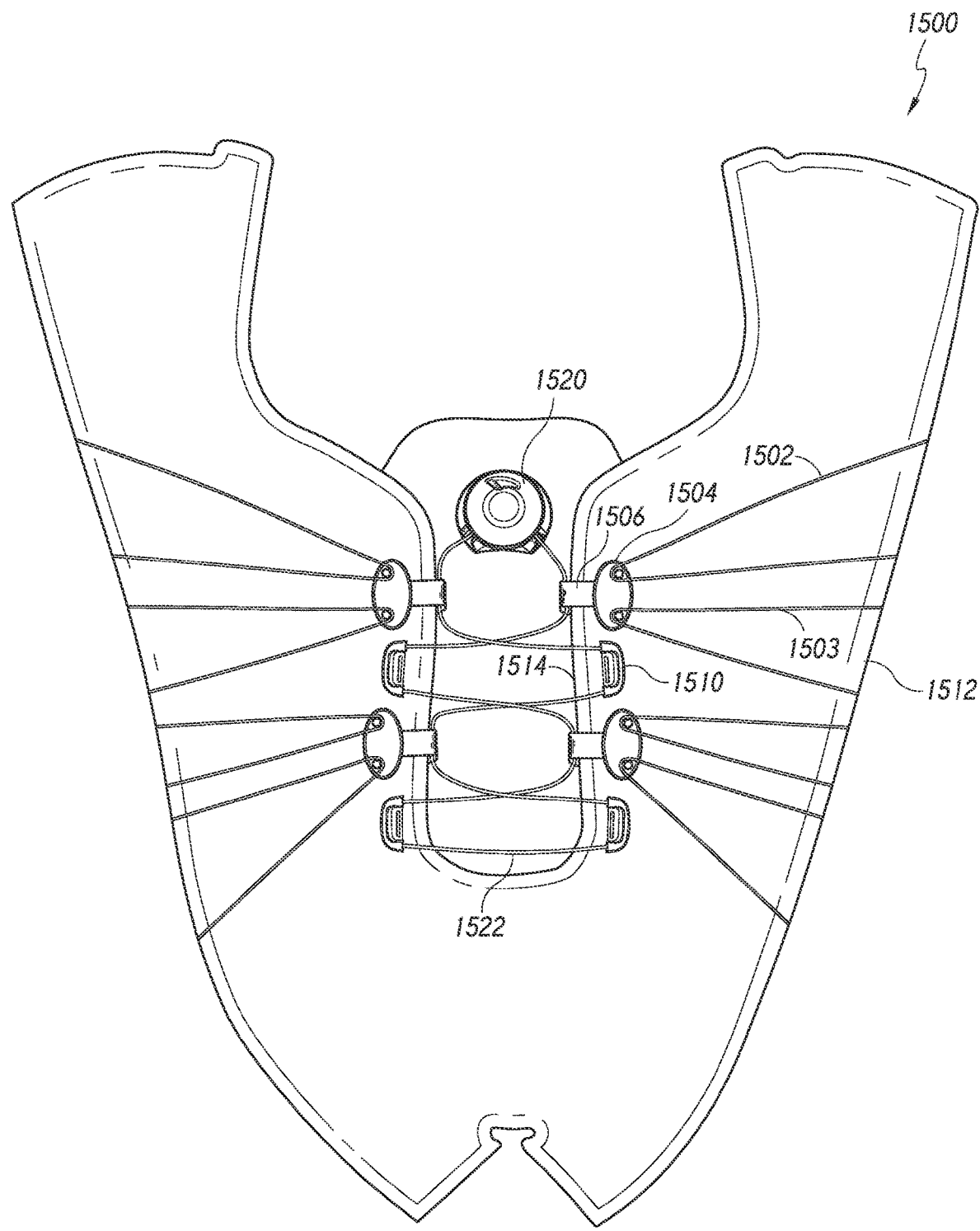
FIGS. 15A-15D illustrate additional embodiments of high-low lace configurations that allow the lace to dynamically shift.
Figure 15B:
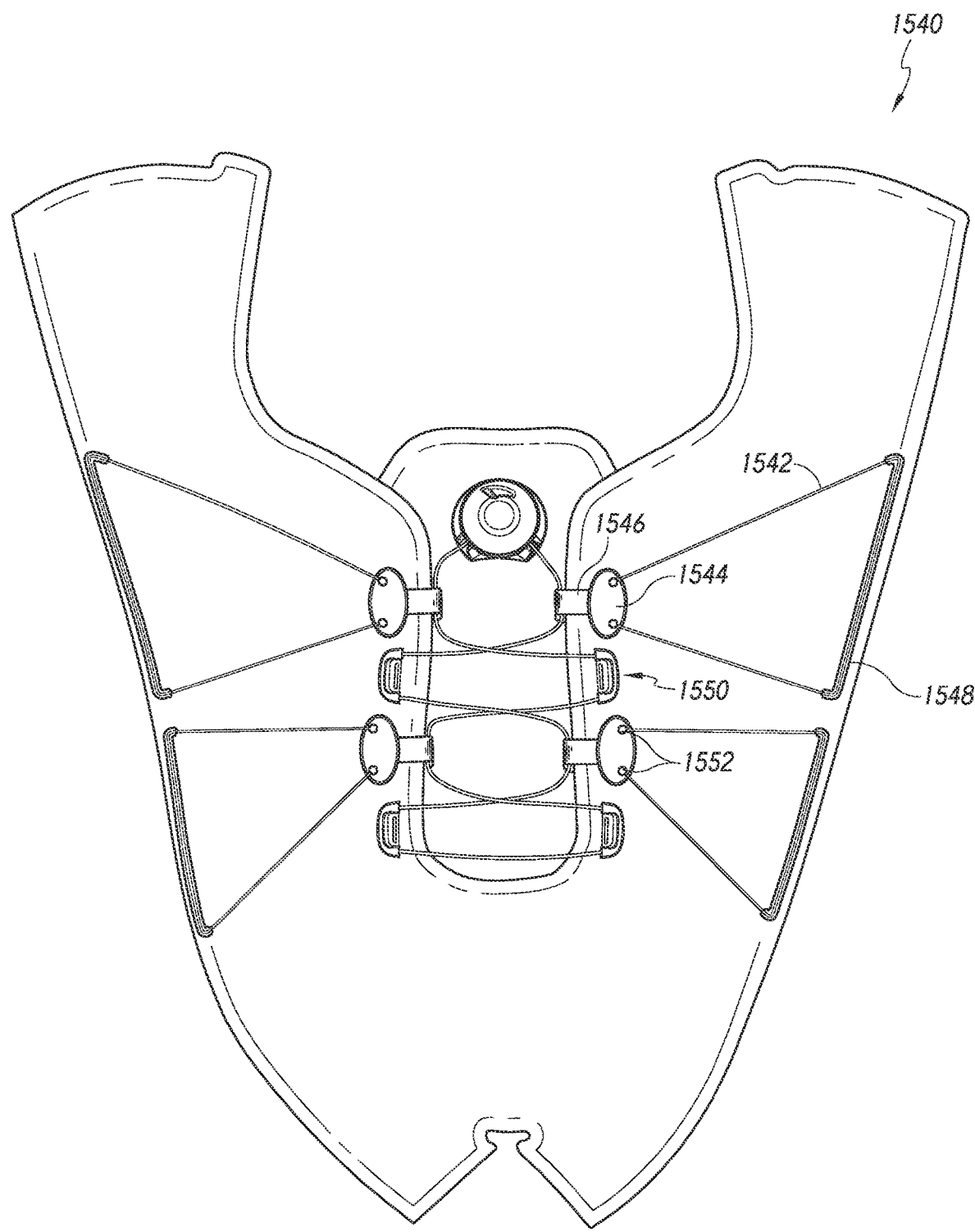
Figure 15C:
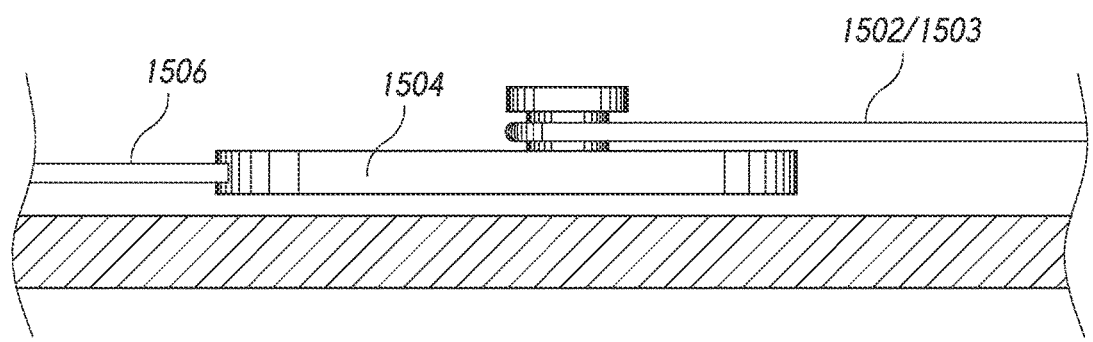
Figure 15D:
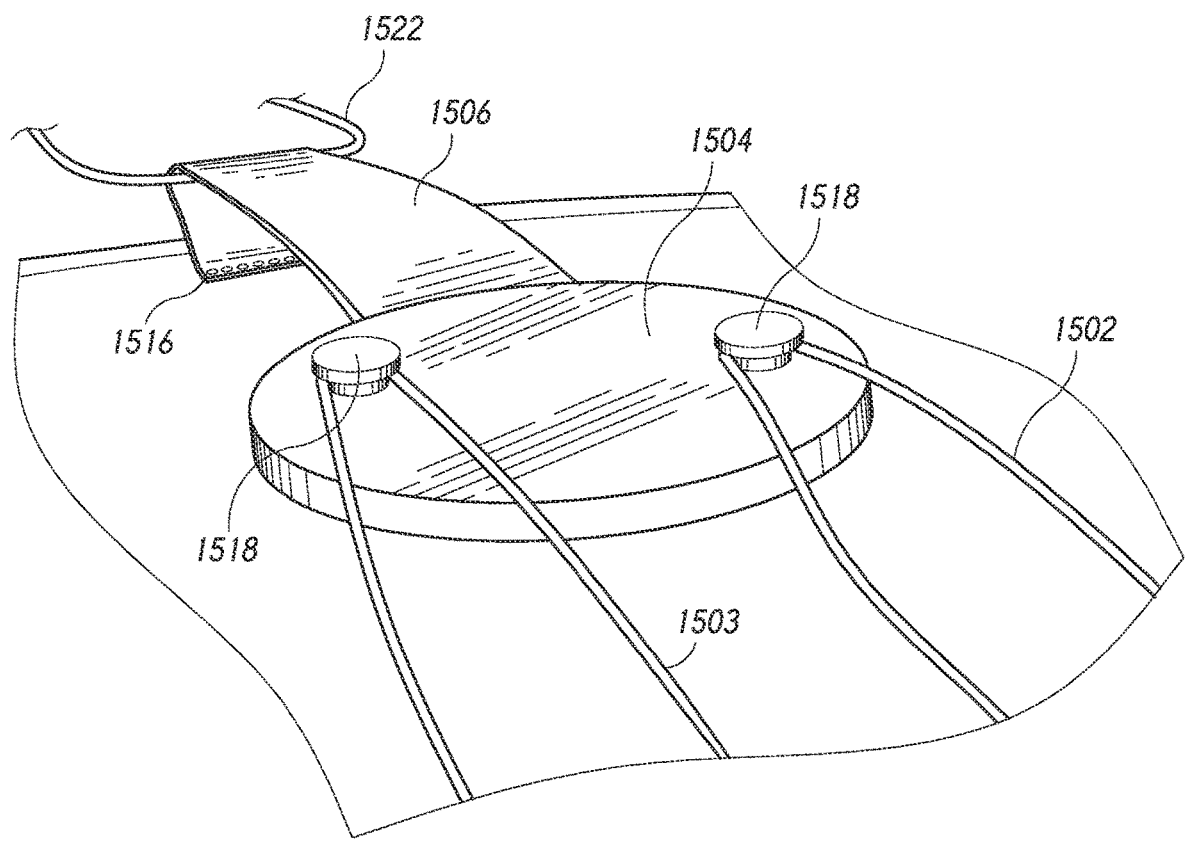

Referring now to FIGS. 15A-15D, illustrated are additional embodiments of high-low lace configurations that allow the lace to dynamically shift. As shown in FIG. 15A, in one embodiment 1500 a panel 1504 that is coupled with a strap 1506 that is attached near the eyestay 1514 of the shoe. As shown in FIGS. 15C and 15D, strap 1506 is coupled at a proximal end 1516 near the shoe's eyestay 1514 while a distal end is coupled with or attached to the panel 1504. The strap 1506 forms a webbing loop through which lace 1522 of a reel based tensioning system 1520 is positioned. As the lace 1522 is tensioned via reel assembly 1520, the strap 1506 is pulled toward the eyestay 1514, which pulls the panel 1504 toward the eyestay 1514 as well. A first lace 1502 and a second lace 1503 are looped around bosses or posts 1518 of the panel 1504. A proximal and distal end of the first lace 1502 and second lace 1503 are coupled near the shoe's outsole 1512.

The first lace 1502 and second lace 1503 are able to dynamically slide around the bosses 1518 of the panel 1504 to equalize tension in the respective lace. In addition, as previously described, the panel 1504 is able to pivot or move relative to the strap 1506 and/or eyestay 1514 to equalize the tension in the first lace 1502 and the second lace 1503. The embodiment 1500 may also include one or more static lace guides 1510 that are similar to conventional lace guides.

FIG. 15B illustrates another embodiment 1510 of a high-low lace configuration that uses a panel 1544. The panel 1544 is coupled with a strap 1546 as previously described. The panel 1544 is able to move relative to the straps 1546 and/or an eyestay of the shoe to equalize tension in the lace as previously described. A single lace 1542 is coupled with the panel 1544, such as by permanently or rigidly securing opposing ends of the lace 1542 to coupling points 1552 of the panel 1544. The lace 1542 is disposed through tubing 1548 that is positioned near the outsole of the shoe. The lace 1542 is able to dynamically shift or move within the tubing 1548 to equalize tension in the lace 1542. The embodiment 1540 may also include one or more static or conventional lace guides 1550.

High-Low Strap/Lace Dosing Indicators

Figure 16A:
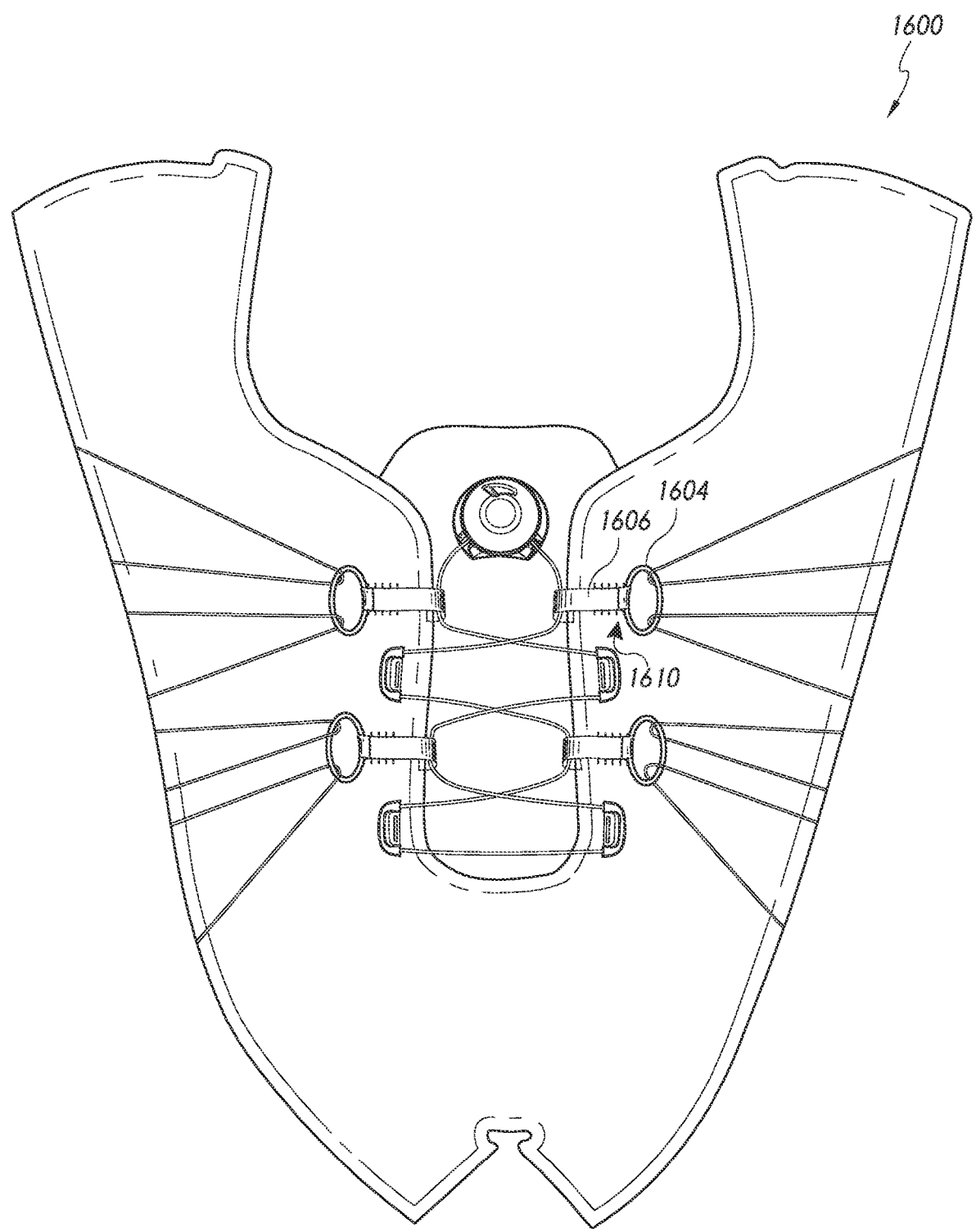
FIGS. 16A-16C illustrate an embodiment of a dosing indicator that may be used to indicate a high-low tension that is applied to a shoe.
Figure 16B:
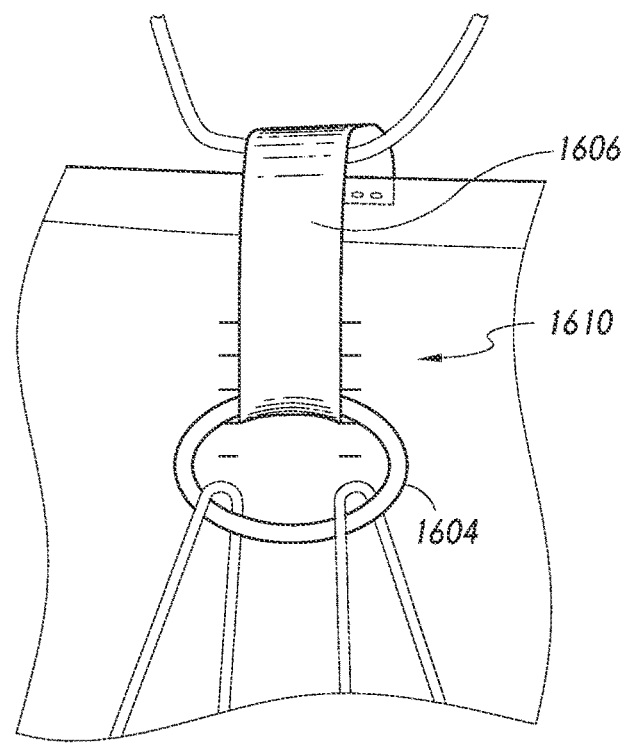
Figure 16C:
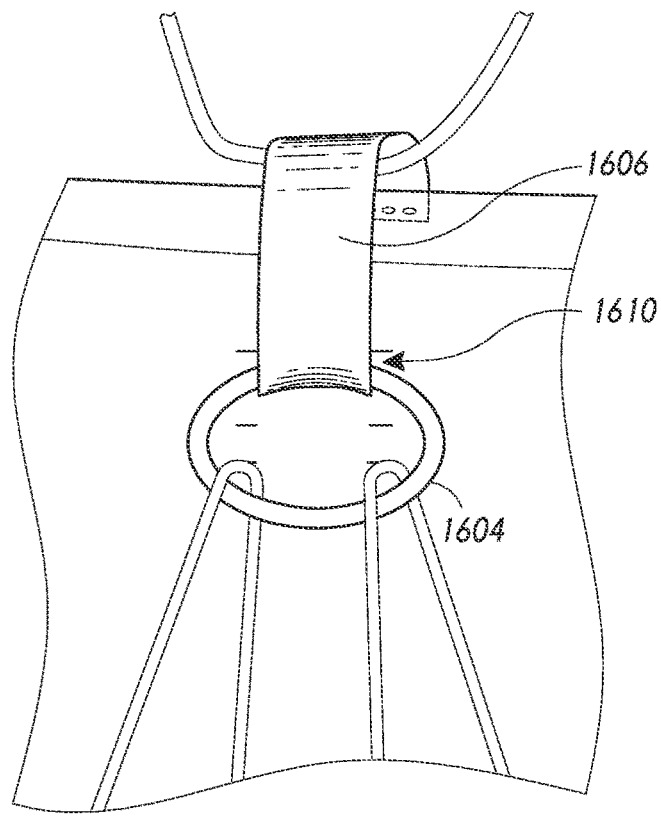

Referring now to FIGS. 16A-16C, illustrated is an embodiment 1600 of a dosing indicator that may be used to indicate a high-low tension that is applied to the shoe. The dosing indicator may include indicia 1610 that is marked on the shoe. As a lace or strap is tensioned, a component of the high low lace configuration system may move relative to the indicia 1610 to indicate a relative high-low tension that is applied to the shoe. For example, a ring-shaped guide/panel 1604 and/or strap 1606 as previously described may move relative to the indicia 1610 to indicate a high-low tension that is applied to the shoe. A user may tension the shoe until the ring-shaped guide/panel 1604 and/or strap 1606 reach a certain indicia marking 1610, which indicates a preferred tension level for the user. In this manner, the user may quickly and conveniently tension their shoe to a preferred level.

Tension Distribution High-Low Strap/Lace Configurations

Referring now to FIGS. 17A-17D, illustrated are embodiments in which a single strap or lace may be used to distribute a tension force about the shoe. The distribution of the tension force may eliminate or reduce the need for other force distribution components, such as the previously described panels and the like. The embodiments described in FIGS. 17A-17D may also be used to pull or press relatively larger portions of the outer surface of the shoe against the user's foot as desired.

Figure 17A:
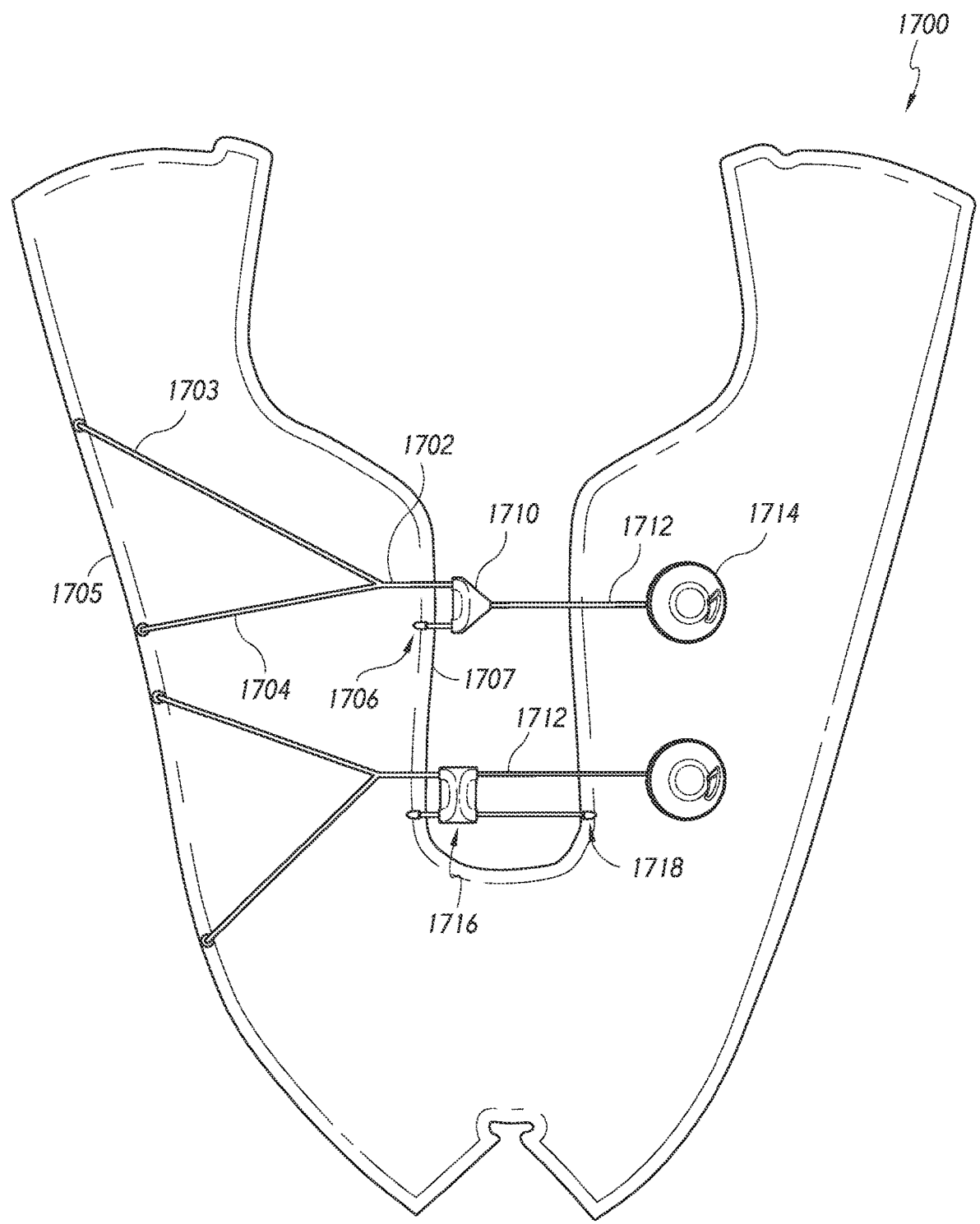
FIGS. 17A-17D illustrate embodiments in which a single strap or lace may be used to distribute a tension force about a shoe.

FIG. 17A illustrates an embodiment 1700 in which a lace 1702 includes forked ends, 1703 and 1704, that are each coupled near the outsole 1705 of the shoe. The forked ends, 1703 and 1704, allow the tension in lace 1702 to be distributed about the outsole 1705 of the shoe. A proximal end 1706 of the lace 1702 is coupled near the eyestay 1707 of the shoe so as to achieve the high-low lace configuration described herein. The lace 1702 is positioned within a transition guide 1710 that is attached a proximal end with lace 1712 of a reel based tensioning system. The transition guides 1710 includes an internal channel through which the lace 1702 is positioned. As a reel assembly 1714 is tensioned, lace 1712 pulls on transition guides 1710, which in turn tensions lace 1702 and thereby tensions the eyestay 1707 (via proximal end 1706) and the outsole 1705 (via forked ends, 1703 and 1704).

In some embodiments, the transition guides 1716 may include a second internal channel that allows the lace 1712 of the reel based tensioning system to be rerouted or redirected and coupled near an opposite eyestay 1718. In such embodiments the force that is closing the eyestay or tongue portion of the shoe may be increased.

Figure 17B:
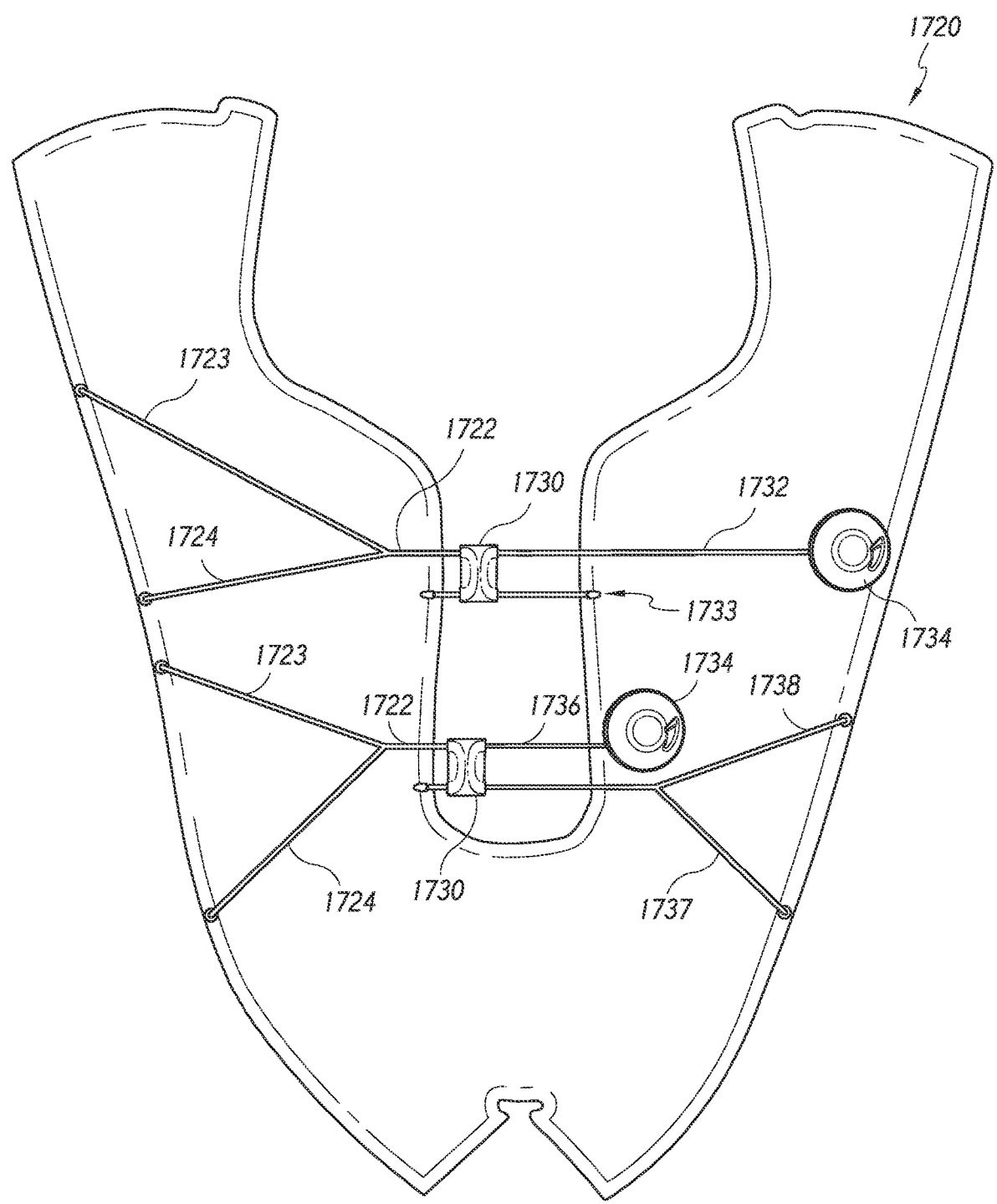

Referring now to FIG. 17B, illustrated is a similar embodiment 1720 to embodiment 1700. For example, a lace 1722 includes forked ends, 1723 and 1724, that are coupled near the shoe's outsole. Lace 1722 also includes a proximal end that couples near the eyestay as previously described. A transition guide 1730 couples the lace 1722 with a lace 1732 of a reel based tensioning system. In some embodiments, the reel assembly 1734 may be coupled with the shoe near an opposite side of the outsole and a distal end 1733 of lace 1732 may be coupled near an opposite eyestay of the shoe. In such embodiments, the lace 1732 and reel assembly 1734 function to tension one side of the shoe in a high-low configuration while the lace 1722 tensions the opposite side of the shoe in a high-low configuration.

In another embodiment, the lace 1736 of the reel based tensioning system may also include forked ends, 1737 and 1738, that are coupled with an opposite side of the shoe's outsole. In such embodiments, the lace 1736 of the reel based tensioning system tensions one side of the shoe in a high-low configuration while the lace 1722 tensions the opposite side of the shoe in a high-low configuration.

Figure 17C:
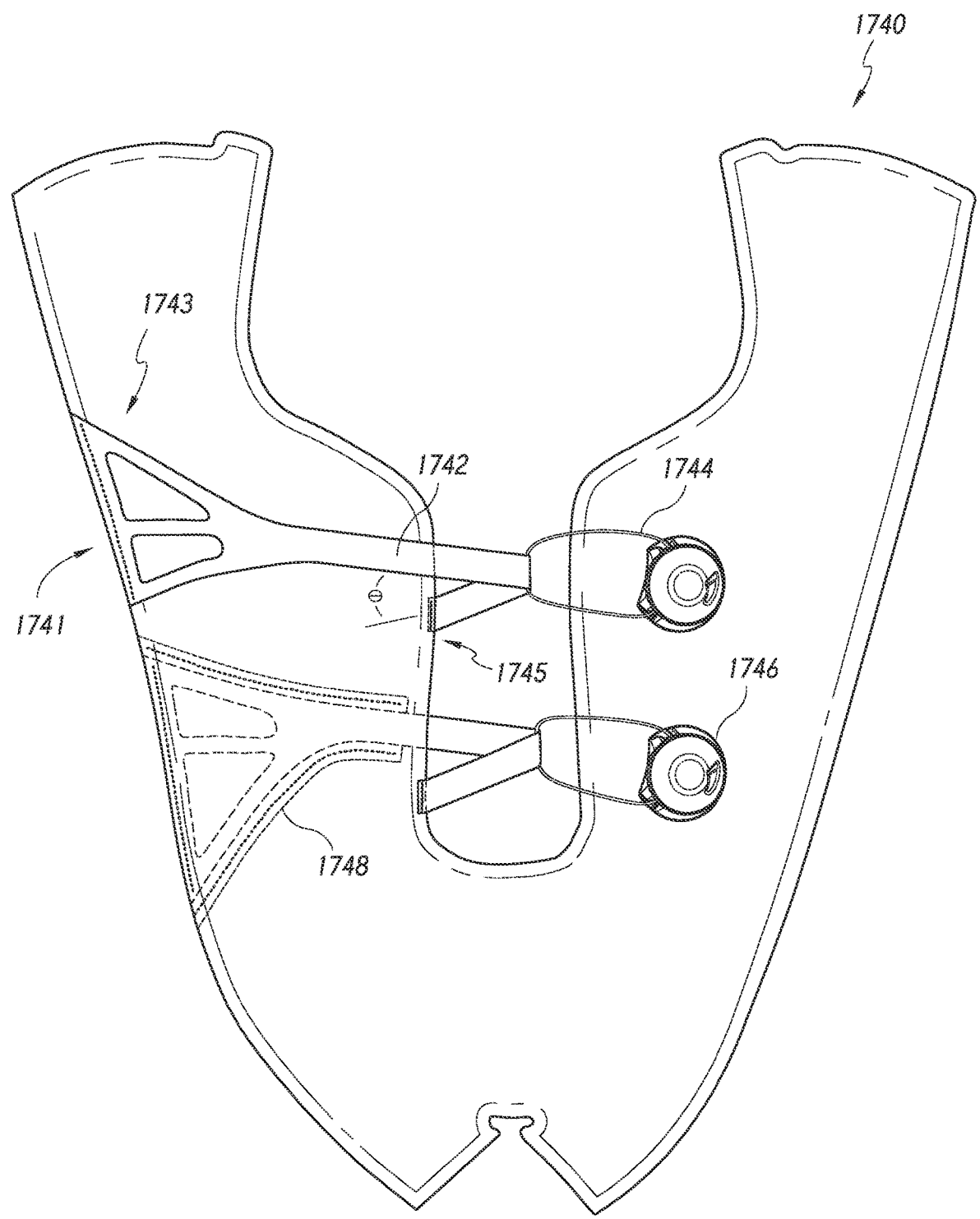

Referring now to FIG. 17C, illustrated is an embodiment 1740 of a strap based system that may be used to distribute a tension force about the shoe. Embodiment 1740 includes a strap 1742 having a relatively wide base portion 1743 that is coupled with or near the shoe's outsole 1741. The wide base portion 1743 of strap 1742 distributes the strap tension about the bottom portion of the shoe, which may eliminate the need for other force or pressure distribution components, such as the previously described panels. The wide base portion 1743 may also pull or press the outer surface of the shoe's upper material against the user's foot in a desired manner, such as to increase contact between the shoe and the foot's arch. In some embodiments, the wide base portion 1743 may be designed to mirror the contour of a typical arch of the foot.

A proximal end of the strap 1742 is coupled near the eyestay 1745 of the shoe so that the strap 1742 achieves the high-low configuration described herein. A first portion and second portion of the strap 1742 may be positioned at an angle θ as previously described. The strap 1742 forms a loop through which lace 1744 of a reel based tensioning system is positioned. A reel assembly 1746 is used to tension lace 1744, which in turn tensions the strap 1742 and base portion 1743. In some embodiments, the strap 1742 may be positioned under the upper material of the shoe, such as by being disposed within a sleeve or channel 1748 as previously described. In such embodiments, the strap 1742 may be hidden from view.

Figure 17D:
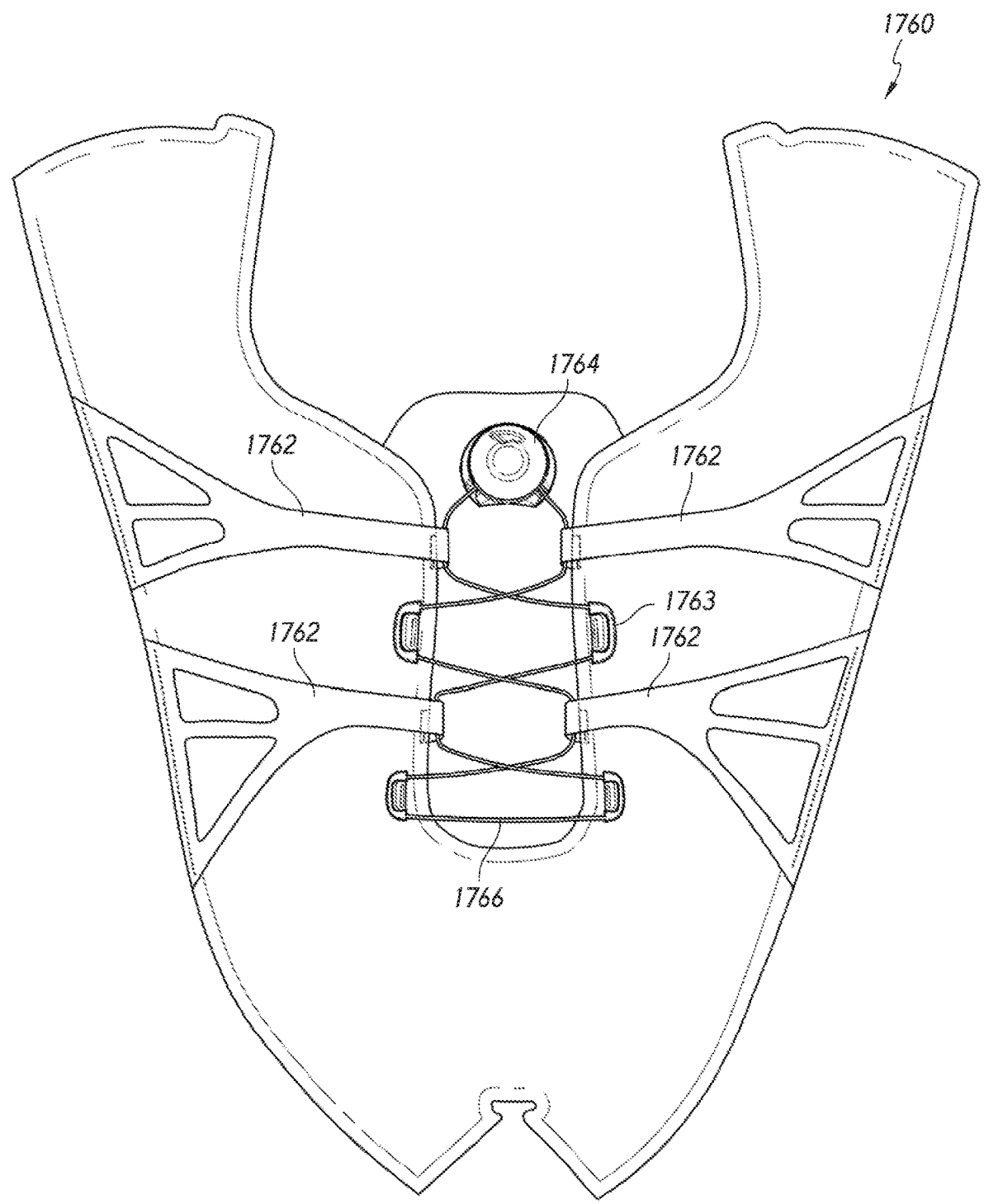

FIG. 17D illustrates an embodiment 1760 in which the reel assembly 1764 of a reel based tensioning system is positioned approximately centrally about a tongue of the shoe. The reel assembly 1764 tensions lace 1766 that is woven along a lace path and coupled with a plurality of strap components 1762 that are similar to those described in FIG. 17C. In another embodiment, some or all of the strap components 1762 may be replaced with the forked lace components described in FIG. 17A. In such embodiments, a single reel assembly 1764 is able to simultaneously tension multiple strap components 1762 and/or forked lace components. The embodiment 1760 may also include one or more conventional lace guides 1763 as needed.

Additional Tensioning Systems

Figure 18:
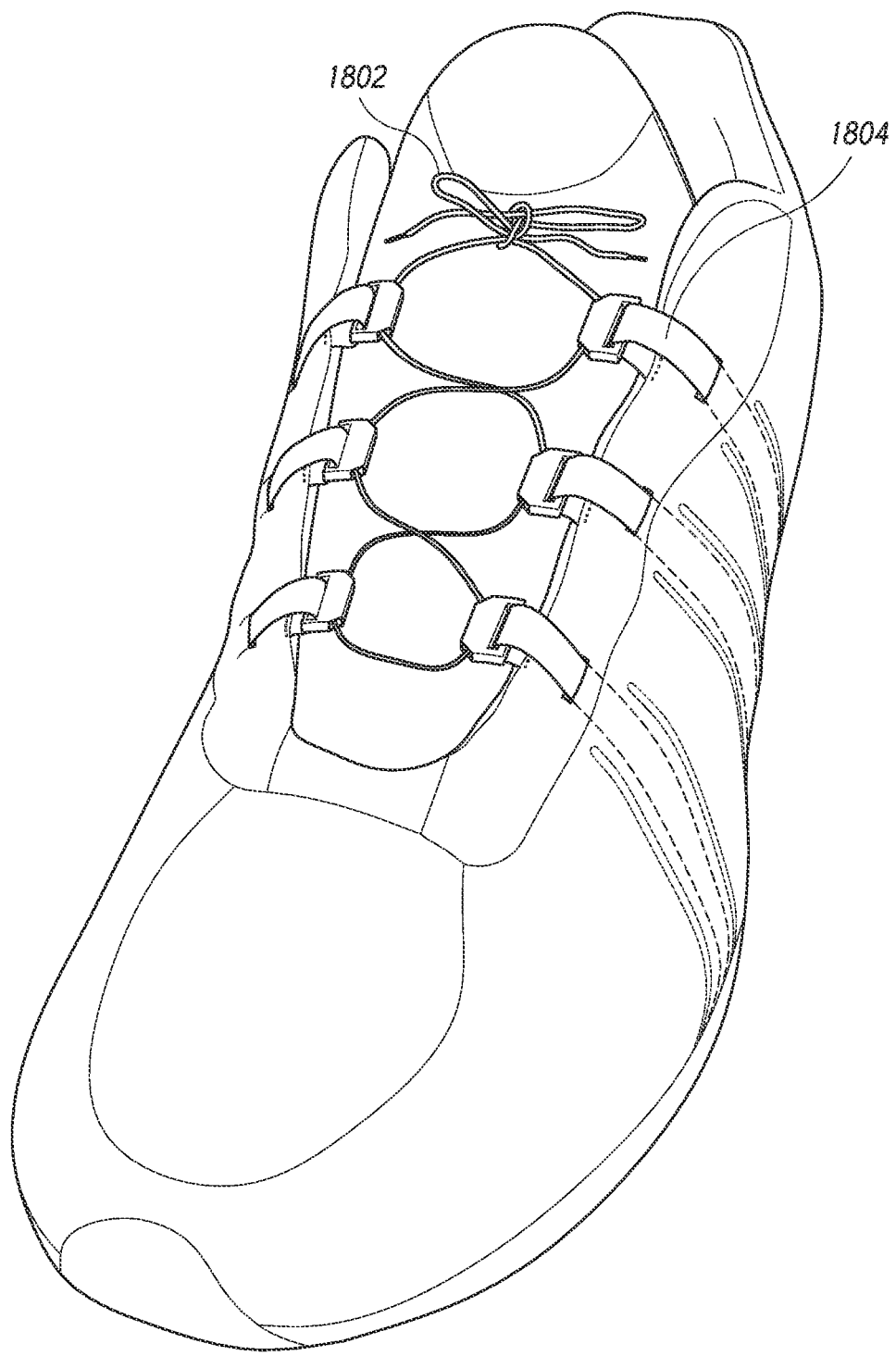
FIG. 18 illustrates an embodiment in which shoelace is used to tension a high-low lace or strap system of a shoe.
Figure 19:
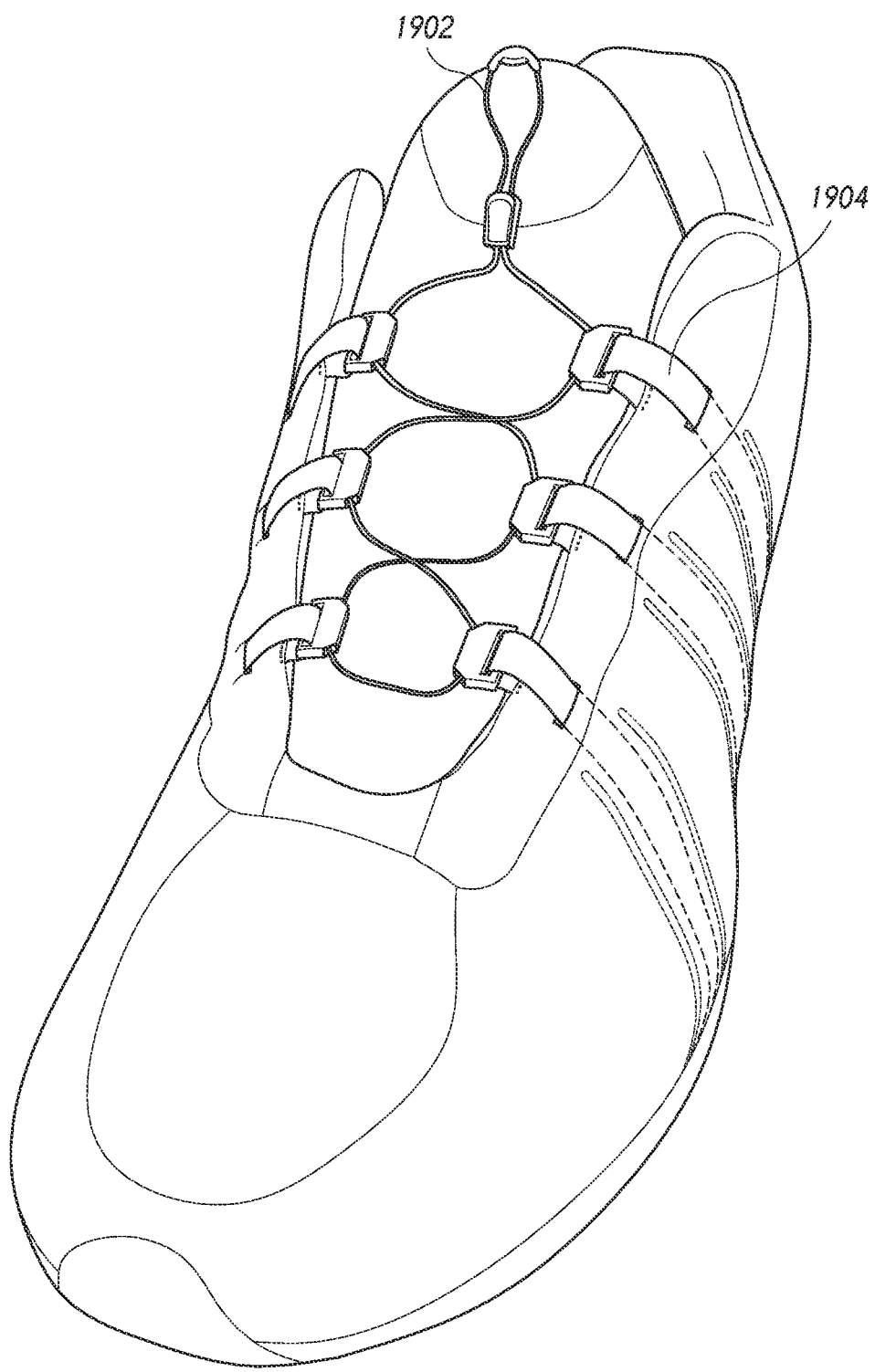
FIG. 19 illustrates an embodiment in which a pull cord system is used to tension a high-low lace or strap system of a shoe.

FIG. 18 illustrates an embodiment in which shoelace 1802 is used to tension a high-low lace or strap system 1804. FIG. 19 illustrates an embodiment in which a pull cord system 1902 is used to tension a high-low lace or strap system 1904. The high-low lace or strap system 1804/1904 may be similar to any of those described or contemplated herein. As such, other non-reel based tensioning systems may be used to tension any of the high-low systems or configurations described herein. Similarly, the shoelace 1802 and pull cord system 1902 may be similar to any such system known in the art. Other tensioning devices may likewise be used.

Exemplary User Controls

FIGS. 20A-22C illustrate various controls or user interfaces that may be used to tighten or tension a shoe or other article. Specifically, the embodiments describe remote controls that communicate wirelessly with a motorized closure system or device, such as the motorized device illustrated in FIG. 6, which in turn tightens or tensions a lace or strap to tighten and/or close a shoe.

According to one aspect, a tension adjustment mechanism, user interface, or motorized tensioning device control is provided (hereinafter tension adjustment component). The tension adjustment component includes a tension input component that is located remotely from the motorized tensioning device, such as by being coupled with a bicycle in an area that is easily accessible to a user's hands. The tension input component is configured to receive input corresponding to an adjustment of the motorized tensioning device. FIGS. 20A-22C illustrate various means in which a tension input component receives input from a user.

As illustrated in FIG. 6, the motorized tensioning device may be arranged or configured to close and tighten a shoe. The shoe typically includes a main body that is configured to be fit about a foot of the user and a tension member that is coupled with the main body such that tensioning of the tension member effects tightening of the main body about the user's foot. The motorized tensioning device is operably coupled with the tension member and is configured to adjust the tension member in accordance with the input received from the tension input component to tighten or loosen the main body about the user's foot. The tension input component may be configured to wirelessly communicate with the motorized tensioning device via RF, NFC, Bluetooth, and the like.

In some instances, an additional tension input component or control is coupled with the user's shoe. This additional tension input component is typically also configured to receive input corresponding to an adjustment of the motorized tensioning device for the shoe. The additional tension input component enables adjustment of the motorized tensioning device directly form the shoe and remote from the bicycle. For example, essentially any of the controls illustrated in FIGS. 20A-22C (e.g., the rotatable knob, the finger control, and the like) may be coupled with the shoe. In such embodiments, the tension input component may include an adjustment component (e.g., rotatable knob) that is operable by the user to provide input corresponding to the adjustment of the motorized tensioning device. The adjustment component may be removably couplable with the tension input component of the bicycle and may also be removably couplable with the additional tension input component of the user's shoe. The adjustment component may be operable with both the tension input component of the bicycle and the additional tension input component of the user's shoe such that the input provided to the adjustment component is communicated to the respective tension input component or the additional tension input component.

In some embodiments, the shoe may include a first motorized tensioning device that is configured to adjust a fit of a first portion of the shoe about the user's foot, and may also include a second motorized tensioning device that is configured to adjust a fit of a second portion of the shoe about the user's foot. In such embodiments, the tension input component of the bicycle may include a first control that is configured to adjust a tension setting of the first motorized tensioning device and may also include a second control that is configured to adjust a tension setting of the second motorized tensioning device. In some embodiments, the tension input component may be configured to simultaneously adjust the fit of a right shoe about the user's right foot and a left shoe about the user's left foot. In other embodiments, the tension input component may be configured to adjust the fit of a right shoe about the user's right foot independent from adjustment of a left shoe about the user's left foot.

According to another aspect, a mechanism for wirelessly adjusting tension of an article is provided. The mechanism includes a tension input component that is coupleable with a vehicle in an area that is easily accessible to a user. The positioning of the mechanism enables the mechanism to easily receive input from a user corresponding to an adjustment of a motorized tensioning device that is attached to the article and that is configured to adjust a tension of a tension member and thereby tighten or loosen the article in accordance with the input received from the tension input component. The input received at the tension input component may be wirelessly transmitted to the motorized tensioning device.

In some instances, the article may also include a tension input component that is configured to receive input corresponding to an adjustment of the motorized tensioning device. Such embodiments enable adjustment of the motorized tensioning device from multiple sources. In such embodiments, an adjustment component (e.g., rotatable knob, finger control, etc.) may be removably attachable to the vehicle and to the article. The adjustment component may be operable with the tension input component of the vehicle and the tension input component of the article to enable input to be provided to the respective component.

For ease in describing the embodiments of FIGS. 20A-22C, the tension input component or mechanism briefly described above will be referred to as a remote control. The remote control embodiments described herein may be used for various applications, such a cycling, running, outdoor activities, sporting activities, and the like. However, the embodiments may find particular usefulness in cycling where a user may desire to adjust the tension on his or her shoes without having to reach down and manually adjust a shoe tightening mechanism. A user may wish to adjust the tightness of their shoes for increased comfort and/or performance depending on the cycling conditions encountered. In some embodiments it may be advantageous to allow a user to adjust their shoe's tightness without removing their hands from the cycle's handle bars. For example, during a competitive race a cyclist may lose valuable time in adjusting the tightness of their shoes. For convenience in describing the embodiments, the remote control devices will be mainly described for use in cycling. It should be realized, however, that the embodiments described herein may be used for a wide range of non-cycling applications where remote control of a motorized closure system or device is desired.

Figure 20A:
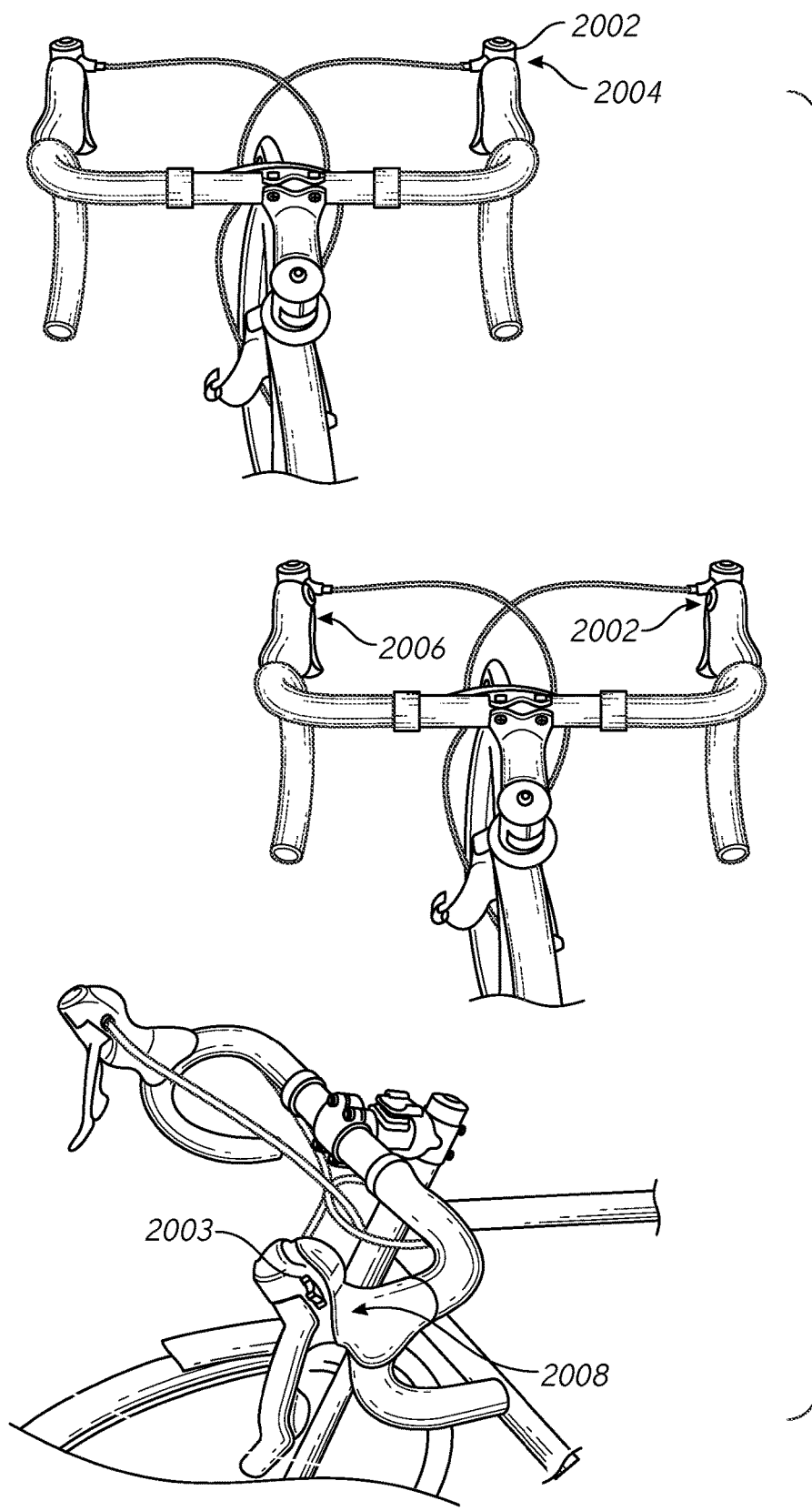

FIGS. 20A-K illustrate various embodiments of remote control devices being positioned on handle bars of a bicycle. Referring now to FIG. 20A, in some embodiments, a remote control user interface 2002 may be positioned on the top of the hood 2004 of a drop handlebar. The remote control user interface 2002 is positioned on the hood of the drop handlebar in a position that easily accessible by a user's hand, but that does not interfere with operation of the bicycle. For example, the remote control user interface 2002 is positioned above the hand brake and/or gear shift control so that it does not interfere with the user's operation of these components. However, the remote control user interface 2002 is positioned near these components so as to minimize the distance that the user needs to move his or her hand to operate the remote control user interface 2002.

In the illustrated embodiment, the remote control user interface 2002 is a rotatable dial that is rotatable in a first direction to tighten a user's shoe (e.g., via a wireless communication) or in a second opposite direction to loosen a user's shoe (e.g., via a wireless communication). Specifically, the user provides input corresponding to a tightening or loosening of the shoe via a respective rotation of the rotatable dial. The input is then wirelessly transmitted to the motorized control device of the user's shoes, which actuates the motorized device to tighten or loosen the shoes in accordance with the received input from the user. The drop handlebar may include two interfaces 2002 that each control the tightness of one of the user's shoes independently, or may include a single remote control user interface 2002 that is operable to tighten and loosen both shoes simultaneously. In some embodiments, the rotatable dial remote control user interface 2002 may be removable from the handlebar and coupleable with a portion of the user's shoe (not shown). In such instances, a single remote control user interface 2002 may be coupleable with both the bicycle and the user's shoe(s) and used to tighten and loosen the user's shoes. The other remote control user interfaces described herein may similarly be removably coupleable with both the bicycle and the user's shoes as desired.

In another embodiment, remote control interfaces 2002 may be positioned on the inside of the drop handlebar's hood 2006 so as to be accessible and operable by the user's thumbs. In another embodiment, remote control interfaces 2003 may be positioned on the outside of the drop handlebar hood 2008 so as to be positioned away from areas where accidental contact and/or control may occur, but where the remote control user interface 2003 is still easily accessible by the user. The remote control interfaces 2003 may be rotatable interfaces, pivotable buttons or levers, or any of the other control interfaces described herein, each of which may be removably coupleable with both the bicycle and the user's shoes as desired.

Figure 20B:
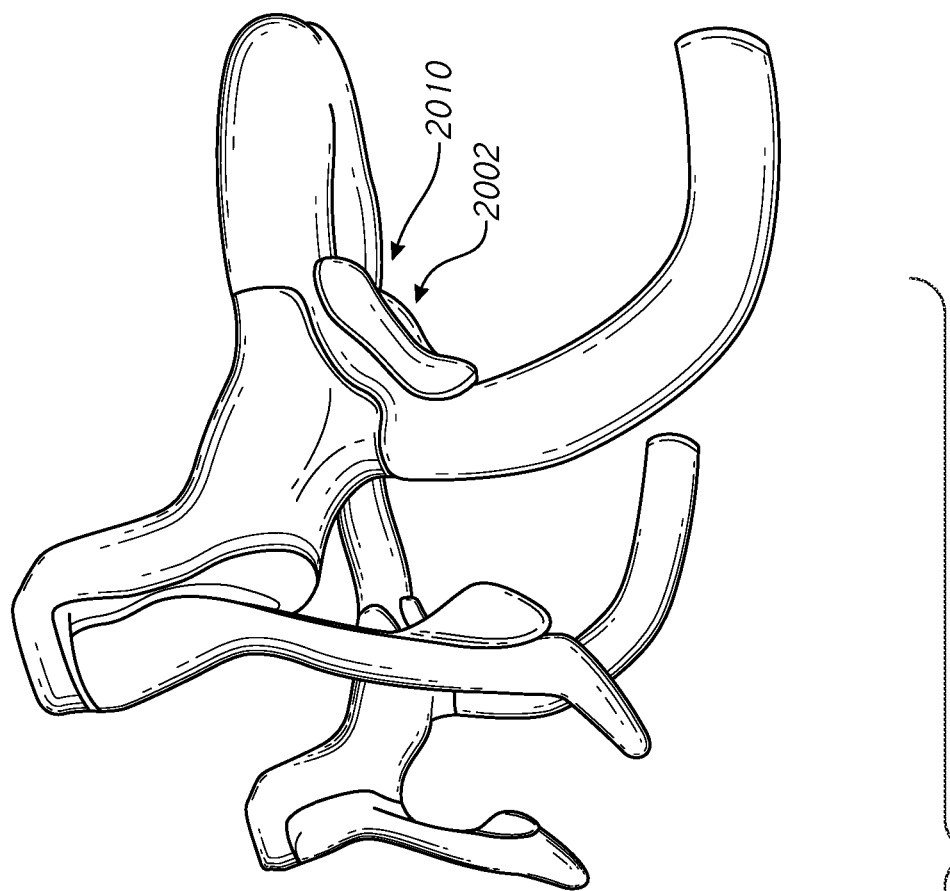
Figure 20B:
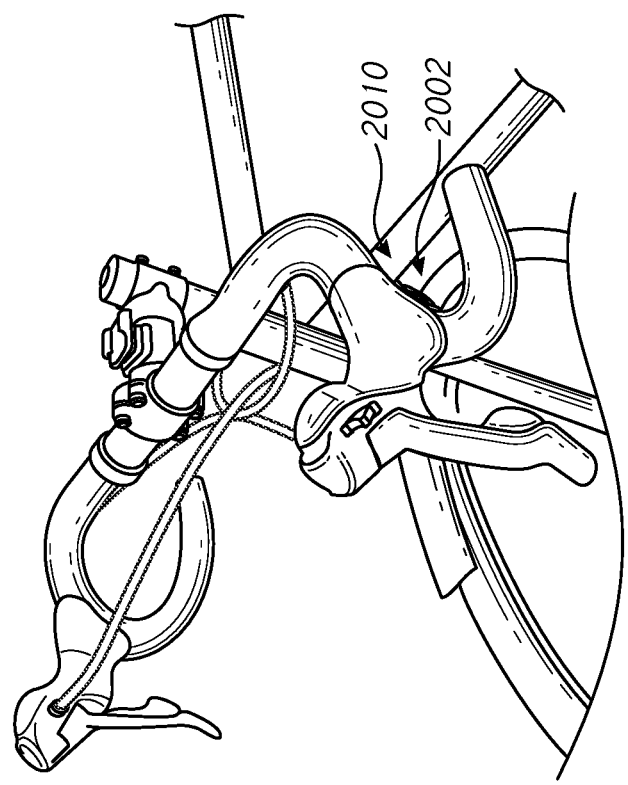
Figure 20C:
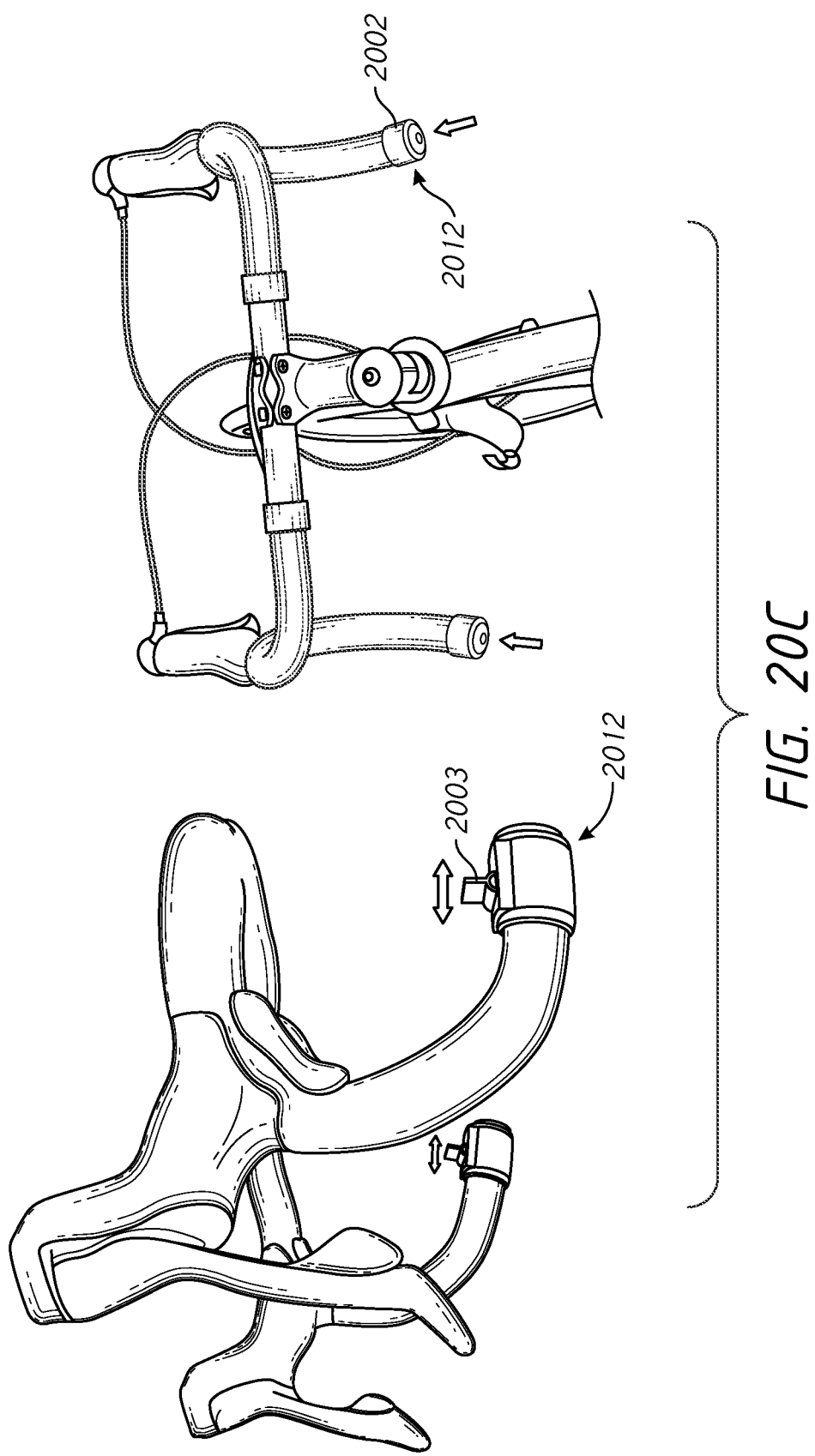

Referring now to FIG. 20B, in some embodiments, remote control interfaces 2002 may be positioned under the hood 2010. The interfaces 2002 may be press button controls that a user may press with the upper portion of their hand. The interfaces 2002 may be positioned under the hood 2010 so as to be easily accessible and pressable by the user's hand. Referring now to FIG. 20C, in some embodiments, the remote control interfaces 2003 may be positioned at a distal end of the handlebar 2012. Control of the interfaces 2003 may require the user to temporarily remove their hand from the handlebar, but without requiring the user to move their hand any significant distance. The interfaces may be pivotable controls as in control 2003, rotatable controls as in control 2002, and the like.

Figure 20D:
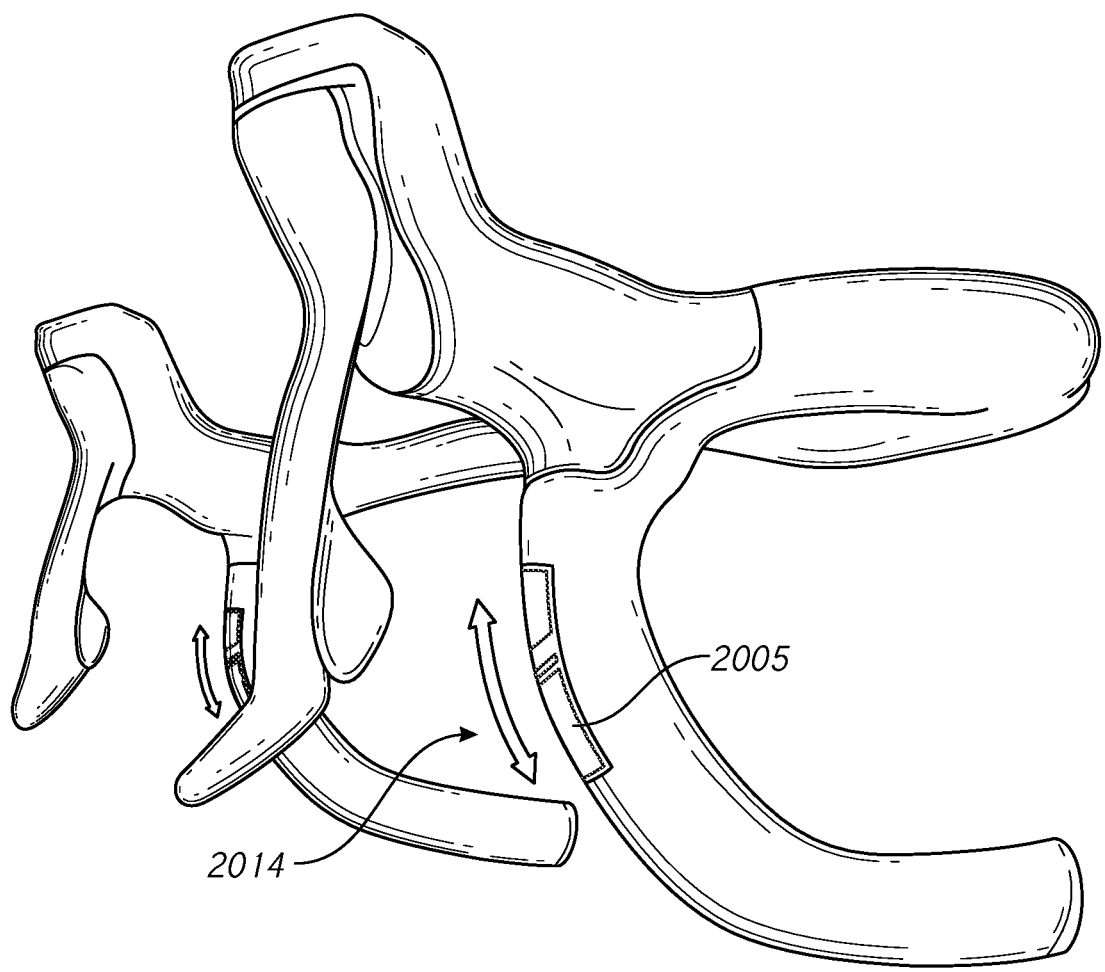
Figure 20E:
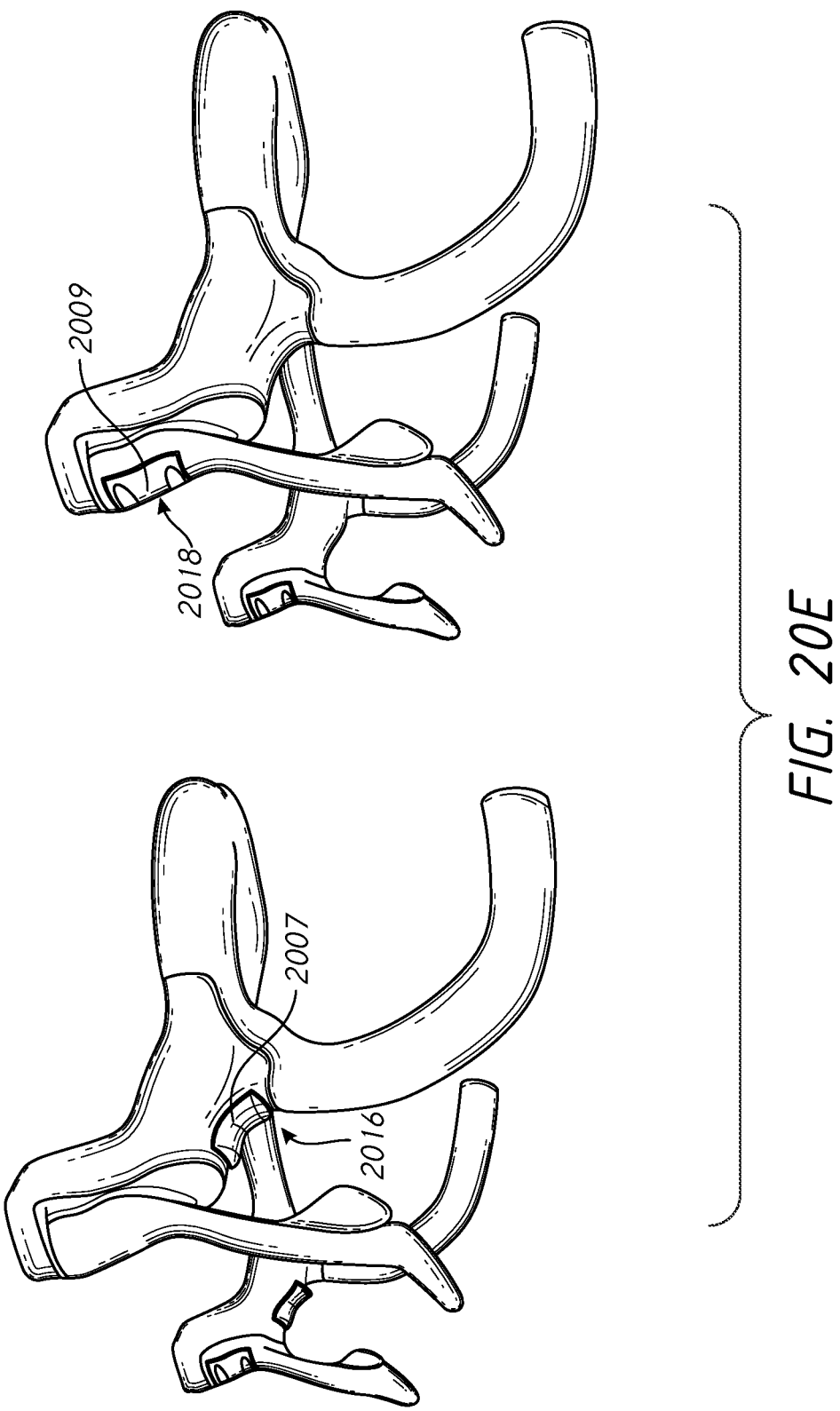

Referring now to FIG. 20D, in some embodiments, the remote control interfaces 2005 may be positioned on a front surface of the drop bars 2014. The interfaces 2005 could be touch sensitive controls that are controlled by touch, or could be mechanical controls. For example, the touch controls may include a swipe pad along which a user's swipes his or her finger, or may include touch buttons that incrementally increase or decrease lace tension. Referring now to FIG. 20E, in some embodiments a pivotable button control 2007 may be positioned under the hood controls 2016 that are attached to the handlebar, or a pressable control 2009 could be positioned on or near the top of a brake 2018. Such positioning may enable easy access since the controls are positioned adjacent other controls that are operated by the user's hands and/or are adjacent a portion of the handlebar where the user typically rests his or her hands.

Figure 20F:
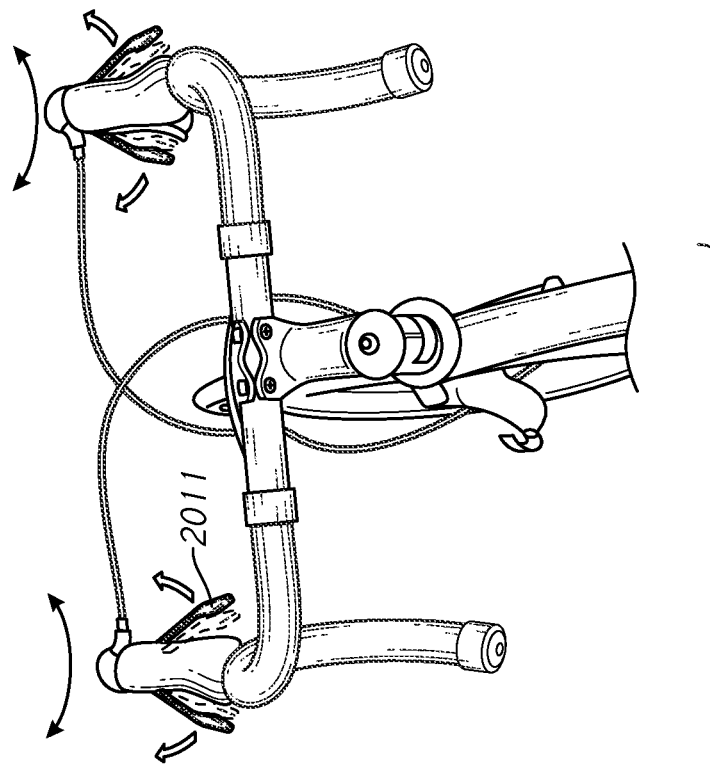
Figure 20F:
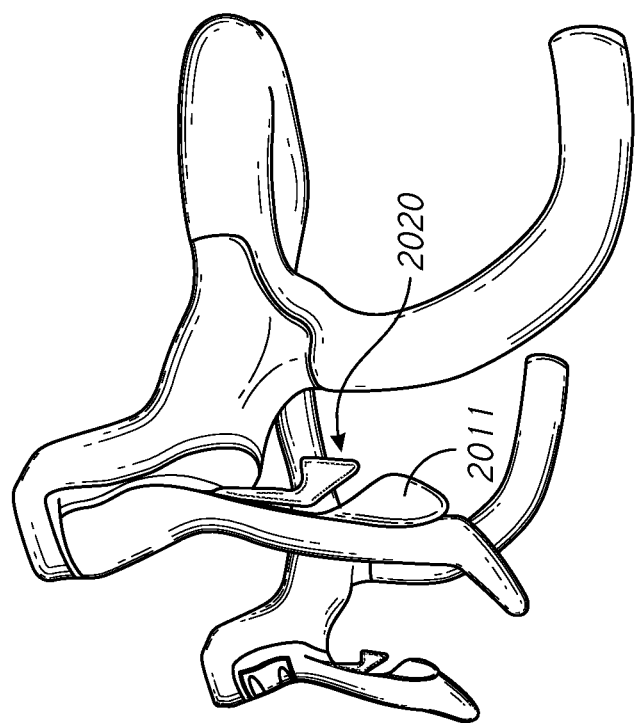
Figure 20G:
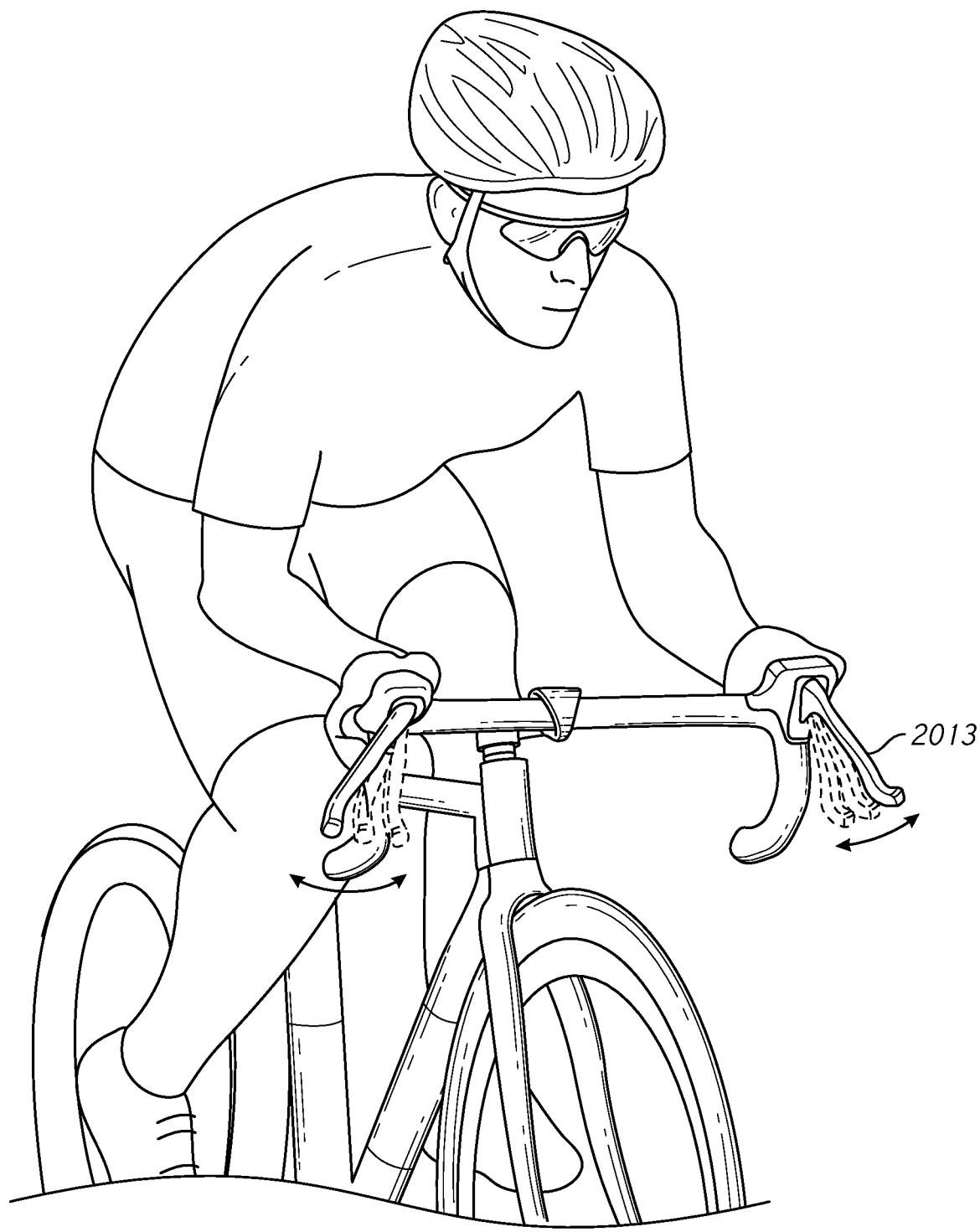

Referring now to FIG. 20F, in some embodiments a lever control 2011 may be used to remotely control the tighten of a shoe. The lever control 2011 may be positioned adjacent the brake control or elsewhere on the bicycle. The lever control 2011 may be pivotable relative to the handlebars or another portion of the bicycle. Pivoting the controls 2011 in a first direction may cause the shoes to tighten while pivoting the controls 2011 in an opposite direction may cause the shoes to loosen. Referring now to FIG. 20G, in some embodiments, the remote control device 2013 may be incorporated into another control device, such as the brake control. In one embodiment, the brake control may pivot relative to the handle bars. Pivoting of the brake control may cause the shoes to tighten or loosen as described herein.

Figure 20H:
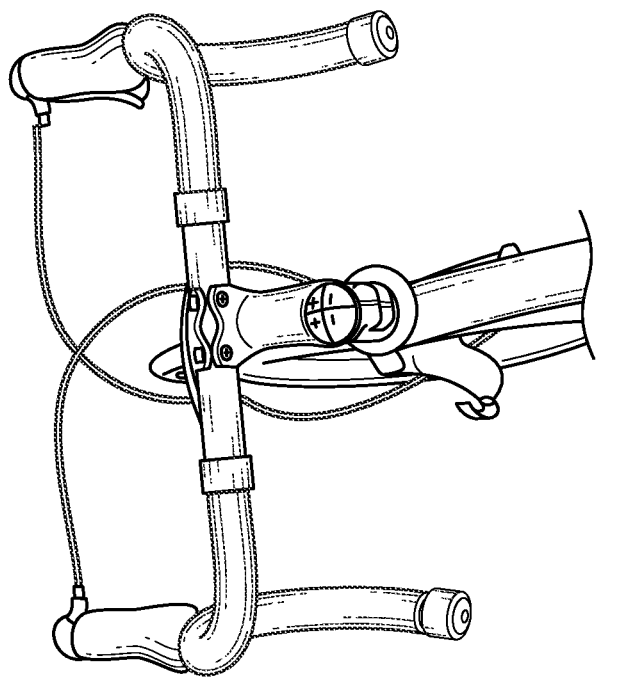
Figure 20H:
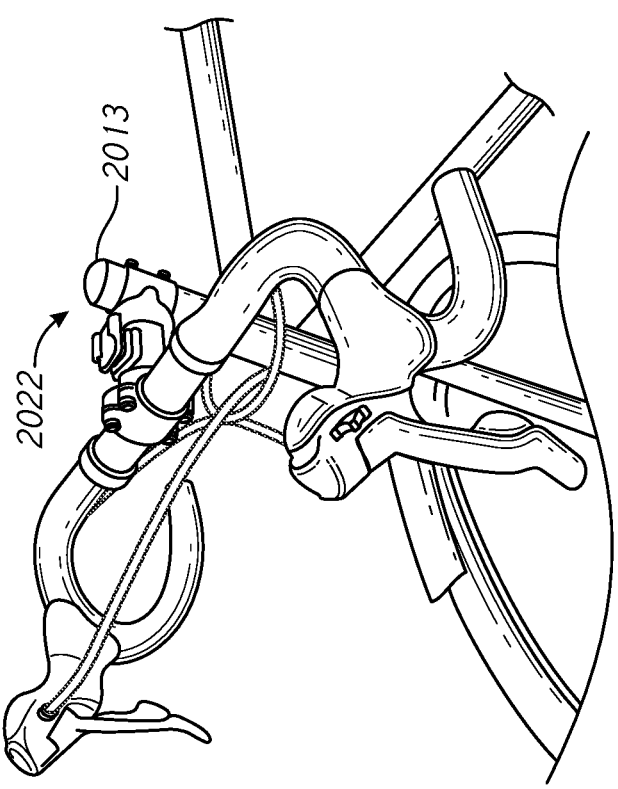
Figure 20I:
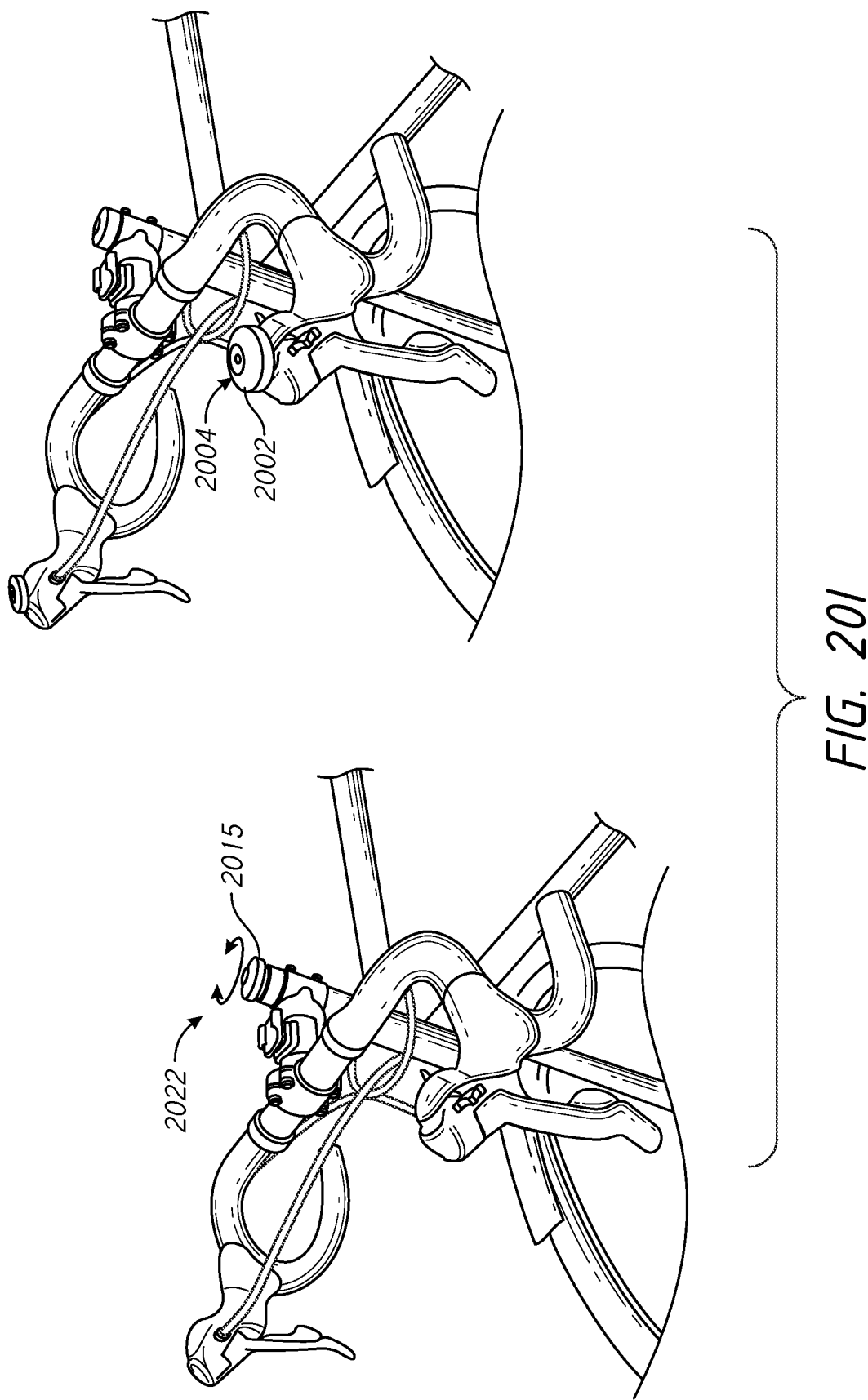

Referring now to FIG. 20H, in some embodiments remote control interfaces 2013 may be positioned on the top of the head tube and/or stem 2022. As shown in FIG. 20H, the interface 2013 may include pressable buttons that incrementally tighten or loosen a shoe. The remote control interface 2013 may include two controls that separately tighten or loosen the user's left and right shoes, or may include a single control that simultaneously tightens or loosens both of the user's shoes. In another embodiment, a rotatable interface 2015 may be positioned on the head tube and/or stem 2022 as shown in FIG. 20I.

Figure 20J:
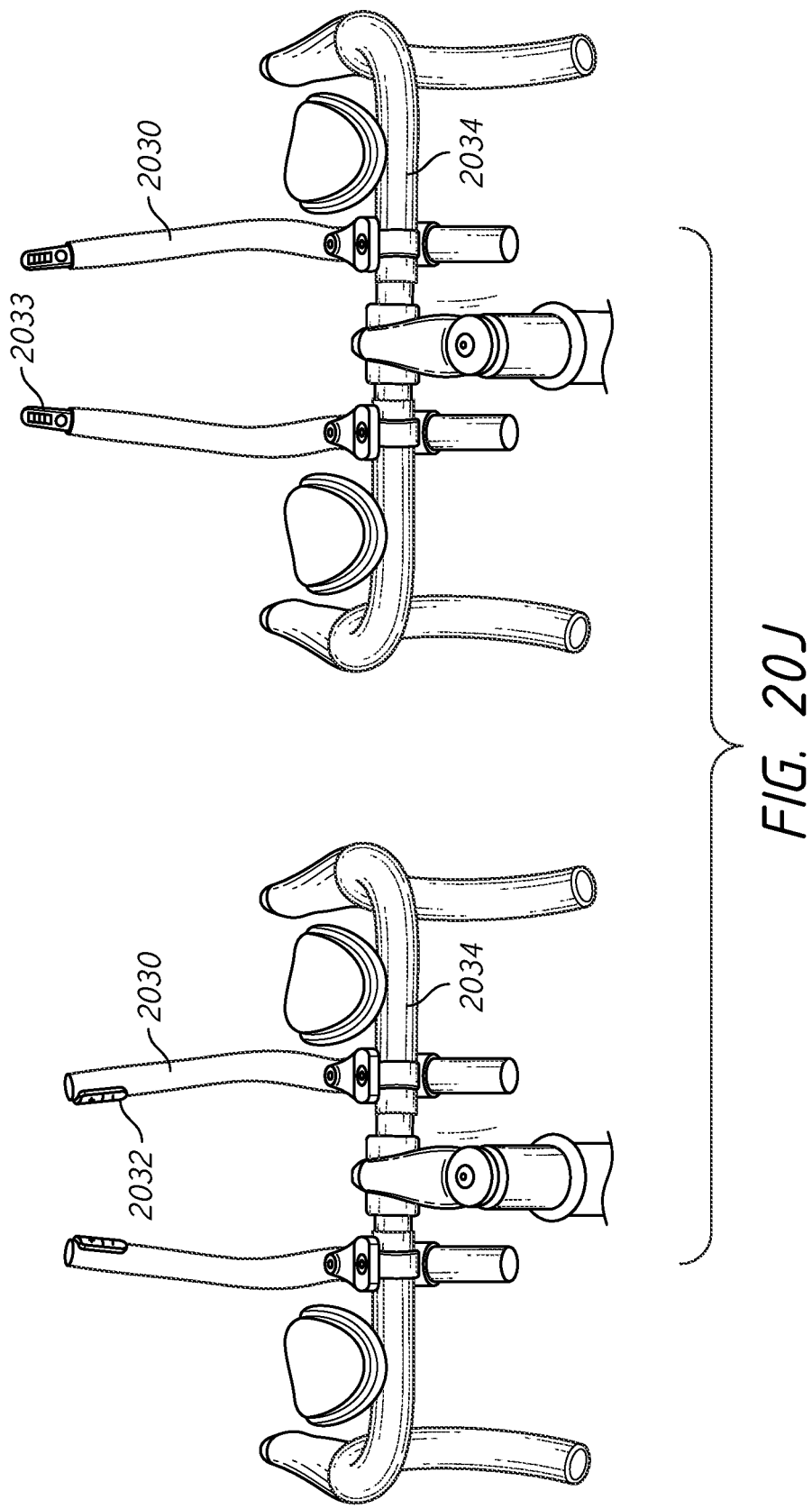
Figure 20K:
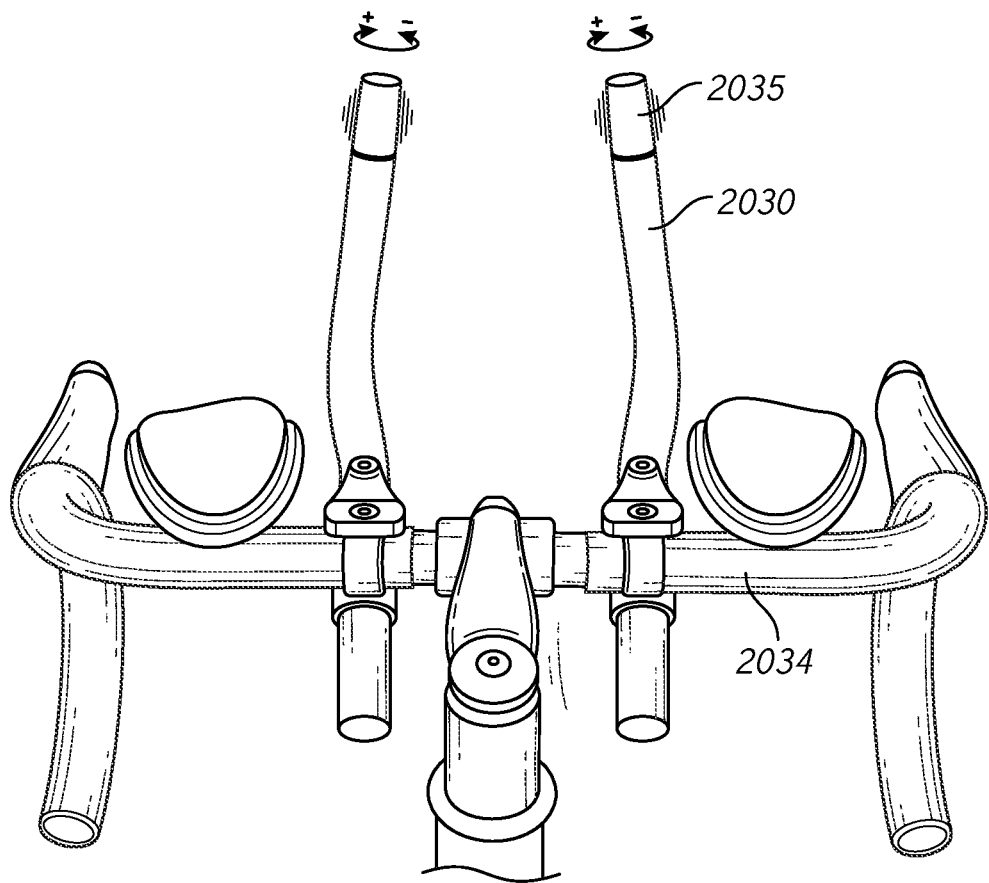

Referring now to FIGS. 20J and 20K, in some embodiments the remote control devices may be positioned on components that may be removably attached to the handlebars. For example, the remote control device 2032 may be positioned on aerobars 2030 that are designed to clip onto the handlebars 2034. A user may clip a single aerobar 2030 onto the handlebar 2034, which controls the tightens in both shoes, or may use two aerobars 2030 to individually control the tightness of each shoe. The remote control device may be a pressable button 2032, a pivotable or touch sensitive button or component 2033, a rotatable control 2035, and the like. In some embodiments, the remote control device may provide a visual indication or feedback regarding the tightness of the shoe.

Although the above embodiments described and illustrated the remote controls being used and/or positioned on drop handlebars, it should be realized that the remote controls may be used and/or positioned on various other handlebar types, such as bullhorn, flat, riser, BMX, north road, cruiser, touring, moustache, recumbent, and the like. It should also be realized that the remote control devices may be positioned elsewhere on the bicycle, such as adjacent the seat, on the frame, on one or more removable components, and the like as desired.

FIGS. 21A-E illustrate the remote control devices positioned on a user's clothing. The user's clothing may include sensors that sense when a tightening or loosening control operation should be performed. The sensors could be coupled with a wireless device that relays a corresponding tightening or loosening signal to the motorized closure system or device. The sensors could be touch or pressure sensitive, magnetic or electrically sensitive, and the like. A benefit of the embodiments of FIGS. 21A-E is that the controls may be used independent of a particular activity. For example, the user can wear the clothing to control the tightness of his or her shoes regardless of the activity the user is engaging in. Thus, the user can adjust their shoes tightness if the activity involves, cycling, running, a sporting event, an outdoor activity, a leisure activity, or any other activity in which the user may be involved.

Figure 21A:
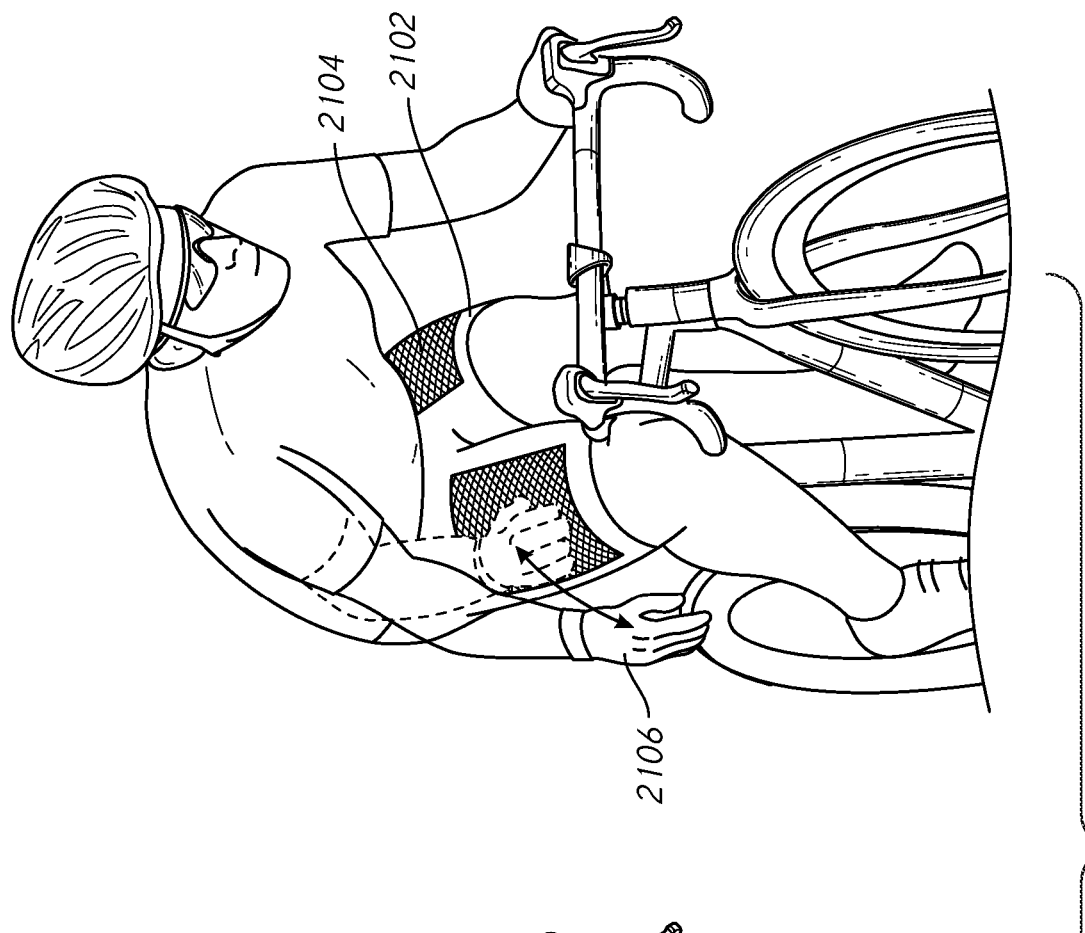
FIGS. 21A-E illustrate embodiments remote control devices positioned on a user's clothing.
Figure 21A:
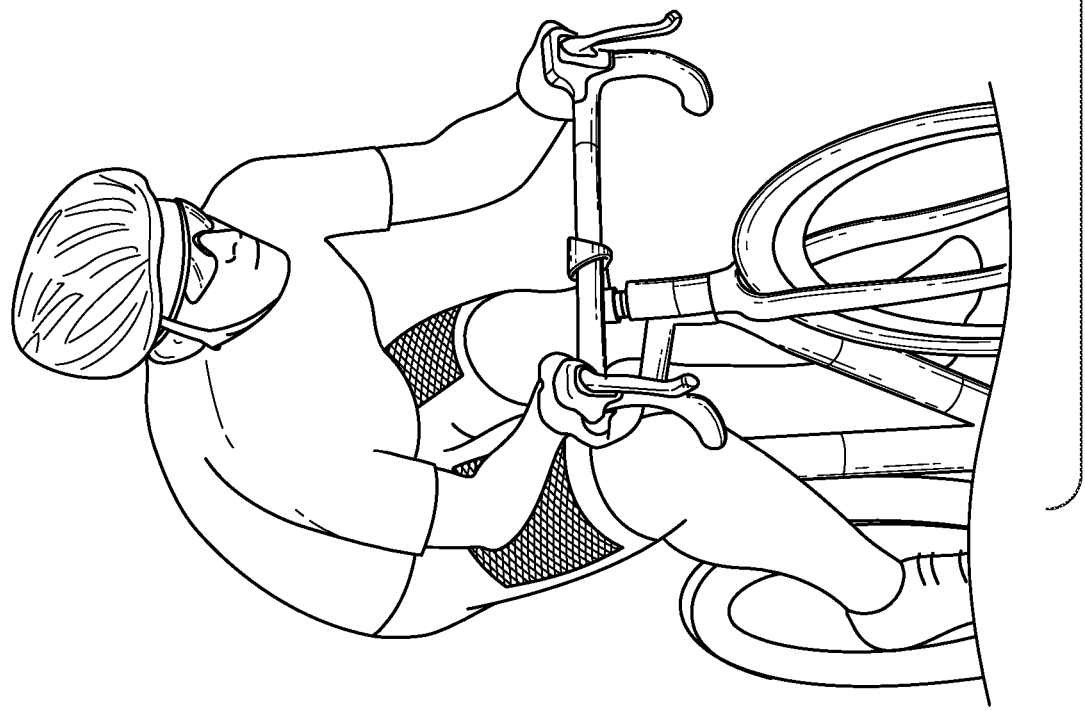
Figure 21B:
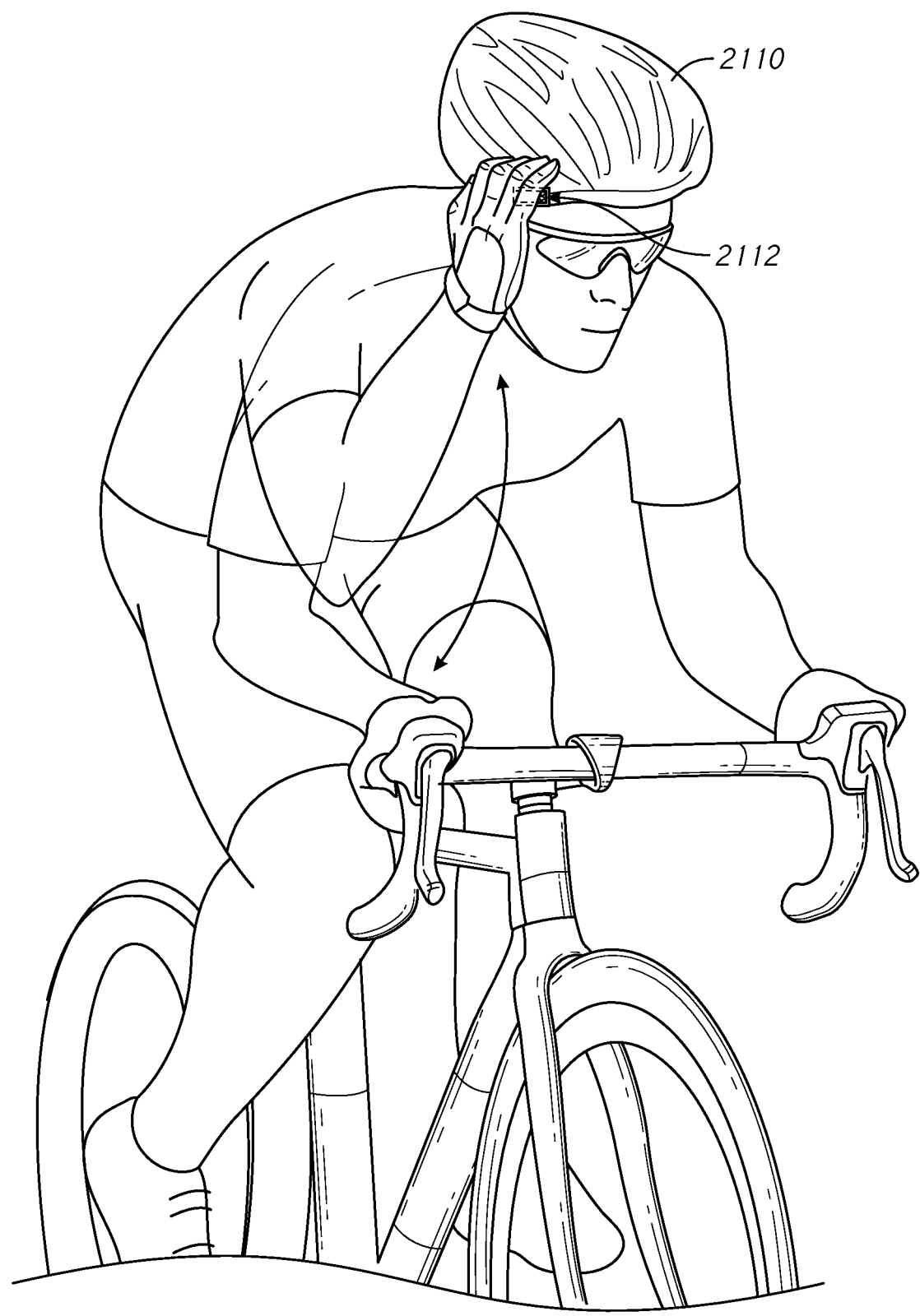

Referring now to FIG. 21A, in one embodiment, the user's shorts or pants 2102 may include a sensor 2104 that the user may contact with a hand or glove 2106 to adjust the tightness of their shoes. The sensor 2104 could be pressure or touch sensitive or may be receptive to a magnet or other component that is positioned within the user's glove 2106. In some embodiments, one of the sensors 2104 may increase the tightness while another sensor decreases the tightness. Referring to FIG. 21B, in some embodiments a sensor 2112 may be positioned within a helmet 2110 or other gear or apparel that the user is wearing. The sensor 2112 may adjust the shoe's tightness based on being pressed by the user's glove and the like.

Figure 21C:
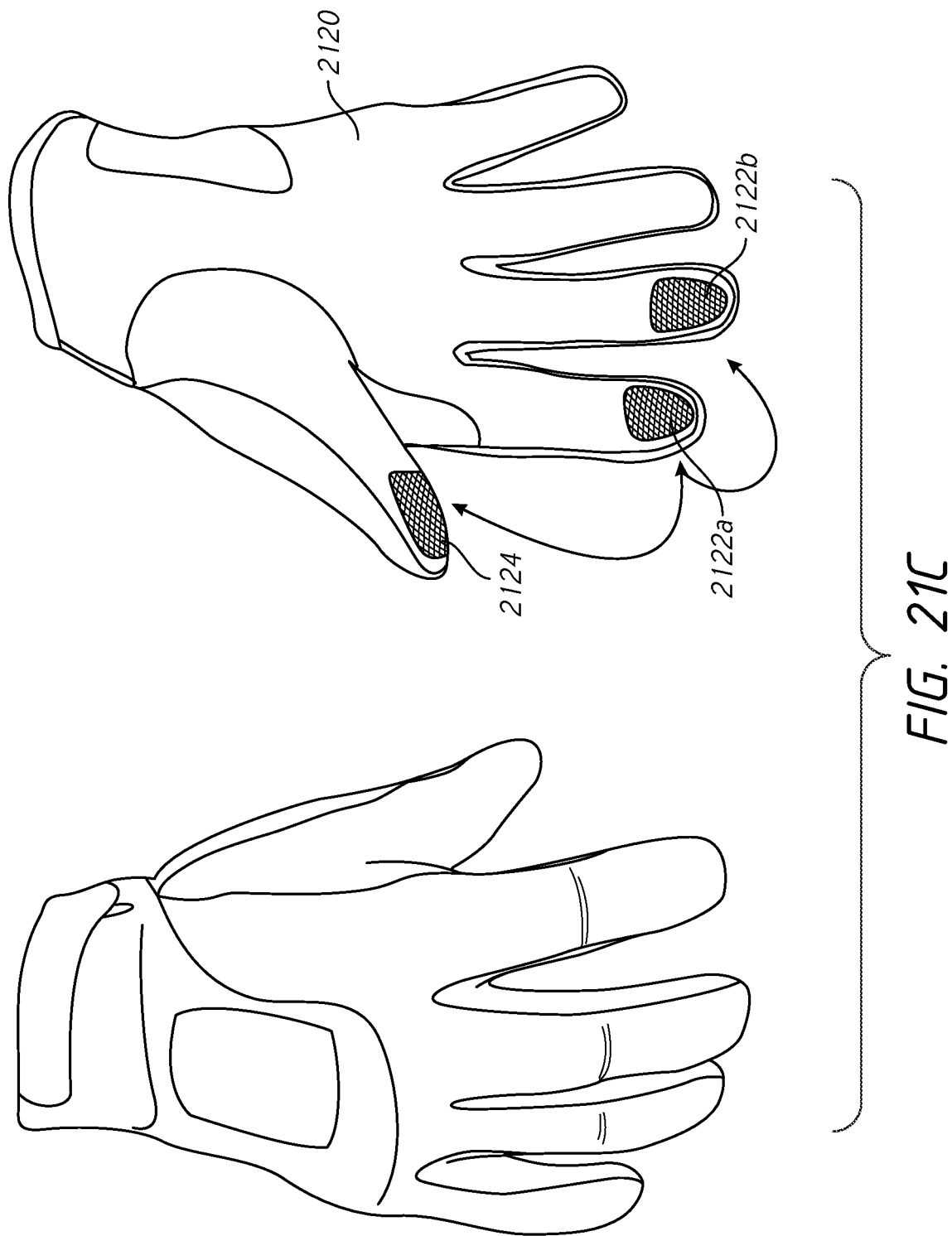
Figure 21D:
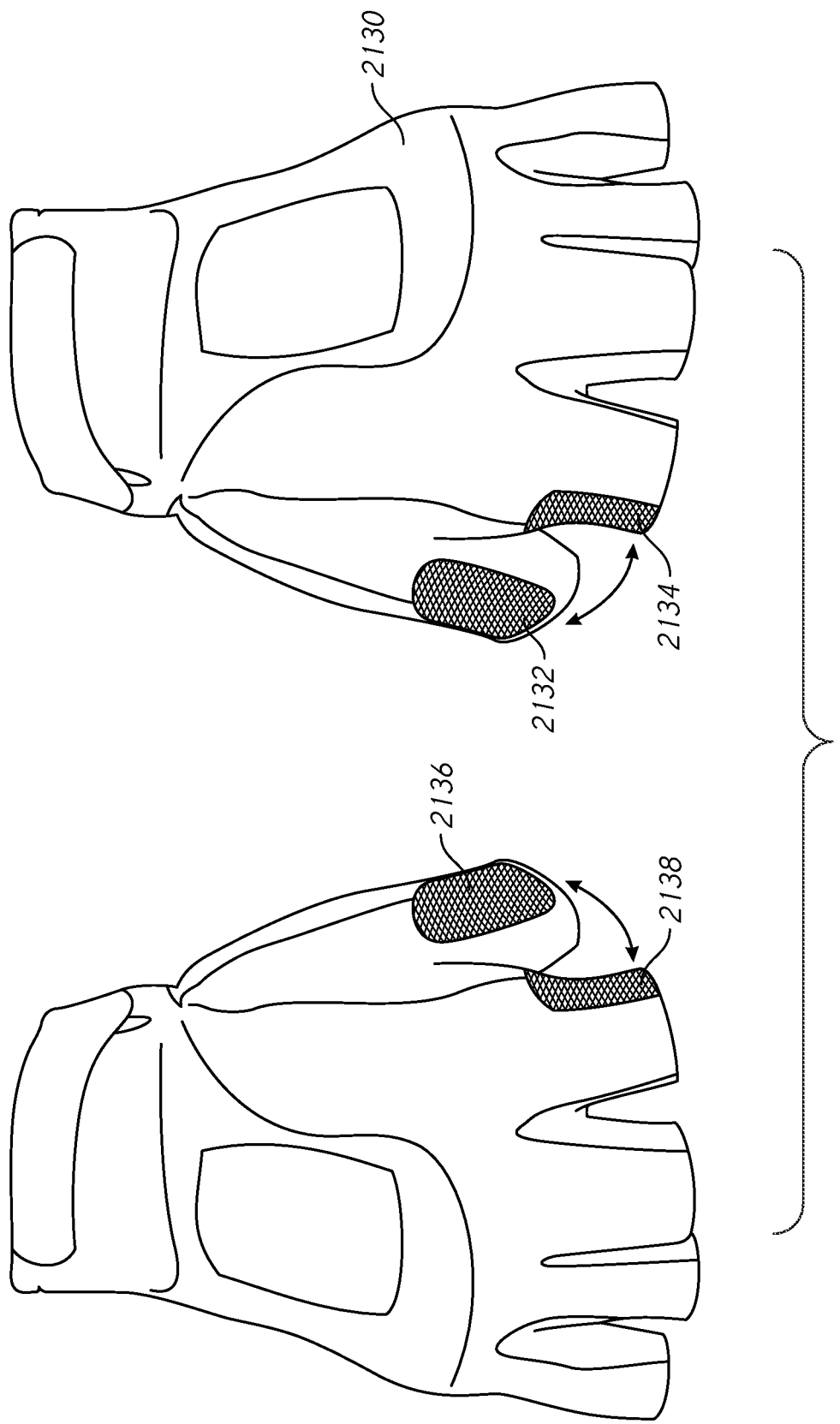

Referring now to FIG. 21C, in some embodiments the user's glove 2120 may include sensors that are configured to control the tightness of the user's shoes. The sensors may be located on the fingertips of the gloves for easy control. In some embodiments, a first sensor 2122a may be configured to tighten the shoe while a second sensor 2122b is configured to loosen the shoe, or vice versa. The sensors, 2122a and 2122b, may be operated by contacting the sensor with a third sensor 2124 that is positioned on the thumb of the glove 2120. Referring now to FIG. 21D, in some embodiments, the sensors may be positioned on the outside of the glove 2130, such as between the user's thumb and forefinger. Sensors 2132 and 2134 that are positioned on the left glove may be used to tighten the shoe while sensors 2136 and 2138 that are positioned on the right glove may be used to loosen the shoe, or vice versa. The sensors may operate by contacting the corresponding sensors together as described herein (e.g., contacting sensor 2132 with 2134 and contacting sensor 2136 with 238).

Figure 21E:
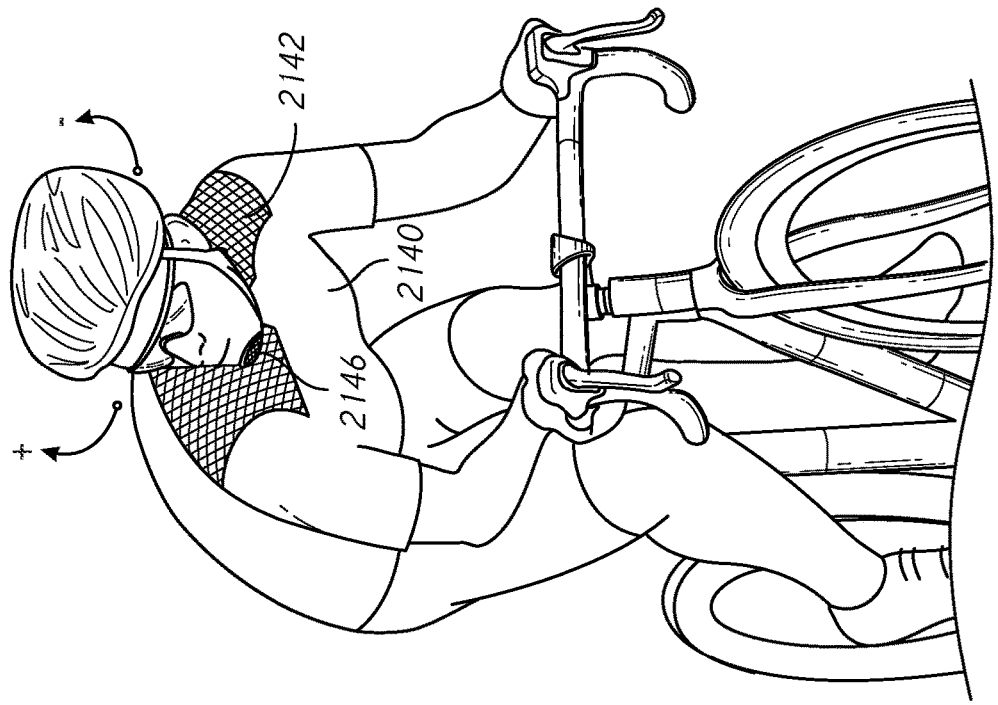
Figure 21E:
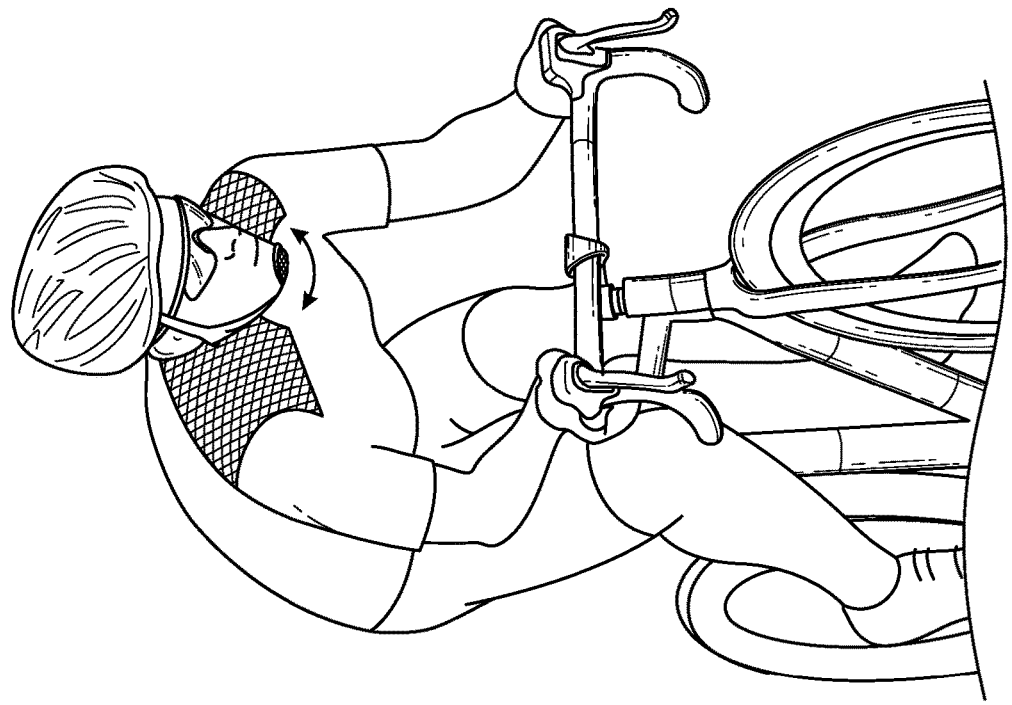

Referring now to FIG. 21E, in some embodiments the sensors may be positioned so as to allow a user to remotely control the shoe tightness without requiring the use of their hands. For example, the user's shirt 2140 may include sensors 2142 that are positioned near the user's shoulders. A chin strap of the user's helmet—or any other component—may also include a sensor 2146. Contact between the sensor 2146 of the chin strap with the sensor 2142 of the shirt 2140 may cause the motorized closure system or device to tighten or loosen the user's shoes. In some embodiments, the user could contact a sensor positioned on the right shoulder to tighten the shoe and contact a sensor positioned on the left shoulder to loosen the shoe, or vice versa.

Figure 22A:
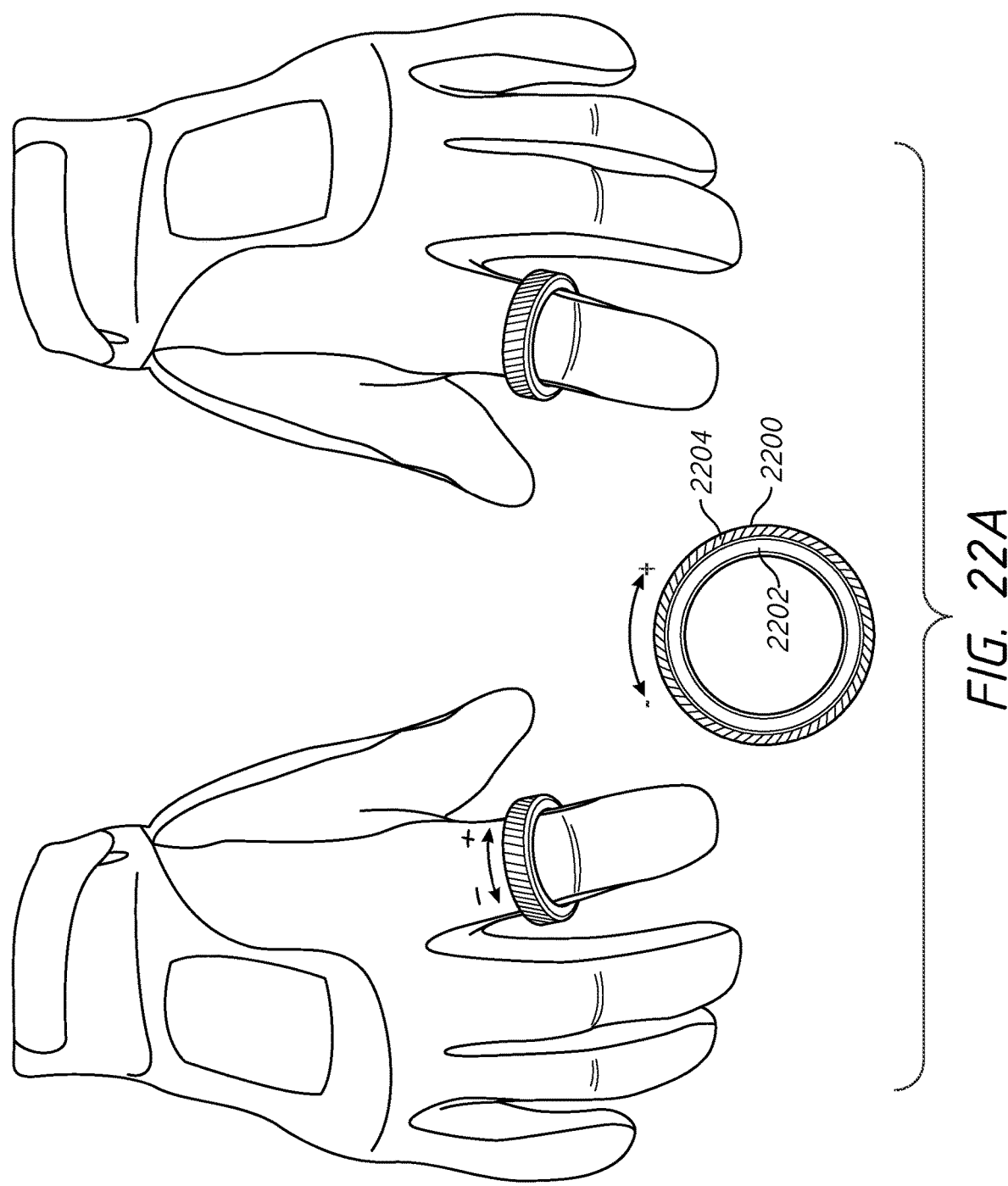
Figure 22B:
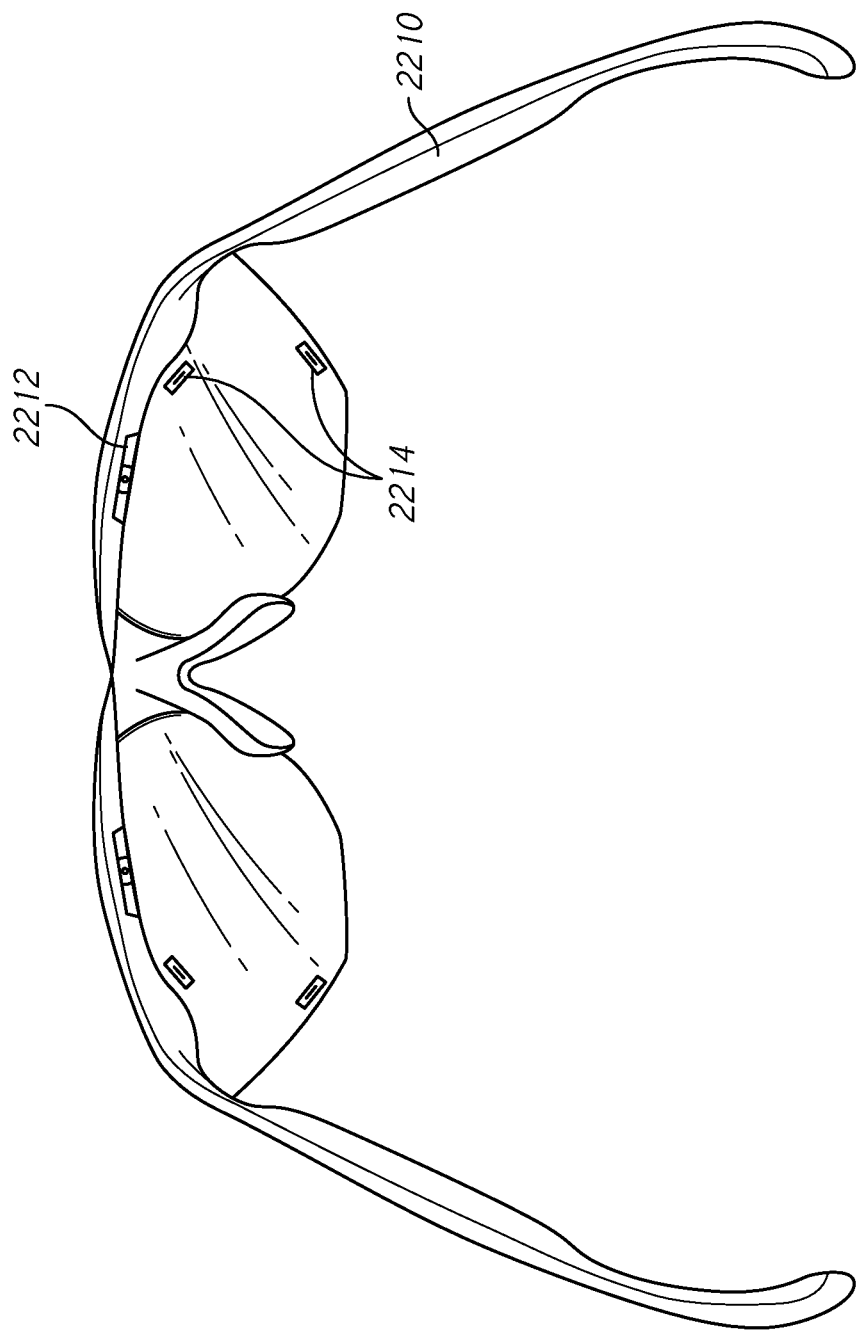
Figure 22C:
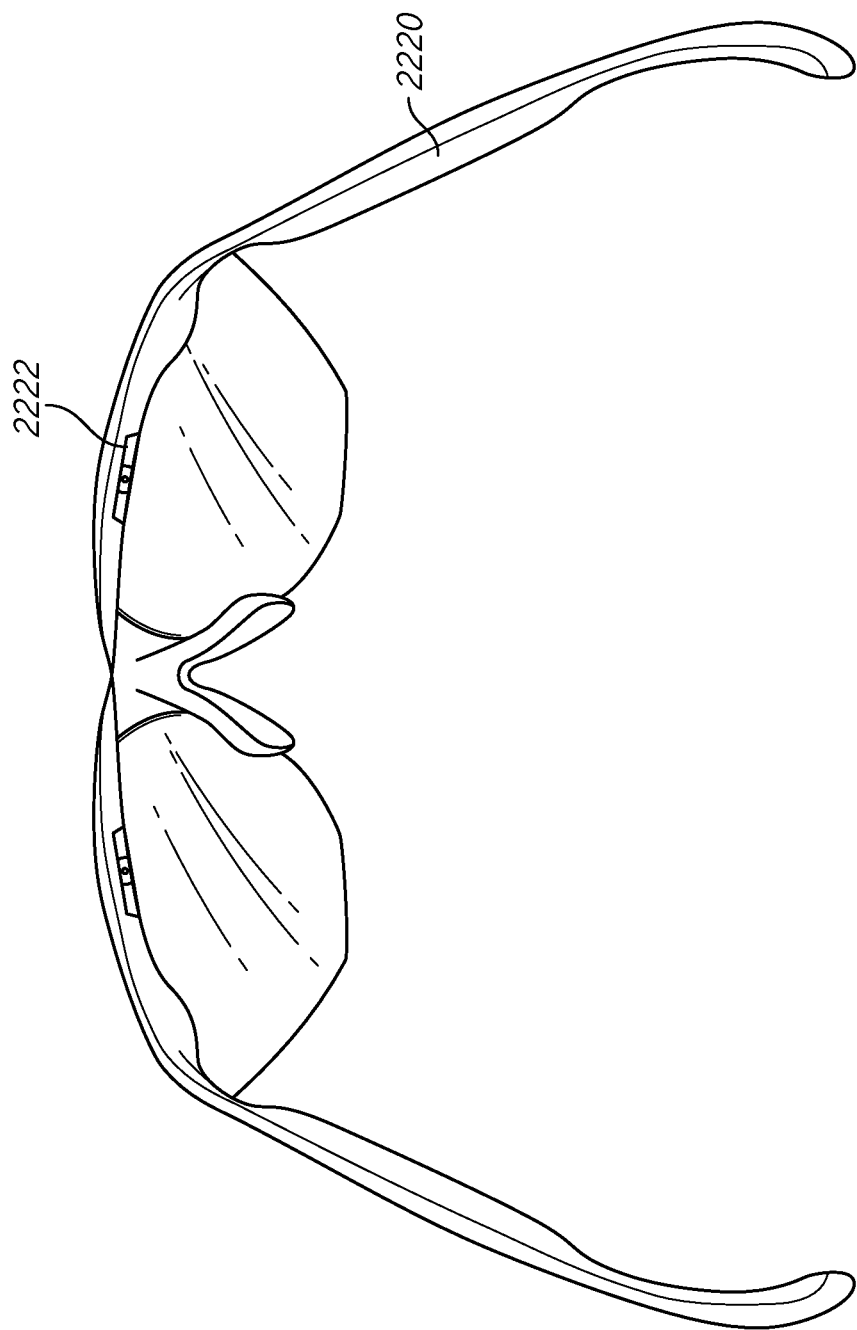

FIGS. 22A-C illustrate components that may include a remote control device for controlling a motorized closure system or device. Similar to FIGS. 21A-E, an advantage of such components is that the user may remotely control the tightness of a shoe regardless of the activity the user is involved in. Referring now to FIG. 22A, in one embodiment, the remote control may be integrated into a ring 2200 that is worn by the user. The ring 2200 may include a main body 2202 and an upper body 2204 that is rotatably connected to the main body 2202. Rotation of the upper body relative to the main body 2202 may trigger a tightening or loosening signal to be wireless communicated to the motorized closure system. For example, rotation of the upper body 2204 in a clockwise direction may cause the shoes to tighten while rotation of the upper body 2204 in a counterclockwise direction causes the shoes to loosen, or vice versa. A single ring 2200 or a pair of rings may be used to simultaneously or independently adjust the tightness of the user's shoes as desired.

Referring now to FIG. 22B, in some embodiments a sensor 2212 may be included with a pair of glasses 2210 that the user may wear. The sensor 2212 may be used to control the tightness of the shoes, such as by monitoring the user's eye movement. The glasses 2210 may include indicia or icons 2214 that serve as visual markers for tightening or loosening the shoes. As the user moves their eyes to view the indicia 2214, the sensor 2212 may recognize the movement and trigger a corresponding tightening or loosening control signal. The glasses 2210 may include one or more sensors 2212 that simultaneously or independently control the tightness of the user's shoes. As illustrated in FIG. 22C, in an alternative embodiment, the glasses 2220 may include a sensor 2222 that detects blinking of the user's eyes. The user may blink in first manner to tighten the shoes and blink in a second manner to loosen the shoes.

Exemplary Remote Control Process

Figure 23:
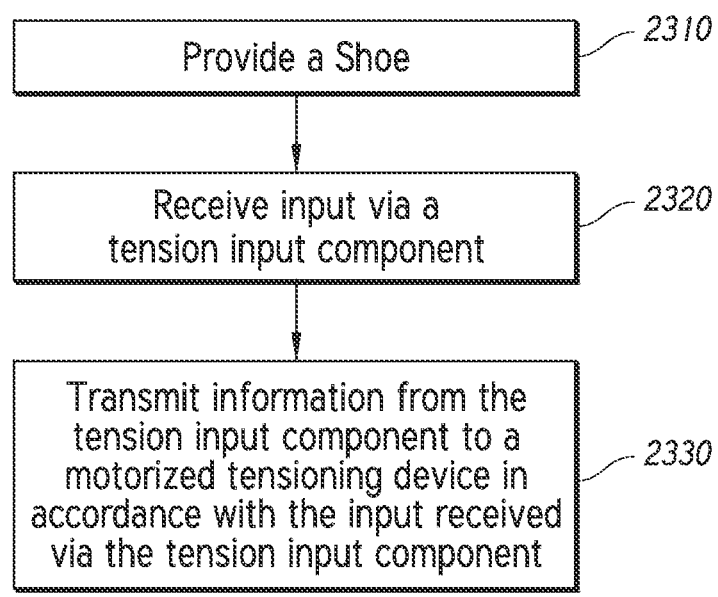
FIG. 23 illustrates an exemplary method for adjusting the fit of a shoe.

Referring now to FIG. 23, illustrated is an exemplary method 2300 for adjusting the fit of a shoe. At block 2310, a shoe is provided. The shoe includes: a main body that is configured to be fit about a foot of a user and a tension member that is coupled with the main body such that adjusting a tension of the tension member effects tightening or loosening of the main body about the user's foot. The shoe also includes a motorized tensioning device that is operably coupled with the tension member and that is configured to adjust the tension of the tension member to effect tightening or loosening of the main body about the user's foot.

At block 2320, input is received from a user via a tension input component that is coupled with a vehicle (e.g., bicycle), article of clothing, and the like, in an area that is easily accessible to a user's hands. The received input corresponds to an adjustment of the tension of the tension member that is desired. At block 2330, information is transmitted from the tension input component to the motorized tensioning device in accordance with the input received via the tension input component. The transmitted information effects actuation of the motorized tensioning device and adjustment of the tension of the tension member and thereby effects tightening or loosening of the shoe's main body about the user's foot.

In some embodiments, the method also includes: receiving input via an additional tension input component that is coupled with the user's shoe, where the received input corresponds to an additional adjustment of the tension of the tension member. In such embodiments, the method further includes transmitting information from the additional tension input component to the motorized tensioning device in accordance with the input received via the additional tension input component. The transmitted information effects an additional adjustment of the tension of the tension member to thereby tighten or loosen the main body about the user's foot. In some embodiments, the input received at the tension input component and/or the additional tension input component is received via an adjustment component that is removably couplable with the vehicle and that is also removably couplable with the user's shoe.

In some embodiments, the shoe includes two motorized tensioning devices. Specifically, the shoe may include a first motorized tensioning device that is configured to adjust a fit of a first portion of the shoe about the user's foot and may include a second motorized tensioning device that is configured to adjust a fit of a second portion of the shoe about the user's foot. In such embodiments, the tension input component of the vehicle, article of clothing, etc., may include a first control that is configured to adjust a tension setting of the first motorized tensioning device and may include a second control that is configured to adjust a tension setting of the second motorized tensioning device.

In some embodiments, the tension input component may be configured to wirelessly communicate the information with or to the motorized tensioning device. In some embodiments, the tension input component may be configured to simultaneously adjust the fit of a right shoe about the user's right foot and a left shoe about the user's left foot. In other embodiments, the tension input component may be configured to adjust the fit of a right shoe about the user's right foot independent from adjustment of a left shoe about the user's left foot.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method for adjusting the fit of a shoe comprising:
   providing a shoe comprising:
      a main body configured to be fit about a foot of a user;
      a tension member coupled with the main body such that adjusting a tension of the tension member effects tightening or loosening of the main body about the user's foot; and
      a motorized tensioning device operably coupled with the tension member and configured to adjust the tension of the tension member to effect tightening or loosening of the main body about the user's foot;
   receiving input via a tension input component that is coupled with a vehicle in an area that is easily accessible to a user's hands, the received input corresponding to an adjustment of the tension of the tension member; and
   transmitting information from the tension input component to the motorized tensioning device in accordance with said input received via said tension input component to effect adjustment of the tension of the tension member and thereby tighten or loosen the main body about the user's foot;
   wherein the tension input component is coupled with the vehicle so as to be moveable by the user's hand in a first direction and in a second direction; and
   wherein moving the tension input component in the first direction effects tightening of the main body about the user's foot and moving the tension input component in the second direction effects loosening of the main body about the user's foot.

2. The method of claim 1, further comprising:
   receiving input via an additional tension input component that is coupled with the user's shoe, the received input corresponding to an additional adjustment of the tension of the tension member; and
   transmitting information from the additional tension input component to the motorized tensioning device in accordance with said input received via said additional tension input component to effect said additional adjustment of the tension of the tension member and thereby tighten or loosen the main body about the user's foot.

3. The method of claim 2, wherein said input received at said tension input component or said additional tension input component is received via an adjustment component that is removably couplable with the vehicle and that is also removably couplable with the user's shoe.

4. The method of claim 1, wherein the motorized tensioning device is a first motorized tensioning device that is configured to adjust a fit of a first portion of the shoe about the user's foot, and wherein the shoe further includes a second motorized tensioning device that is configured to adjust a fit of a second portion of the shoe about the user's foot.

5. The method of claim 4, wherein the tension input component of the vehicle includes a first control that is configured to adjust a tension setting of the first motorized tensioning device and that includes a second control that is configured to adjust a tension setting of the second motorized tensioning device.

6. The method of claim 1, wherein the tension input component is configured to wirelessly communicate said information with the motorized tensioning device.

7. The method of claim 1, wherein the tension input component is configured to simultaneously adjust the fit of a right shoe about the user's right foot and a left shoe about the user's left foot.

8. The method of claim 1, wherein the tension input component is configured to adjust the fit of a right shoe about the user's right foot independent from adjustment of a left shoe about the user's left foot.

9. The method of claim 1, wherein the tension input component is a rotatable knob.

\* \* \* \* \*